US 7,586,728 B2

(12) United States Patent
Anthony

(10) Patent No.: US 7,586,728 B2
(45) Date of Patent: *Sep. 8, 2009

(54) CONDITIONER WITH COPLANAR CONDUCTORS

(75) Inventor: William M. Anthony, Erie, PA (US)

(73) Assignee: X2Y Attenuators, LLC, Erie, PA (US)

( * ) Notice: Subject to any disclaimer, the term of this patent is extended or adjusted under 35 U.S.C. 154(b) by 444 days.

This patent is subject to a terminal disclaimer.

(21) Appl. No.: 11/372,132

(22) Filed: Mar. 10, 2006

(65) Prior Publication Data
US 2006/0203414 A1 Sep. 14, 2006

Related U.S. Application Data

(60) Provisional application No. 60/661,002, filed on Mar. 14, 2005, provisional application No. 60/668,992, filed on Apr. 7, 2005, provisional application No. 60/671,107, filed on Apr. 14, 2005, provisional application No. 60/671,532, filed on Apr. 15, 2005, provisional application No. 60/674,284, filed on Apr. 25, 2005, provisional application No. 60/751,273, filed on Dec. 19, 2005.

(51) Int. Cl.
*H02H 9/00* (2006.01)
(52) U.S. Cl. .................................... 361/118
(58) Field of Classification Search ............. 361/118
See application file for complete search history.

(56) References Cited

U.S. PATENT DOCUMENTS

| 3,240,621 | A | 3/1966 | Flower, Jr. et al. |
| 3,343,034 | A | 9/1967 | Ovshinsky |
| 3,379,943 | A | 4/1968 | Breedlove |
| 3,573,677 | A | 4/1971 | Detar |
| 3,736,471 | A | 5/1973 | Donze et al. |
| 3,742,420 | A | 6/1973 | Harnden, Jr. |
| 3,790,858 | A | 2/1974 | Brancaleone et al. |

(Continued)

FOREIGN PATENT DOCUMENTS

DE         197 28 692 A1     1/1999

(Continued)

OTHER PUBLICATIONS

PCT International Search Report for PCT/US01/48861, Oct. 1, 2002.

(Continued)

*Primary Examiner*—Stephen W Jackson
(74) *Attorney, Agent, or Firm*—Neifeld IP Law, PC

(57) ABSTRACT

Disclosed are novel internal structures of energy conditioners having A, B, and G master electrodes, novel circuits including energy conditioners having A, B, and G master electrodes conductive structures, novel assemblies of internal structures and internal structures of energy conditioners having A, B, and G electrodes, and novel arrangements of energy conditioners having A, B, and G master electrodes on connection structures. Certain internal structures have conductive layers of A and B master electrodes in the same plane and conductive layers of the G master electrode extended beyond the periphery of the A and B layers except where the A and B layers have tabs extended to conductive integration structure integrating the A and B layers into respective A and B master electrodes.

58 Claims, 32 Drawing Sheets

U.S. PATENT DOCUMENTS

| | | |
|---|---|---|
| 3,842,374 A | 10/1974 | Schlicke |
| 4,023,071 A | 5/1977 | Fussell |
| 4,119,084 A | 10/1978 | Eckels |
| 4,135,132 A | 1/1979 | Tafjord |
| 4,139,783 A | 2/1979 | Engeler |
| 4,191,986 A | 3/1980 | ta Huang et al. |
| 4,198,613 A | 4/1980 | Whitley |
| 4,259,604 A | 3/1981 | Aoki |
| 4,262,317 A | 4/1981 | Baumbach |
| 4,275,945 A | 6/1981 | Krantz et al. |
| 4,292,558 A | 9/1981 | Flick et al. |
| 4,308,509 A | 12/1981 | Tsuchiya et al. |
| 4,320,364 A | 3/1982 | Sakamoto et al. |
| 4,335,417 A | 6/1982 | Sakshaug et al. |
| 4,353,044 A | 10/1982 | Nossek |
| 4,366,456 A | 12/1982 | Ueno et al. |
| 4,384,263 A | 5/1983 | Neuman et al. |
| 4,394,639 A | 7/1983 | McGalliard |
| 4,412,146 A | 10/1983 | Futterer et al. |
| 4,494,092 A | 1/1985 | Griffin et al. |
| 4,533,931 A | 8/1985 | Mandai et al. |
| 4,553,114 A | 11/1985 | English et al. |
| 4,563,659 A | 1/1986 | Sakamoto |
| 4,586,104 A | 4/1986 | Standler |
| 4,587,589 A | 5/1986 | Marek |
| 4,590,537 A | 5/1986 | Sakamoto |
| 4,592,606 A | 6/1986 | Mudra |
| 4,612,140 A | 9/1986 | Mandai |
| 4,612,497 A | 9/1986 | Ulmer |
| 4,636,752 A | 1/1987 | Saito |
| 4,682,129 A | 7/1987 | Bakermans et al. |
| 4,685,025 A | 8/1987 | Carlomagno |
| 4,688,151 A | 8/1987 | Kraus et al. |
| 4,694,265 A | 9/1987 | Kupper |
| 4,698,721 A | 10/1987 | Warren |
| 4,703,386 A | 10/1987 | Speet et al. |
| 4,712,540 A | 12/1987 | Takamine |
| 4,713,540 A | 12/1987 | Gilby et al. |
| 4,720,760 A | 1/1988 | Starr |
| 4,746,557 A | 5/1988 | Sakamoto et al. |
| 4,752,752 A | 6/1988 | Okubo |
| 4,760,485 A | 7/1988 | Ari et al. |
| 4,772,225 A | 9/1988 | Ulery |
| 4,777,460 A | 10/1988 | Okubo |
| 4,780,598 A | 10/1988 | Fahey et al. |
| 4,782,311 A | 11/1988 | Ookubo |
| 4,789,847 A | 12/1988 | Sakamoto et al. |
| 4,793,058 A | 12/1988 | Venaleck |
| 4,794,485 A | 12/1988 | Bennett |
| 4,794,499 A | 12/1988 | Ott |
| 4,795,658 A | 1/1989 | Kano et al. |
| 4,799,070 A | 1/1989 | Nishikawa |
| 4,801,904 A | 1/1989 | Sakamoto et al. |
| 4,814,295 A | 3/1989 | Mehta |
| 4,814,938 A | 3/1989 | Arakawa et al. |
| 4,814,941 A | 3/1989 | Speet et al. |
| 4,819,126 A | 4/1989 | Kornrumpf et al. |
| 4,845,606 A | 7/1989 | Herbert |
| 4,847,730 A | 7/1989 | Konno et al. |
| 4,904,967 A | 2/1990 | Morii et al. |
| 4,908,586 A | 3/1990 | Kling et al. |
| 4,908,590 A | 3/1990 | Sakamoto et al. |
| 4,924,340 A | 5/1990 | Sweet |
| 4,942,353 A | 7/1990 | Herbert et al. |
| 4,967,315 A | 10/1990 | Schelhorn |
| 4,978,906 A | 12/1990 | Herbert et al. |
| 4,990,202 A | 2/1991 | Murata et al. |
| 4,999,595 A | 3/1991 | Azumi et al. |
| 5,029,062 A | 7/1991 | Capel |
| 5,034,709 A | 7/1991 | Azumi et al. |
| 5,034,710 A | 7/1991 | Kawaguchi |
| 5,051,712 A | 9/1991 | Naito et al. |
| 5,059,140 A | 10/1991 | Philippson et al. |
| 5,065,284 A | 11/1991 | Hernandez |
| 5,073,523 A | 12/1991 | Yamada et al. |
| 5,079,069 A | 1/1992 | Howard et al. |
| 5,079,223 A | 1/1992 | Maroni |
| 5,079,669 A | 1/1992 | Williams |
| 5,089,688 A | 2/1992 | Fang et al. |
| 5,105,333 A | 4/1992 | Yamano et al. |
| 5,107,394 A | 4/1992 | Naito et al. |
| 5,109,206 A | 4/1992 | Carlile |
| 5,140,297 A | 8/1992 | Jacobs et al. |
| 5,140,497 A | 8/1992 | Kato et al. |
| 5,142,430 A | 8/1992 | Anthony |
| 5,148,005 A | 9/1992 | Fang et al. |
| 5,155,655 A | 10/1992 | Howard et al. |
| 5,161,086 A | 11/1992 | Howard et al. |
| 5,167,483 A | 12/1992 | Gardiner |
| 5,173,670 A | 12/1992 | Naito et al. |
| 5,179,362 A | 1/1993 | Okochi et al. |
| 5,181,859 A | 1/1993 | Foreman et al. |
| 5,186,647 A | 2/1993 | Denkmann et al. |
| 5,208,502 A | 5/1993 | Yamashita et al. |
| 5,219,812 A | 6/1993 | Doi et al. |
| 5,220,480 A | 6/1993 | Kershaw, Jr. et al. |
| 5,236,376 A | 8/1993 | Cohen |
| 5,243,308 A | 9/1993 | Shusterman et al. |
| 5,251,092 A | 10/1993 | Brady et al. |
| 5,257,950 A | 11/1993 | Lenker et al. |
| 5,261,153 A | 11/1993 | Lucas |
| 5,262,611 A | 11/1993 | Danysh et al. |
| 5,268,810 A | 12/1993 | DiMarco et al. |
| 5,290,191 A | 3/1994 | Foreman et al. |
| 5,299,956 A | 4/1994 | Brownell et al. |
| 5,300,760 A | 4/1994 | Batliwalla et al. |
| 5,310,363 A | 5/1994 | Brownell et al. |
| 5,311,408 A | 5/1994 | Ferchau et al. |
| 5,321,373 A | 6/1994 | Shusterman et al. |
| 5,321,573 A | 6/1994 | Person et al. |
| 5,326,284 A | 7/1994 | Bohbot et al. |
| 5,337,028 A | 8/1994 | White |
| 5,353,189 A | 10/1994 | Tomlinson |
| 5,353,202 A | 10/1994 | Ansell et al. |
| 5,357,568 A | 10/1994 | Pelegris |
| 5,362,249 A | 11/1994 | Carter |
| 5,362,254 A | 11/1994 | Siemon et al. |
| 5,378,407 A | 1/1995 | Chandler et al. |
| 5,382,928 A | 1/1995 | Davis et al. |
| 5,382,938 A | 1/1995 | Hansson et al. |
| 5,386,335 A | 1/1995 | Amano et al. |
| 5,396,201 A | 3/1995 | Ishizaki et al. |
| 5,401,952 A | 3/1995 | Sugawa |
| 5,405,466 A | 4/1995 | Naito et al. |
| 5,414,393 A | 5/1995 | Rose et al. |
| 5,414,587 A | 5/1995 | Kiser et al. |
| 5,420,553 A | 5/1995 | Sakamoto et al. |
| 5,432,484 A | 7/1995 | Klas et al. |
| 5,446,625 A | 8/1995 | Urbish et al. |
| 5,450,278 A | 9/1995 | Lee et al. |
| 5,451,919 A | 9/1995 | Chu et al. |
| RE35,064 E | 10/1995 | Hernandez |
| 5,455,734 A | 10/1995 | Foreman et al. |
| 5,461,351 A | 10/1995 | Shusterman |
| 5,463,232 A | 10/1995 | Yamashita et al. |
| 5,471,035 A | 11/1995 | Holmes |
| 5,477,933 A | 12/1995 | Nguyen |
| 5,481,238 A | 1/1996 | Carsten et al. |
| 5,483,407 A | 1/1996 | Anastasio et al. |
| 5,483,413 A | 1/1996 | Babb |
| 5,488,540 A | 1/1996 | Hatta |
| 5,491,299 A | 2/1996 | Naylor et al. |
| 5,493,260 A | 2/1996 | Park |
| 5,495,180 A | 2/1996 | Huang et al. |

| | | | | | | |
|---|---|---|---|---|---|---|
| 5,500,629 A | 3/1996 | Meyer | | 5,980,718 A | 11/1999 | Van Konynenburg et al. |
| 5,500,785 A | 3/1996 | Funada | | 5,995,352 A | 11/1999 | Gumley |
| 5,512,196 A | 4/1996 | Mantese et al. | | 5,999,067 A | 12/1999 | D'Ostilio |
| 5,531,003 A | 7/1996 | Seifried et al. | | 5,999,398 A | 12/1999 | Makl et al. |
| 5,534,837 A | 7/1996 | Brandt | | 6,004,752 A | 12/1999 | Loewy et al. |
| 5,535,101 A | 7/1996 | Miles et al. | | 6,013,957 A | 1/2000 | Puzo et al. |
| 5,536,978 A | 7/1996 | Cooper et al. | | 6,016,095 A | 1/2000 | Herbert |
| 5,541,482 A | 7/1996 | Siao | | 6,018,448 A | 1/2000 | Anthony |
| 5,544,002 A | 8/1996 | Iwaya et al. | | 6,021,564 A | 2/2000 | Hanson |
| 5,546,058 A | 8/1996 | Azuma et al. | | 6,023,406 A | 2/2000 | Kinoshita et al. |
| 5,548,255 A | 8/1996 | Spielman | | 6,031,710 A | 2/2000 | Wolf et al. |
| 5,555,150 A | 9/1996 | Newman, Jr. | | 6,034,576 A | 3/2000 | Kuth |
| 5,568,348 A | 10/1996 | Foreman et al. | | 6,034,864 A | 3/2000 | Naito et al. |
| 5,570,278 A | 10/1996 | Cross | | 6,037,846 A | 3/2000 | Oberhammer |
| 5,583,359 A | 12/1996 | Ng et al. | | 6,038,121 A | 3/2000 | Naito et al. |
| 5,586,007 A | 12/1996 | Funada | | 6,042,685 A | 3/2000 | Shinada et al. |
| 5,592,391 A | 1/1997 | Muyshondt et al. | | 6,046,898 A | 4/2000 | Seymour et al. |
| 5,612,657 A | 3/1997 | Kledzik | | 6,052,038 A | 4/2000 | Savicki |
| 5,614,881 A | 3/1997 | Duggal et al. | | 6,061,227 A | 5/2000 | Nogi |
| 5,619,079 A | 4/1997 | Wiggins et al. | | 6,064,286 A | 5/2000 | Ziegner et al. |
| 5,624,592 A | 4/1997 | Paustian | | 6,072,687 A | 6/2000 | Naito et al. |
| 5,640,048 A | 6/1997 | Selna | | 6,075,211 A | 6/2000 | Tohya et al. |
| 5,645,746 A | 7/1997 | Walsh | | 6,078,117 A | 6/2000 | Perrin et al. |
| 5,647,766 A | 7/1997 | Nguyen | | 6,078,229 A | 6/2000 | Funada et al. |
| 5,647,767 A | 7/1997 | Scheer et al. | | 6,088,235 A | 7/2000 | Chiao et al. |
| 5,668,511 A | 9/1997 | Furutani et al. | | 6,091,310 A | 7/2000 | Utsumi et al. |
| 5,682,303 A | 10/1997 | Goad | | 6,092,269 A | 7/2000 | Yializis et al. |
| 5,692,298 A | 12/1997 | Goetz et al. | | 6,094,112 A | 7/2000 | Goldberger et al. |
| 5,700,167 A | 12/1997 | Pharney et al. | | 6,094,339 A | 7/2000 | Evans |
| 5,708,553 A | 1/1998 | Hung | | 6,097,260 A | 8/2000 | Whybrew et al. |
| 5,719,450 A | 2/1998 | Vora | | 6,097,581 A | 8/2000 | Anthony |
| 5,719,477 A | 2/1998 | Tomihari | | 6,104,258 A | 8/2000 | Novak |
| 5,719,750 A | 2/1998 | Iwane | | 6,104,599 A | 8/2000 | Ahiko et al. |
| 5,751,539 A | 5/1998 | Stevenson et al. | | 6,108,448 A | 8/2000 | Song et al. |
| 5,767,446 A | 6/1998 | Ha et al. | | 6,111,479 A | 8/2000 | Myohga et al. |
| 5,789,999 A | 8/1998 | Barnett et al. | | 6,120,326 A | 9/2000 | Brooks |
| 5,790,368 A | 8/1998 | Naito et al. | | 6,121,761 A | 9/2000 | Herbert |
| 5,796,568 A | 8/1998 | Baiatu | | 6,125,044 A | 9/2000 | Cherniski et al. |
| 5,796,595 A | 8/1998 | Cross | | 6,130,585 A | 10/2000 | Whybrew et al. |
| 5,797,770 A | 8/1998 | Davis et al. | | 6,137,392 A | 10/2000 | Herbert |
| 5,808,873 A | 9/1998 | Celaya et al. | | 6,142,831 A | 11/2000 | Ashman et al. |
| 5,825,084 A | 10/1998 | Lau et al. | | 6,144,547 A | 11/2000 | Retseptor |
| 5,825,628 A | 10/1998 | Garbelli et al. | | 6,147,587 A | 11/2000 | Hadano et al. |
| 5,828,093 A | 10/1998 | Naito et al. | | 6,150,895 A | 11/2000 | Steigerwald et al. |
| 5,828,272 A | 10/1998 | Romerein et al. | | 6,157,528 A | 12/2000 | Anthony |
| 5,828,555 A | 10/1998 | Itoh | | 6,157,547 A | 12/2000 | Brown et al. |
| 5,831,489 A | 11/1998 | Wire | | 6,160,705 A | 12/2000 | Stearns et al. |
| 5,834,992 A | 11/1998 | Kato et al. | | 6,163,454 A | 12/2000 | Strickler |
| 5,838,216 A | 11/1998 | White et al. | | 6,163,456 A | 12/2000 | Suzuki et al. |
| 5,867,361 A | 2/1999 | Wolf et al. | | 6,165,814 A | 12/2000 | Wark et al. |
| 5,870,272 A | 2/1999 | Seifried et al. | | 6,175,287 B1 | 1/2001 | Lampen et al. |
| 5,875,099 A | 2/1999 | Maesaka et al. | | 6,180,588 B1 | 1/2001 | Walters |
| 5,880,925 A | 3/1999 | DuPre et al. | | 6,181,231 B1 | 1/2001 | Bartilson |
| 5,889,445 A | 3/1999 | Ritter et al. | | 6,183,685 B1 | 2/2001 | Cowman et al. |
| 5,895,990 A | 4/1999 | Lau | | 6,185,091 B1 | 2/2001 | Tanahashi et al. |
| 5,898,403 A | 4/1999 | Saitoh et al. | | 6,188,565 B1 | 2/2001 | Naito et al. |
| 5,898,562 A | 4/1999 | Cain et al. | | 6,191,475 B1 | 2/2001 | Skinner et al. |
| 5,905,627 A | 5/1999 | Brendel et al. | | 6,191,669 B1 | 2/2001 | Shigemura |
| 5,907,265 A | 5/1999 | Sakuragawa et al. | | 6,191,932 B1 | 2/2001 | Kuroda et al. |
| 5,908,151 A | 6/1999 | Elias | | 6,195,269 B1 | 2/2001 | Hino |
| 5,909,155 A | 6/1999 | Anderson et al. | | 6,198,123 B1 | 3/2001 | Linder et al. |
| 5,909,350 A | 6/1999 | Anthony | | 6,198,362 B1 | 3/2001 | Harada et al. |
| 5,910,755 A | 6/1999 | Mishiro et al. | | 6,204,448 B1 | 3/2001 | Garland et al. |
| 5,912,809 A | 6/1999 | Steigerwald et al. | | 6,205,014 B1 | 3/2001 | Inomata et al. |
| 5,917,388 A | 6/1999 | Tronche et al. | | 6,207,081 B1 | 3/2001 | Sasaki et al. |
| 5,926,377 A | 7/1999 | Nakao et al. | | 6,208,063 B1 | 3/2001 | Horikawa |
| 5,928,076 A | 7/1999 | Clements et al. | | 6,208,225 B1 | 3/2001 | Miller |
| 5,955,930 A | 9/1999 | Anderson et al. | | 6,208,226 B1 | 3/2001 | Chen et al. |
| 5,959,829 A | 9/1999 | Stevenson et al. | | 6,208,494 B1 | 3/2001 | Nakura et al. |
| 5,959,846 A | 9/1999 | Noguchi et al. | | 6,208,495 B1 | 3/2001 | Wieloch et al. |
| 5,969,461 A | 10/1999 | Anderson et al. | | 6,208,501 B1 | 3/2001 | Ingalls et al. |
| 5,977,845 A | 11/1999 | Kitahara | | 6,208,502 B1 | 3/2001 | Hudis et al. |
| 5,978,231 A | 11/1999 | Tohya et al. | | 6,208,503 B1 | 3/2001 | Shimada et al. |

| Patent No. | Date | Inventor |
|---|---|---|
| 6,208,521 B1 | 3/2001 | Nakatsuka |
| 6,208,525 B1 | 3/2001 | Imasu et al. |
| 6,211,754 B1 | 4/2001 | Nishida et al. |
| 6,212,078 B1 | 4/2001 | Hunt et al. |
| 6,215,647 B1 | 4/2001 | Naito et al. |
| 6,215,649 B1 | 4/2001 | Appelt et al. |
| 6,218,631 B1 | 4/2001 | Hetzel et al. |
| 6,219,240 B1 | 4/2001 | Sasov |
| 6,222,427 B1 | 4/2001 | Kato et al. |
| 6,222,431 B1 | 4/2001 | Ishizaki et al. |
| 6,225,876 B1 | 5/2001 | Akino et al. |
| 6,226,169 B1 | 5/2001 | Naito et al. |
| 6,226,182 B1 | 5/2001 | Maehara |
| 6,229,226 B1 | 5/2001 | Kramer et al. |
| 6,236,572 B1 | 5/2001 | Teshome et al. |
| 6,240,621 B1 | 6/2001 | Nellissen et al. |
| 6,243,253 B1 | 6/2001 | DuPre et al. |
| 6,249,047 B1 | 6/2001 | Corisis |
| 6,249,439 B1 | 6/2001 | DeMore et al. |
| 6,252,161 B1 | 6/2001 | Hailey et al. |
| 6,262,895 B1 | 7/2001 | Forthun |
| 6,266,228 B1 | 7/2001 | Naito et al. |
| 6,266,229 B1 | 7/2001 | Naito et al. |
| 6,272,003 B1 | 8/2001 | Schaper |
| 6,281,704 B2 | 8/2001 | Ngai et al. |
| 6,282,074 B1 | 8/2001 | Anthony |
| 6,282,079 B1 | 8/2001 | Nagakari et al. |
| 6,285,109 B1 | 9/2001 | Katagiri et al. |
| 6,285,542 B1 | 9/2001 | Kennedy, III et al. |
| 6,292,350 B1 | 9/2001 | Naito et al. |
| 6,292,351 B1 | 9/2001 | Ahiko et al. |
| 6,309,245 B1 | 10/2001 | Sweeney |
| 6,310,286 B1 | 10/2001 | Troxel et al. |
| 6,313,584 B1 | 11/2001 | Johnson et al. |
| 6,320,547 B1 | 11/2001 | Fathy et al. |
| 6,324,047 B1 | 11/2001 | Hayworth |
| 6,324,048 B1 | 11/2001 | Liu |
| 6,325,672 B1 | 12/2001 | Belopolsky et al. |
| 6,327,134 B1 | 12/2001 | Kuroda et al. |
| 6,327,137 B1 | 12/2001 | Yamomoto et al. |
| 6,331,926 B1 | 12/2001 | Anthony |
| 6,331,930 B1 | 12/2001 | Kuroda |
| 6,342,681 B1 | 1/2002 | Goldberger et al. |
| 6,373,673 B1 | 4/2002 | Anthony |
| 6,388,856 B1 | 5/2002 | Anthony |
| 6,395,996 B1 | 5/2002 | Tsai et al. |
| 6,448,873 B1 | 9/2002 | Mostov |
| 6,456,481 B1 | 9/2002 | Stevenson |
| 6,469,595 B2 | 10/2002 | Anthony et al. |
| 6,498,710 B1 | 12/2002 | Anthony |
| 6,504,451 B1 | 1/2003 | Yamaguchi |
| 6,509,807 B1 | 1/2003 | Anthony et al. |
| 6,510,038 B1 | 1/2003 | Satou et al. |
| 6,522,516 B2 | 2/2003 | Anthony |
| 6,549,389 B2 | 4/2003 | Anthony et al. |
| 6,563,688 B2 | 5/2003 | Anthony et al. |
| 6,580,595 B2 | 6/2003 | Anthony et al. |
| 6,594,128 B2 | 7/2003 | Anthony |
| 6,603,372 B1 | 8/2003 | Ishizaki et al. |
| 6,603,646 B2 | 8/2003 | Anthony et al. |
| 6,606,011 B2 | 8/2003 | Anthony et al. |
| 6,606,237 B1 | 8/2003 | Naito et al. |
| 6,608,538 B2 | 8/2003 | Wang |
| 6,618,268 B2 | 9/2003 | Dibene, II et al. |
| 6,636,406 B1 | 10/2003 | Anthony |
| 6,650,525 B2 | 11/2003 | Anthony |
| 6,687,108 B1 | 2/2004 | Anthony et al. |
| 6,696,952 B2 | 2/2004 | Zirbes |
| 6,717,301 B2 | 4/2004 | De Daran et al. |
| 6,738,249 B1 | 5/2004 | Anthony et al. |
| 6,806,806 B2 | 10/2004 | Anthony |
| 6,873,513 B2 | 3/2005 | Anthony |
| 6,894,884 B2 | 5/2005 | Anthony, Jr. et al. |
| 6,950,293 B2 | 9/2005 | Anthony |
| 6,954,346 B2 | 10/2005 | Anthony |
| 6,995,983 B1 | 2/2006 | Anthony et al. |
| 7,042,303 B2 | 5/2006 | Anthony et al. |
| 7,042,703 B2 | 5/2006 | Anthony et al. |
| 7,050,284 B2 | 5/2006 | Anthony |
| 7,106,570 B2 | 9/2006 | Anthony, Jr. et al. |
| 7,110,227 B2 | 9/2006 | Anthony et al. |
| 7,110,235 B2 | 9/2006 | Anthony, Jr. et al. |
| 7,113,383 B2 * | 9/2006 | Anthony et al. ............ 361/118 |
| 7,141,899 B2 | 11/2006 | Anthony et al. |
| 7,180,718 B2 | 2/2007 | Anthony et al. |
| 7,193,831 B2 | 3/2007 | Anthony |
| 7,224,564 B2 | 5/2007 | Anthony |
| 7,262,949 B2 | 8/2007 | Anthony |
| 7,274,549 B2 | 9/2007 | Anthony |
| 7,301,748 B2 | 11/2007 | Anthony et al. |
| 7,321,485 B2 | 1/2008 | Anthony et al. |
| 7,336,467 B2 | 2/2008 | Anthony et al. |
| 7,336,468 B2 | 2/2008 | Anthony et al. |
| 2001/0001989 A1 | 5/2001 | Smith |
| 2001/0002105 A1 | 5/2001 | Brandelik et al. |
| 2001/0002624 A1 | 6/2001 | Khandros et al. |
| 2001/0008288 A1 | 7/2001 | Kimura et al. |
| 2001/0008302 A1 | 7/2001 | Murakami et al. |
| 2001/0008478 A1 | 7/2001 | McIntosh et al. |
| 2001/0008509 A1 | 7/2001 | Watanabe |
| 2001/0009496 A1 | 7/2001 | Kappel et al. |
| 2001/0010444 A1 | 8/2001 | Pahl et al. |
| 2001/0011763 A1 | 8/2001 | Ushijima et al. |
| 2001/0011934 A1 | 8/2001 | Yamamoto |
| 2001/0011937 A1 | 8/2001 | Satoh et al. |
| 2001/0013626 A1 | 8/2001 | Fujii |
| 2001/0015643 A1 | 8/2001 | Goldfine et al. |
| 2001/0015683 A1 | 8/2001 | Mikami et al. |
| 2001/0017576 A1 | 8/2001 | Kondo et al. |
| 2001/0017579 A1 | 8/2001 | Kurata |
| 2001/0019869 A1 | 9/2001 | Hsu |
| 2001/0020879 A1 | 9/2001 | Takahashi et al. |
| 2001/0021097 A1 | 9/2001 | Ohya et al. |
| 2001/0022547 A1 | 9/2001 | Murata et al. |
| 2001/0023983 A1 | 9/2001 | Kobayashi et al. |
| 2001/0024148 A1 | 9/2001 | Gerstenberg et al. |
| 2001/0028581 A1 | 10/2001 | Yanagisawa et al. |
| 2001/0029648 A1 | 10/2001 | Ikada et al. |
| 2001/0031191 A1 | 10/2001 | Korenaga |
| 2001/0033664 A1 | 10/2001 | Poux et al. |
| 2001/0035801 A1 | 11/2001 | Gilbert |
| 2001/0035802 A1 | 11/2001 | Kadota |
| 2001/0035805 A1 | 11/2001 | Suzuki et al. |
| 2001/0037680 A1 | 11/2001 | Buck et al. |
| 2001/0039834 A1 | 11/2001 | Hsu |
| 2001/0040484 A1 | 11/2001 | Kim |
| 2001/0040487 A1 | 11/2001 | Ikata et al. |
| 2001/0040488 A1 | 11/2001 | Gould et al. |
| 2001/0041305 A1 | 11/2001 | Sawada et al. |
| 2001/0043100 A1 | 11/2001 | Tomita et al. |
| 2001/0043129 A1 | 11/2001 | Hidaka et al. |
| 2001/0043450 A1 | 11/2001 | Seale et al. |
| 2001/0043453 A1 | 11/2001 | Narwankar et al. |
| 2001/0045810 A1 | 11/2001 | Poon et al. |
| 2001/0048581 A1 | 12/2001 | Anthony et al. |
| 2001/0048593 A1 | 12/2001 | Yamauchi et al. |
| 2001/0048906 A1 | 12/2001 | Lau et al. |
| 2001/0050550 A1 | 12/2001 | Yoshida et al. |
| 2001/0050600 A1 | 12/2001 | Anthony et al. |
| 2001/0050837 A1 | 12/2001 | Stevenson et al. |
| 2001/0052833 A1 | 12/2001 | Enokihara et al. |
| 2001/0054512 A1 | 12/2001 | Belau et al. |
| 2001/0054734 A1 | 12/2001 | Koh et al. |
| 2001/0054756 A1 | 12/2001 | Horiuchi et al. |
| 2001/0054936 A1 | 12/2001 | Okada et al. |
| 2002/0000521 A1 | 1/2002 | Brown |

| | | | | | |
|---|---|---|---|---|---|
| 2002/0000583 A1 | 1/2002 | Kitsukawa et al. | JP | 01-120805 | 5/1989 |
| 2002/0000821 A1 | 1/2002 | Haga et al. | JP | 01-212415 | 8/1989 |
| 2002/0000893 A1 | 1/2002 | Hidaka et al. | JP | 02-267879 | 11/1990 |
| 2002/0000895 A1 | 1/2002 | Takahashi et al. | JP | 03-018112 | 1/1991 |
| 2002/0003454 A1 | 1/2002 | Sweeney et al. | JP | 03-71614 | 3/1991 |
| 2002/0005880 A1 | 1/2002 | Ashe et al. | JP | 5-283284 | 10/1993 |
| 2002/0024787 A1 | 2/2002 | Anthony | JP | 05-299292 | 11/1993 |
| 2002/0027263 A1 | 3/2002 | Anthony et al. | JP | 06-053048 | 2/1994 |
| 2002/0027760 A1 | 3/2002 | Anthony | JP | 06-053049 | 2/1994 |
| 2002/0044401 A1 | 4/2002 | Anthony et al. | JP | 06-053075 | 2/1994 |
| 2002/0075096 A1 | 6/2002 | Anthony | JP | 06-053077 | 2/1994 |
| 2002/0079116 A1 | 6/2002 | Anthony | JP | 06-053078 | 2/1994 |
| 2002/0089812 A1 | 7/2002 | Anthony et al. | JP | 06-084695 | 3/1994 |
| 2002/0113663 A1 | 8/2002 | Anthony et al. | JP | 06-151014 | 5/1994 |
| 2002/0122286 A1 | 9/2002 | Anthony | JP | 06-151244 | 5/1994 |
| 2002/0131231 A1 | 9/2002 | Anthony | JP | 06-151245 | 5/1994 |
| 2002/0149900 A1 | 10/2002 | Anthony | JP | 6-302471 | 10/1994 |
| 2002/0158515 A1 | 10/2002 | Anthony, Jr. et al. | JP | 06-325977 | 11/1994 |
| 2002/0186100 A1 | 12/2002 | Anthony et al. | JP | 07-235406 | 9/1995 |
| 2003/0029632 A1 | 2/2003 | Anthony, Jr. et al. | JP | 07-235852 | 9/1995 |
| 2003/0029635 A1 | 2/2003 | Anthony, Jr. et al. | JP | 07-240651 | 9/1995 |
| 2003/0048029 A1 | 3/2003 | DeDaran et al. | JP | 08-124795 | 5/1996 |
| 2003/0067730 A1 | 4/2003 | Anthony et al. | JP | 08-163122 | 6/1996 |
| 2003/0161086 A1 | 8/2003 | Anthony | JP | 08-172025 | 7/1996 |
| 2003/0202312 A1 | 10/2003 | Anthony et al. | JP | 8172025 | 7/1996 |
| 2003/0206388 A9 | 11/2003 | Anthony et al. | JP | 09-232185 | 9/1997 |
| 2003/0210125 A1 | 11/2003 | Anthony | JP | 9-266130 | 10/1997 |
| 2003/0231451 A1 | 12/2003 | Anthony | JP | 09-284077 | 10/1997 |
| 2003/0231456 A1 | 12/2003 | Anthony et al. | JP | 09-284078 | 10/1997 |
| 2004/0004802 A1 | 1/2004 | Anthony et al. | JP | 9-294041 | 11/1997 |
| 2004/0008466 A1 | 1/2004 | Anthony et al. | JP | 11-21456 | 8/1999 |
| 2004/0027771 A1 | 2/2004 | Anthony | JP | 11-214256 | 8/1999 |
| 2004/0032304 A1 | 2/2004 | Anthony et al. | JP | 11-223396 | 8/1999 |
| 2004/0054426 A1 | 3/2004 | Anthony | JP | 11-294908 | 10/1999 |
| 2004/0085699 A1 | 5/2004 | Anthony | JP | 11-305302 | 11/1999 |
| 2004/0105205 A1 | 6/2004 | Anthony et al. | JP | 11-319222 | 11/1999 |
| 2004/0124949 A1 | 7/2004 | Anthony et al. | JP | 11-345273 | 12/1999 |
| 2004/0130840 A1 | 7/2004 | Anthony | WO | WO 91/15046 | 10/1991 |
| 2004/0218332 A1 | 11/2004 | Anthony et al. | WO | WO 97/20332 | 6/1997 |
| 2004/0226733 A1 | 11/2004 | Anthony et al. | WO | WO 97/43786 | 11/1997 |
| 2005/0016761 A9 | 1/2005 | Anthony, Jr. et al. | WO | WO 98/45921 | 10/1998 |
| 2005/0018374 A1 | 1/2005 | Anthony | WO | WO 99/04457 | 1/1999 |
| 2005/0063127 A1 | 3/2005 | Anthony | WO | WO 99/19982 | 4/1999 |
| 2005/0248900 A1 | 11/2005 | Anthony | WO | WO 99/37008 | 7/1999 |
| 2005/0286198 A1 | 12/2005 | Anthony et al. | WO | WO 99/52210 | 10/1999 |
| 2006/0023385 A9 | 2/2006 | Anthony et al. | WO | WO 00/16446 | 3/2000 |
| 2006/0139836 A1 | 6/2006 | Anthony | WO | WO 00/65740 | 11/2000 |
| 2006/0139837 A1 | 6/2006 | Anthony et al. | WO | WO 00/74197 | 12/2000 |
| 2006/0193051 A1 | 8/2006 | Anthony et al. | WO | WO 00/77907 | 12/2000 |
| 2006/0203414 A1 | 9/2006 | Anthony | WO | 01/06631 | 1/2001 |
| 2007/0019352 A1 | 1/2007 | Anthony | WO | WO 01/10000 | 2/2001 |
| 2007/0047177 A1 | 3/2007 | Anthony | WO | WO 01/41232 | 6/2001 |
| 2007/0057359 A1 | 3/2007 | Anthony et al. | WO | WO 01/41233 | 6/2001 |
| 2007/0103839 A1 | 5/2007 | Anthony et al. | WO | WO 01/45119 | 6/2001 |
| 2007/0109709 A1 | 5/2007 | Anthony et al. | WO | WO 01/71908 | 9/2001 |
| | | | WO | WO 01/75916 | 10/2001 |
| FOREIGN PATENT DOCUMENTS | | | WO | WO 01/84581 | 11/2001 |
| | | | WO | WO 01/86774 | 11/2001 |
| DE | 198 57 043 C1 | 3/2000 | WO | WO 02/59401 | 1/2002 |
| EP | 0623363 | 11/1994 | WO | WO 02/11160 | 2/2002 |
| EP | 98915364 | 11/1994 | WO | WO 02/15360 | 2/2002 |
| EP | 0776016 | 5/1997 | WO | WO 02/27794 | 4/2002 |
| EP | 0933871 | 8/1999 | WO | WO 02/33798 | 4/2002 |
| EP | 1022751 | 7/2000 | WO | WO 02/45233 | 6/2002 |
| EP | 1024507 | 8/2000 | WO | WO 02/065606 | 8/2002 |
| EP | 1061535 | 12/2000 | WO | WO 02/080330 | 10/2002 |
| FR | 2765417 | 12/1998 | WO | WO 03/005541 | 1/2003 |
| FR | 2808135 | 10/2001 | WO | WO 2004/070905 | 8/2004 |
| GB | 2217136 | 4/1988 | WO | WO 2005/002018 | 1/2005 |
| GB | 2341980 | 3/2000 | WO | WO 2005/015719 | 2/2005 |
| JP | 57-172130 | 10/1982 | WO | WO 2005/065097 | 7/2005 |
| JP | 63-269509 | 11/1988 | WO | WO 2006/093830 | 9/2006 |
| JP | 1-27251 | 1/1989 | WO | WO 2006/093831 | 9/2006 |

| | | |
|---|---|---|
| WO | WO 2006/099297 | 9/2006 |
| WO | WO 2006/104613 | 10/2006 |
| WO | WO 2007/103965 | 9/2007 |

OTHER PUBLICATIONS

PCT International Search Report for PCT/US01/44681, Jan. 2, 2003.
Greb, "An Intuitive Approach to EM Fields," EMC Test & Design, Jan. 1991, pp. 30-33, Jan. 1, 1994.
Greb, "An Intuitive Approach to EM Coupling," EMC Test & Design, Dec. 1, 1993, pp. 20-25.
Sakamoto, "Noiseproof Power Supplies: What's Important in EMI Removal Fitters?" JEE, Jun. 1, 1986, pp. 80-85.
Montrose, "Analysis on Loop Area Trace Radiated Emissions from Decoupling Capacitor Placement on Printed Circuit Boards," IEEE, Jan. 1, 1999, pp. 423-428.
Miyoshi, "Surface Mounted Distributed Constant Type Noise Filter," IEEE, Jan. 1, 1999, pp. 157-160.
Shigeta et al., "Improved EMI Performance by Use of a Three-Terminal-Capacitor Applied to an IC Power Line," IEEE, Jan. 1, 1999, pp. 161-164.
PCT International Search Report for PCT/US99/07653, Jul. 19, 1999.
IPER for PCT/US99/07653, Oct. 13, 1999.
U.S. Appl. No. 10/479,506, Claims 1-46 from Preliminary Amendment filed Dec. 10, 2003.
U.S. Appl. No. 10/189,339, Claims 1-41 from Preliminary Amendment filed Oct. 28, 2003.
U.S. Appl. No. 10/443,792, Claims 1-41 from Preliminary Amendment filed Oct. 28, 2003.
PCT International Search Report for PCT/US98/06962, Aug. 19, 1998.
PCT International Search Report for PCT/US99/01040, Apr. 19, 1999.
PCT International Search Report for PCT/US00/11409, Sep. 18, 2000.
PCT International Search Report for PCT/US00/14626, Sep. 13, 2000.
PCT International Search Report for PCT/US00/16518, Nov. 8, 2000.
PCT International Search Report for PCT/US00/21178, Dec. 28, 2000.
Fang et al., "Conductive Polymers Prolong Circuit Life," Design News, date unknown, 3 pages.
Carpenter, Jr. et al., "A New Approach to TVSS Design," Power Quality Assurance, Sep./Oct. 1996 p. 60-63, Sep. 1, 1996.
Raychem, "Polyswitch Resettable Fuses," Circuit Protection Databook, Jan. 1, 1996, pp. 11-18.
PCT International Search Report for PCT/US01/41720, Dec. 28, 2001.
PCT International Search Report for PCT/US01/09185, Jun. 13, 2001.
Polka et al., "Package-Level Interconnect Design for Optimum Electrical Performance," Intel Technology Journal Q3, 2000, pp. 1-17.
PCT International Search Report for PCT/US01/43418, May 10, 2002.
PCT International Search Report for PCT/US01/32480, Mar. 13, 2002.
PCT International Search Report for PCT/US02/10302, Aug. 19, 2002.
PCT International Search Report for PCT/US02/21238, Feb. 28, 2003.
PCT International Search Report for PCT/US01/13911, Mar. 18, 2002.
PCT International Search Report for PCT/US91/02150, Jul. 16, 1991.
PCT International Search Report for PCT/US01/03792, Jun. 28, 2001.
"Johanson Dielectrics, Inc. Licenses X2Y Circuit Conditioning Technology," Press Release, Dec. 16, 1998, 1 page.
Beyne et al., "PSGA—An innovative IC package for single and multichip designs," Components, Mar. 1, 1997, pp. 6-9.
"EMC Design for Brush Commutated DC Electric Motors," Sep. 15, 1997, pp. 1-2.
"Tomorrow's Capacitors," Components, Apr. 1, 1996, No. 4, p. 3.
Mason, "Valor—Understanding Common Mode Noise," Mar. 30, 1998, pp. 1-7.
Anthony Anthony et al., Pending specification, claims, figures for U.S. Appl. No. 10/237,079, Claims 21-81; filed Sep. 9, 2002.
David Anthony et al., Pending specification, claims, figures for U.S. Appl. No. 10/766,000, Claims 1-63; filed Jan. 29, 2004.
William Anthony, Pending specification, claims, figures for U.S. Appl. No. 10/399,630, Claims 1-35; filed Aug. 27, 2003.
Anthony Anthony et al., Pending specification, claims, figures for U.S. Appl. No. 10/432,840, Claims 1-39; filed May 28, 2003.
William Anthony, Pending specification, claims, figures for U.S. Appl. No. 10/443,482, Claims 1-25; filed Jun. 12, 2003.
Anthony Anthony et al., Pending specification, claims, figures for U.S. Appl. No. 10/435,199, Claims 1-32; filed May 12, 2003.
Anthony Anthony et al., Pending specification, claims, figures for U.S. Appl. No. 10/115,159, Claims 1-31; filed Apr. 2, 2002.
Anthony Anthony et al., Pending specification, claims, figures for U.S. Appl. No. 10/189,338, Claims 1-69; filed Jul. 2, 2002.
Anthony Anthony et al., Pending specification, claims, figures for U.S. Appl. No. 10/189,339, Claims 1-41; filed Jul. 2, 2002.
Anthony Anthony et al., Pending specification, claims, figures for U.S. Appl. No. 10/479,506, Claims 1-46; filed Dec. 10, 2003.
Anthony Anthony, Pending specification, claims, figures for U.S. Appl. No. 10/443,764, Claims 26-40; filed Sep. 16, 2003.
Anthony Anthony, Pending specification, claims, figures for U.S. Appl. No. 10/443,792, Claims 1-41; May 23, 2003.
Anthony Anthony, Pending specification, claims, figures for U.S. Appl. No. 10/443,788, Claims 1; 21-45; filed May 23, 2003.
Anthony Anthony et al., Pending specification, claims, figures for U.S. Appl. No. 10/443,778, Claims 1; 21-59; filed May 23, 2003.
Anthony Anthony et al., Pending specification, claims, figures for U.S. Appl. No. 10/460,361, Claims 1-16; filed Jun. 13, 2003.
Anthony Anthony et al., Pending specification, claims, figures for U.S. Appl. No. 10/705,962, Claims 19-33; filed May 25, 2005.
Anthony Anthony, Pending specification, claims, figures for U.S. Appl. No. 10/369,335, Claims 1-20; Feb. 18, 2003.
Anthony Anthony et al., Pending specification, claims, figures for U.S. Appl. No. 09/647,648, Claims 1-48; filed Nov. 17, 2000.
Anthony Anthony, Pending specification, claims, figures for U.S. Appl. No. 10/328,942, Claims 1-20; filed Dec. 23, 2002.
Anthony Anthony et al., Pending specification, claims, figures for U.S. Appl. No. 09/632,048, Claims 1-20; filed Aug. 3, 2000.
Anthony Anthony et al., Pending specification, claims, figures for U.S. Appl. No. 09/996,355, Claims 1-73; filed Nov. 29, 2001.
Willian Anthony, Pending specification, claims, figures for U.S. Appl. No. 10/023,467, Claims 1-20; filed Dec. 17, 2001.
Weir et al., "DesignCon 2005, High Performance FPGA Bypass Networks", Jan. 1, 2005.
Pending claims 1-40 and figures (3 pages) for U.S. Appl. No. 10/399,590; the specification is contained in WO 02/33798, filed Oct. 17, 2001, which is the published version of PCT/US01/32480, which is Neifeld Reference: X2YA0015UPCT-US, which is reference F-063 in the Information Disclosure Statement filed Apr. 23, 2004, Apr. 25, 2002.
PCT International Search Report for PCT/US04/00218, Feb. 11, 2005.
PCT International Search Report for PCT/US04/14539, Feb. 18, 2005.
Australian Patent Office Examination Report for SG 200303041-8; Neifeld Ref: X2YA0025UPCT-SG, Mar. 24, 2005.
PCT International Search Report for PCT/US04/18938, Apr. 11, 2005.
Muccioli, "EMC Society Seattle and Oregon Chapters—New X2Y Filter Technology Emerges as Singles Component Solution for Noise Suppression", Nov. 2000.
PCT Corrected IPER for PCT/US04/00218, Sep. 27, 2005.
Supplementary Partial European Search Report EP 99916477, Nov. 8, 2005.
Supplementary European Search Report EP 98915364, Oct. 27, 2005.

PCT ISR for PCT/US04/39777, Dec. 9, 2005.
EP Examination Report for 99916477.5-2215, May 8, 2006.
Australian Examiner's First Report on Patent Application No. 2002320289; mailed Dec. 4, 2006.
Letter from Australian examiner dated Jan. 23, 2007 explaining error in citation contained in item O-096 from this reference citation; the correct reference is cited in this reference citation list: F-039.
Anthony Anthony et al., Pending specification, claims, figures for U.S. Appl. No. 10/189,338, Claims 1-69; filed Jul. 2, 2002.
PCT International Search Report PCT/US06/06609, Oct. 31, 2007.
PCT Written Opinion of the International Search Authority PCT/US06/06609, Oct. 31, 2007.
PCT Written Opinion of the International Search Authority, PCT/US2007/063463.
PCT International Search Report PCT/US2007/063463, Jul. 24, 2007.
PCT International Search Report, PCT/US06/06609, Oct. 31, 2007
PCT International Search Report PCT/US06/06608, Jun. 12, 2008
PCT Written Opinion of the International Search Authority PCT/US06/06608, Jun. 12, 2008.
PCT International Search Report PCT/US06/06607, Jun. 12, 2008.
PCT Written Opinion of the International Search Authority PCT/US06/06607, Jun. 12, 2008.
PCT International Search Report PCT/US06/08901, Jun. 17, 2008.
PCT Written Opinion of the International Search Authority PCT/US06/08901, Jun. 17, 2008.
European Search Report EP 07 01 9451, Jun. 6, 2008.

* cited by examiner

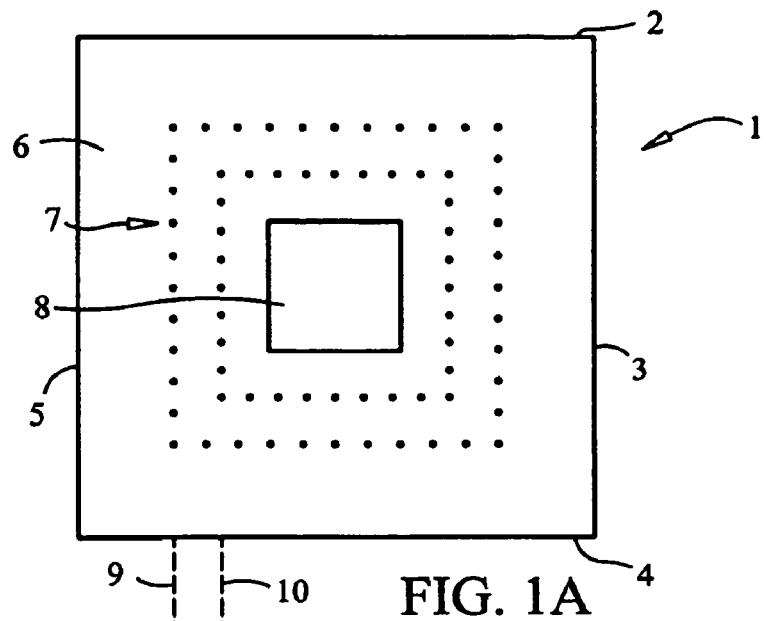
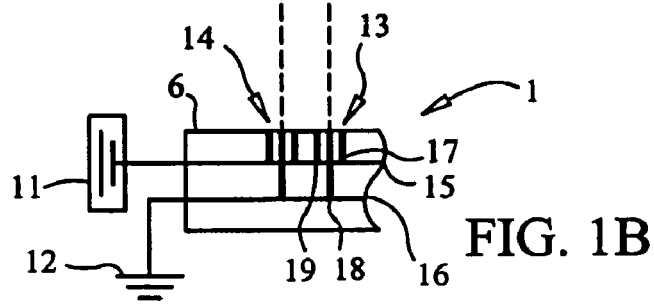
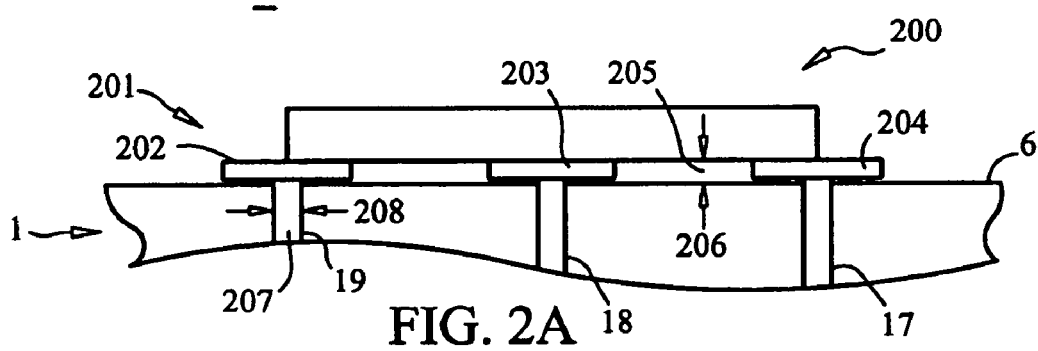
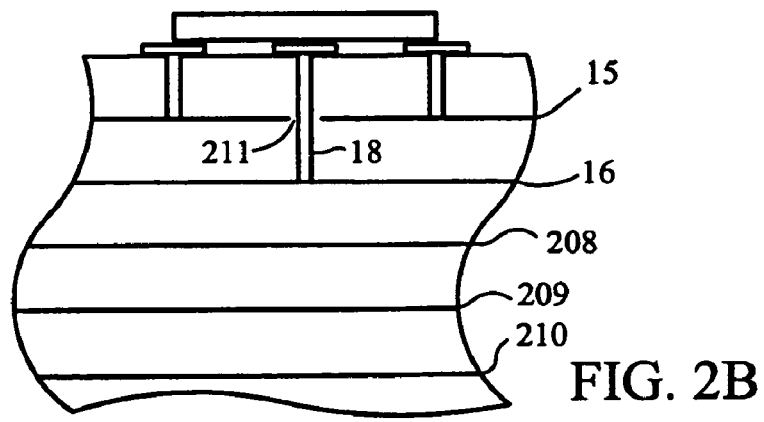

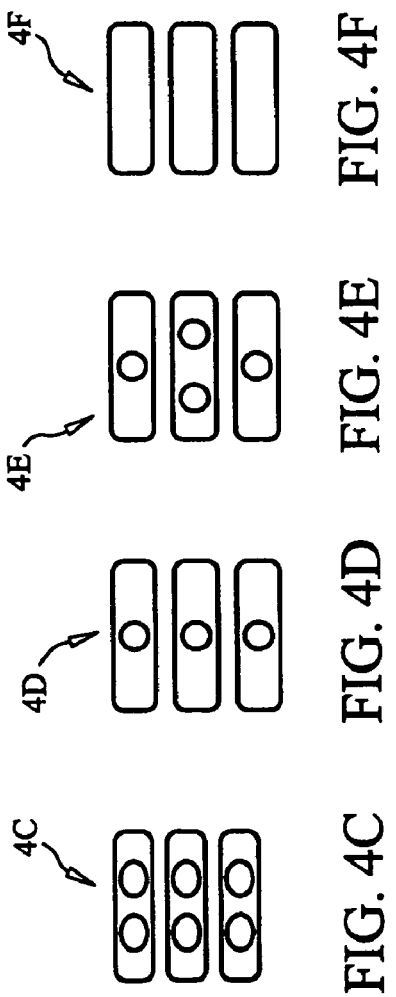
FIG. 4A
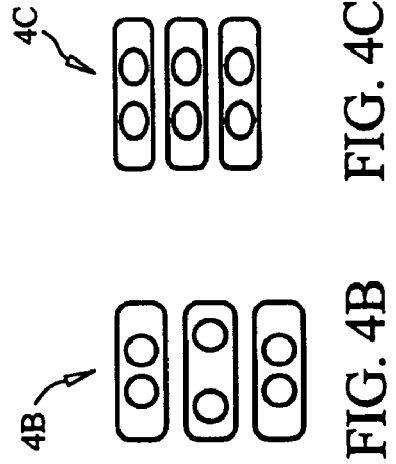
FIG. 4B
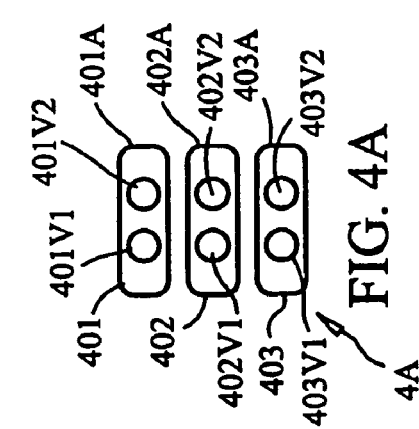
FIG. 4C
FIG. 4D
FIG. 4E
FIG. 4F
FIG. 4G
FIG. 4H
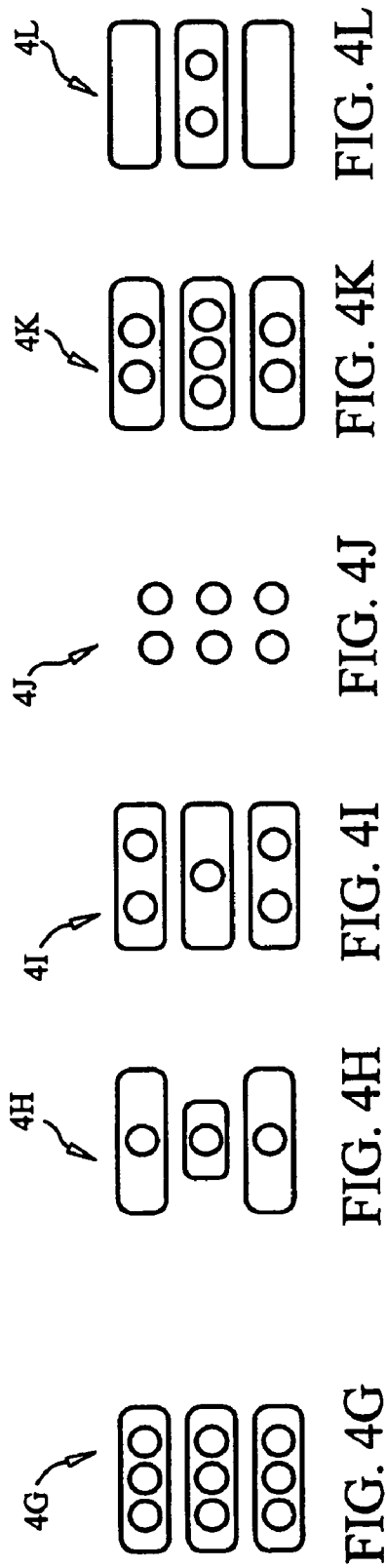
FIG. 4I
FIG. 4J
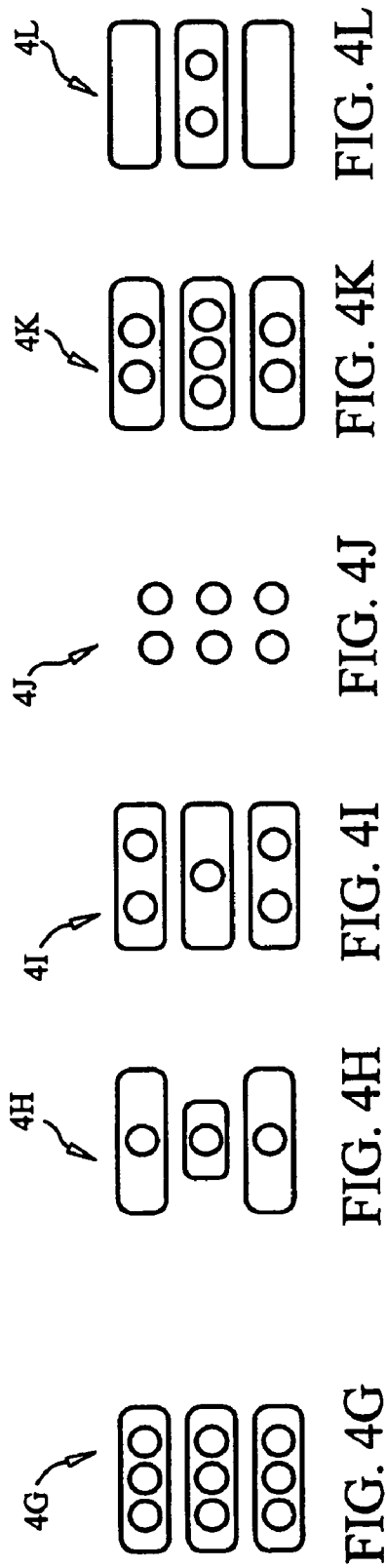
FIG. 4K
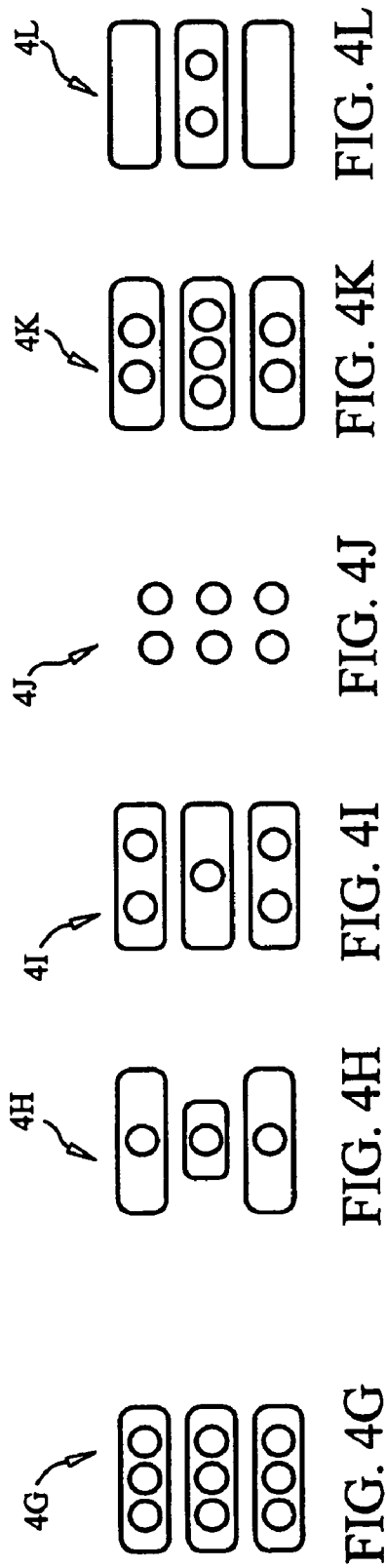
FIG. 4L

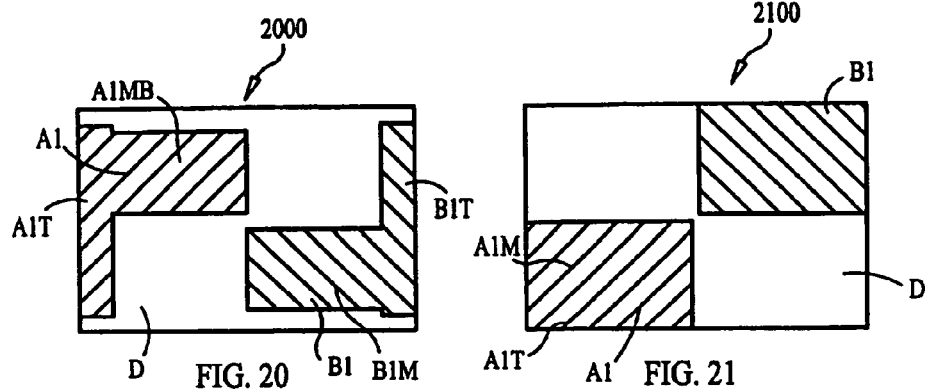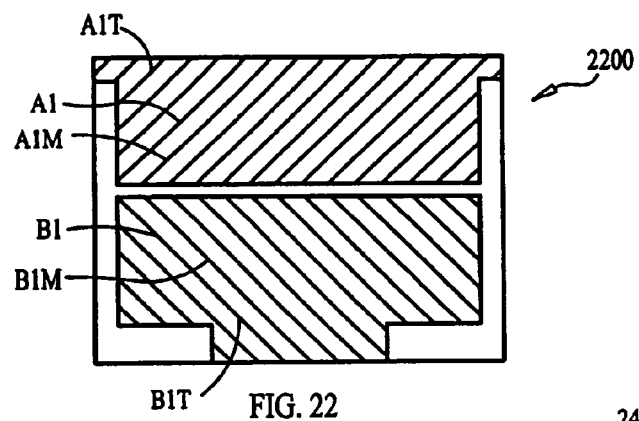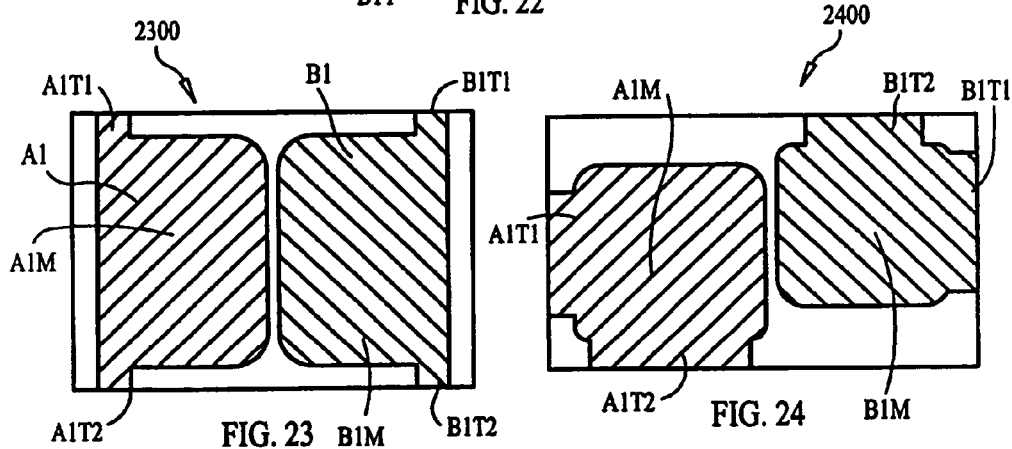

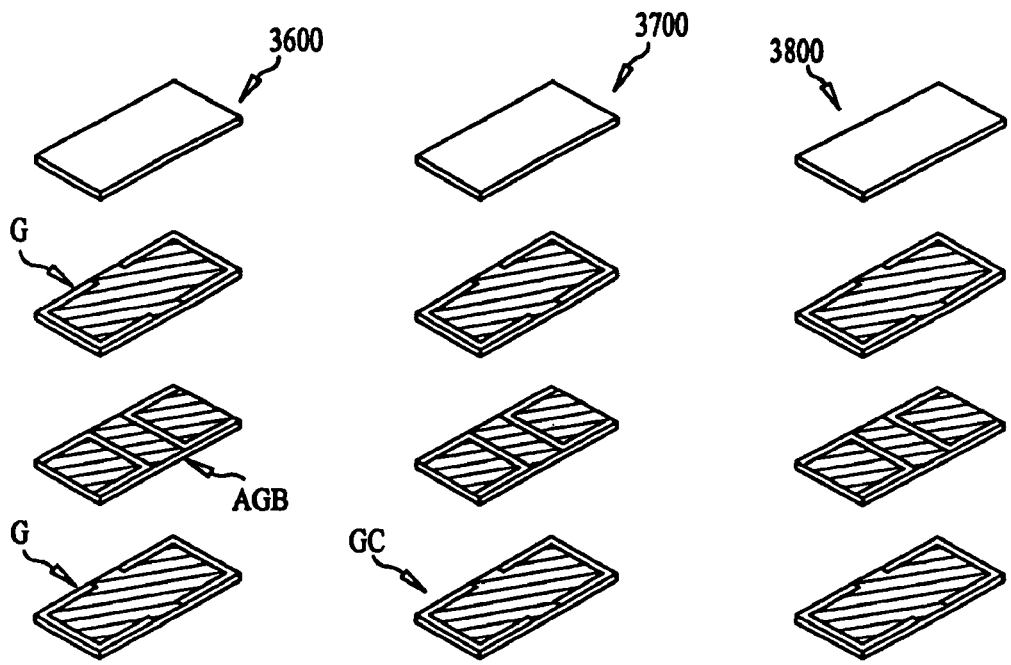
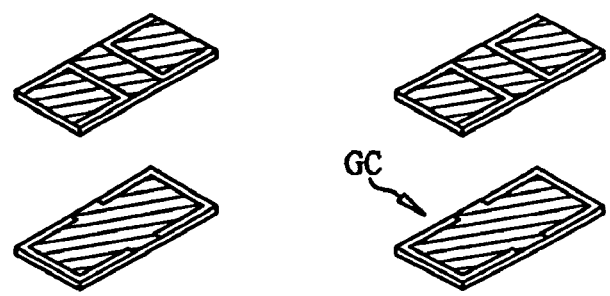
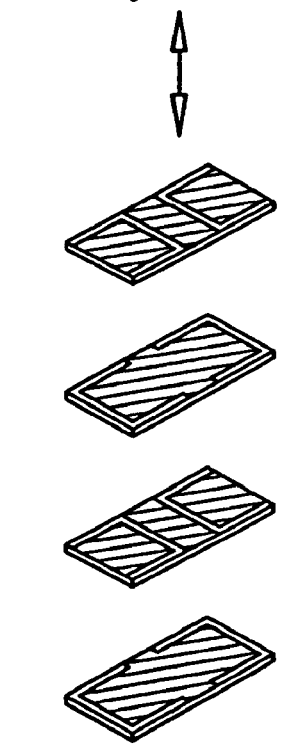
FIG. 36
FIG. 37
FIG. 38

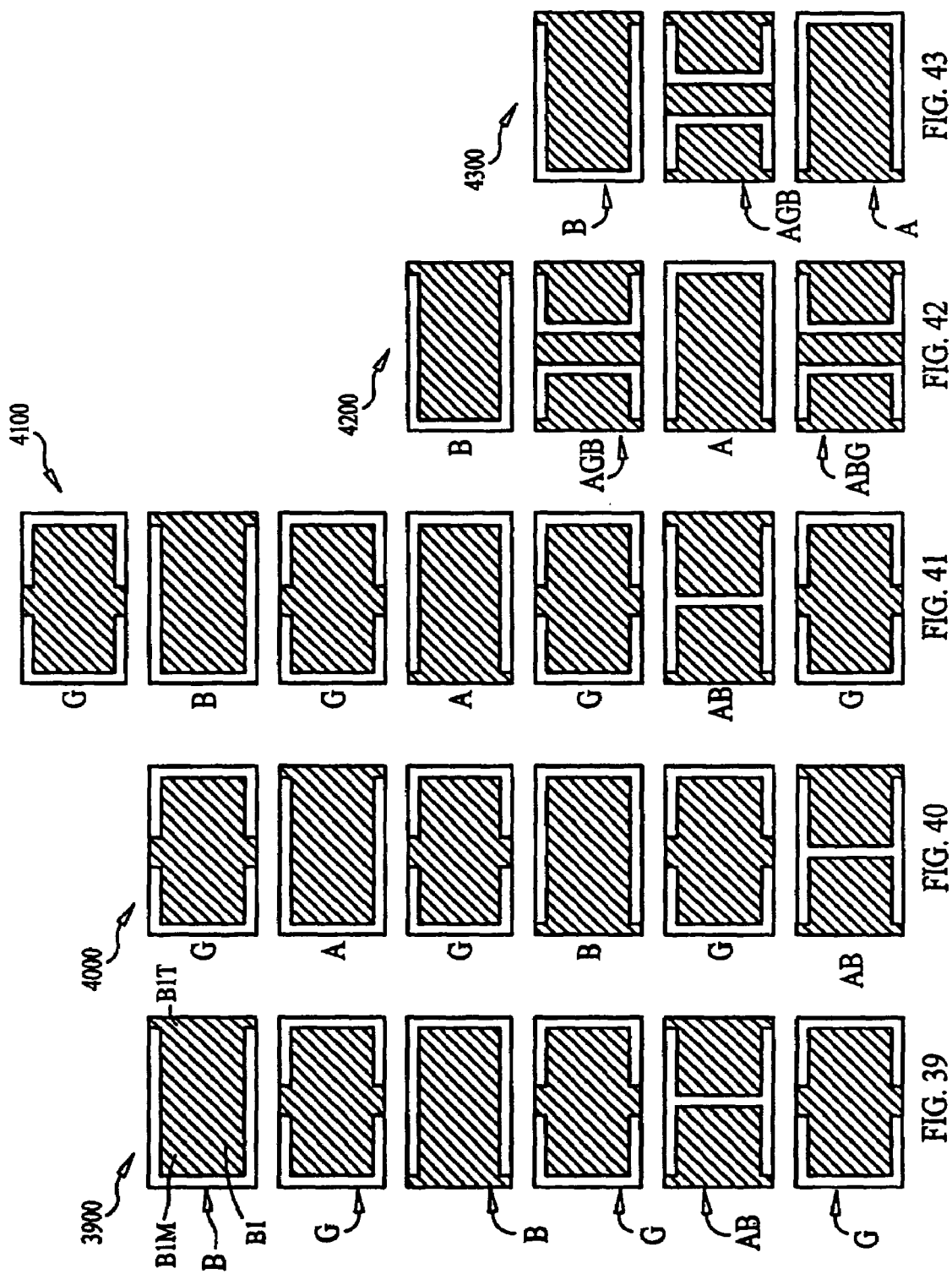

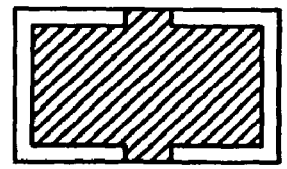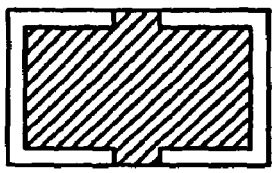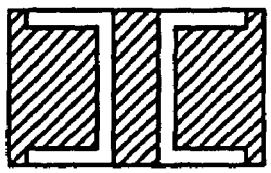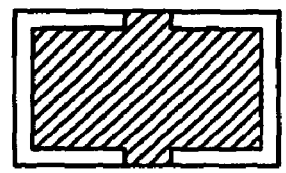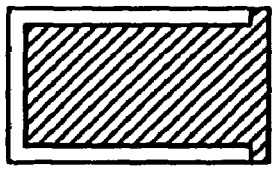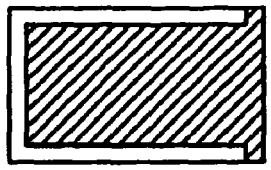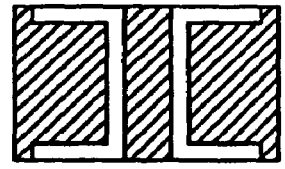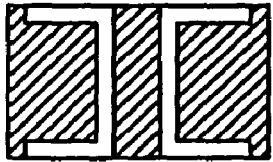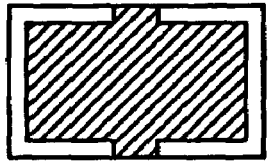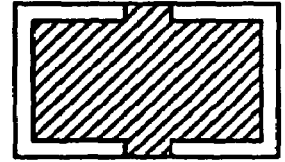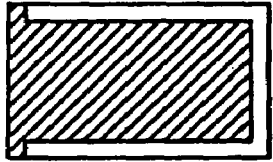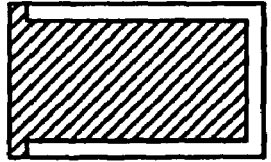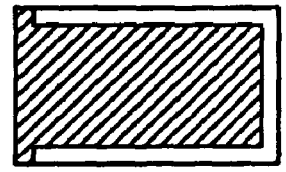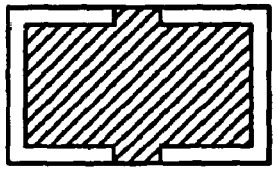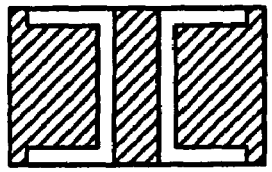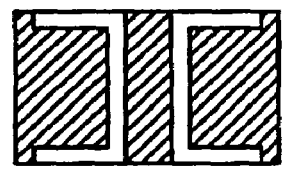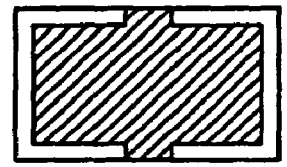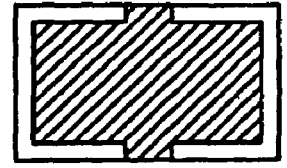
FIG. 44　　　FIG. 45　　　FIG. 46

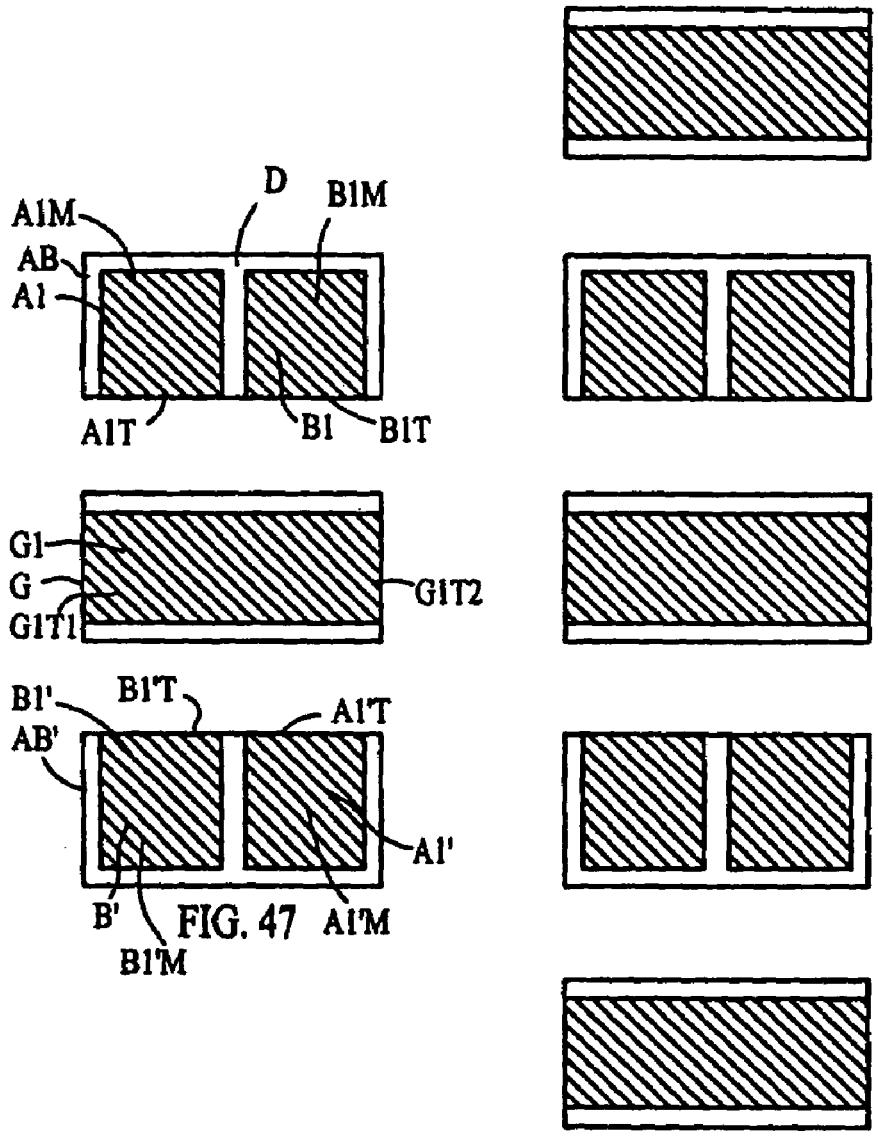
FIG. 47
FIG. 48
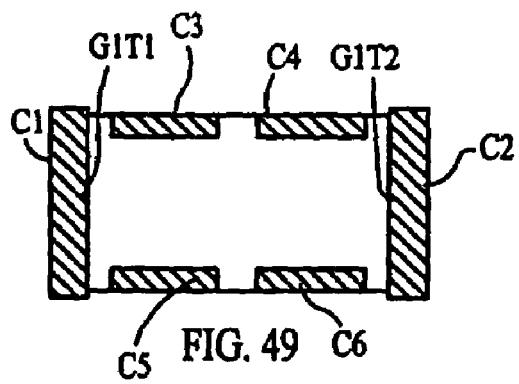
FIG. 49

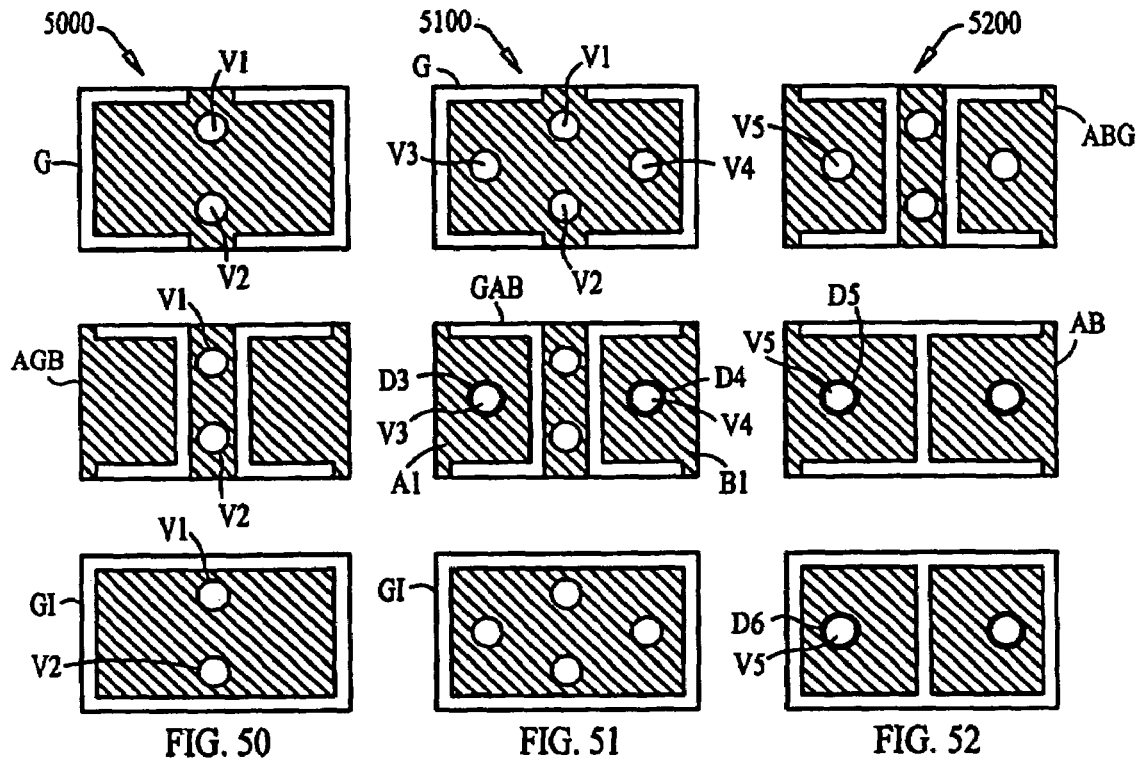
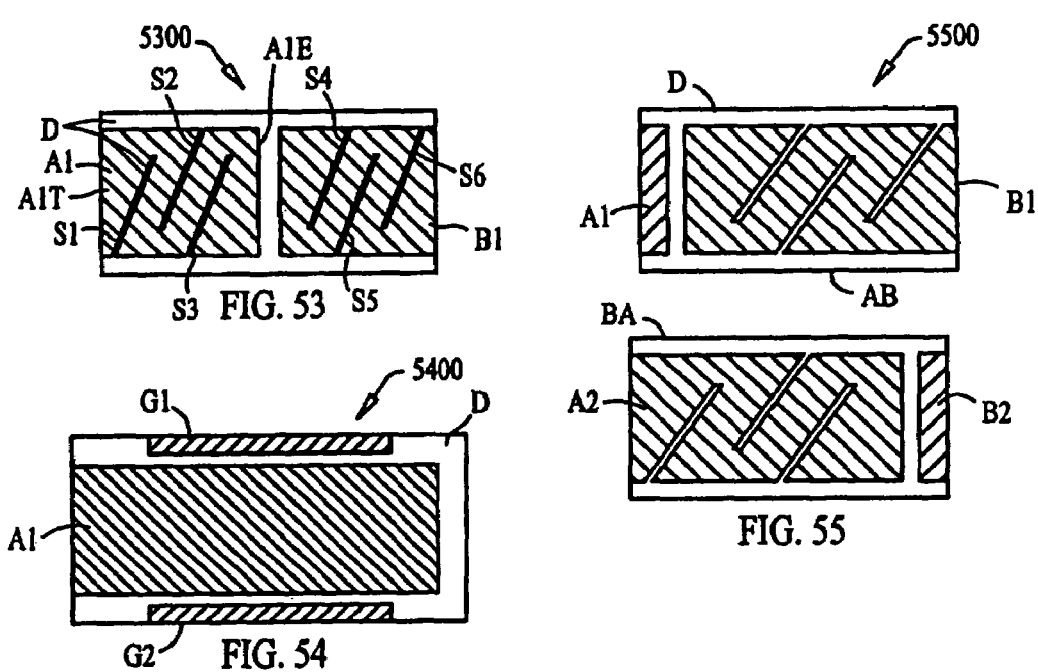
FIG. 50  FIG. 51  FIG. 52
FIG. 53  FIG. 54  FIG. 55

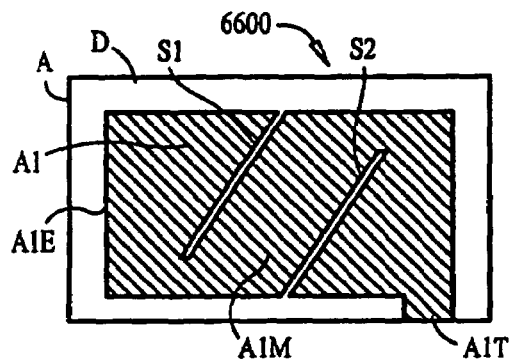
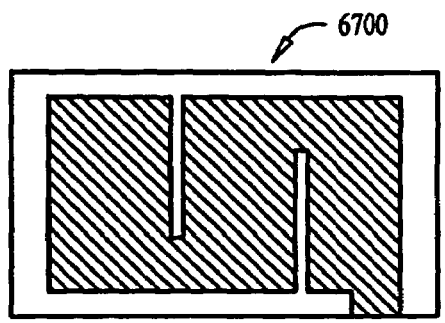
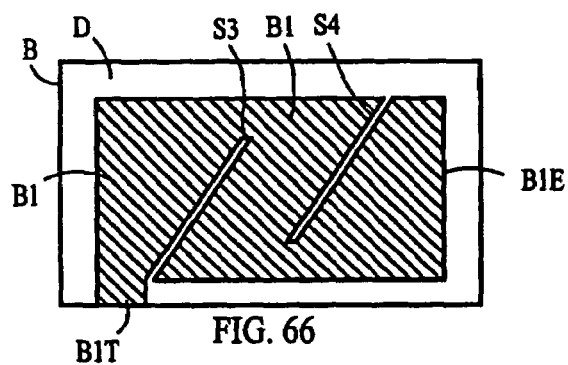
FIG. 66
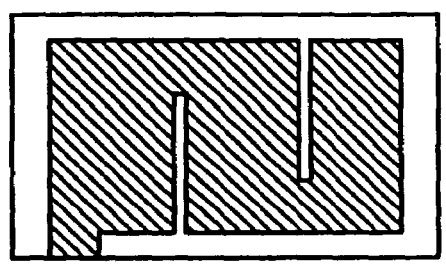
FIG. 67
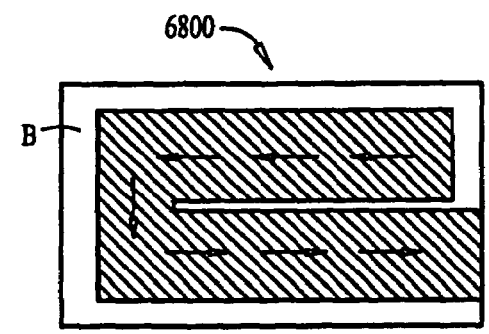
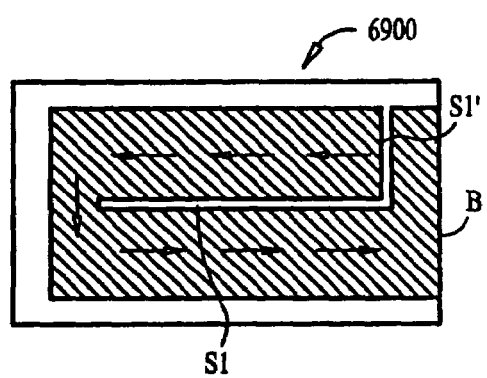
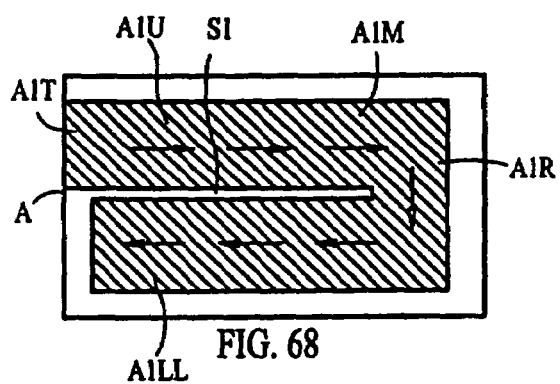
FIG. 68
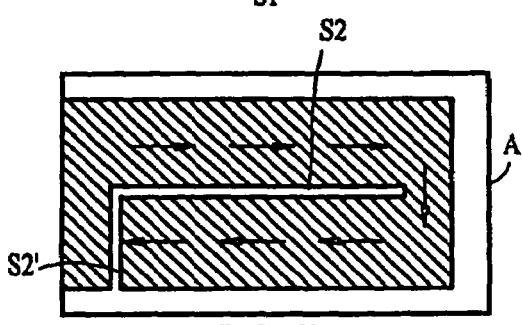
FIG. 69

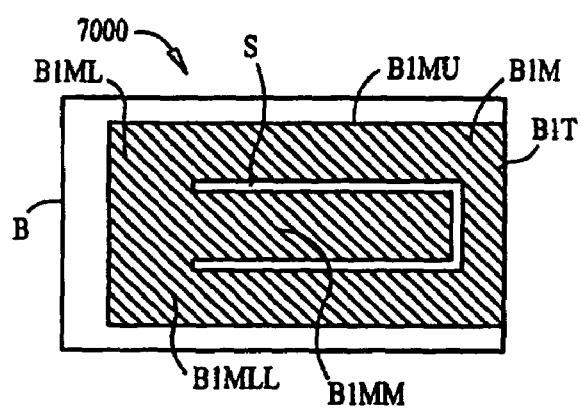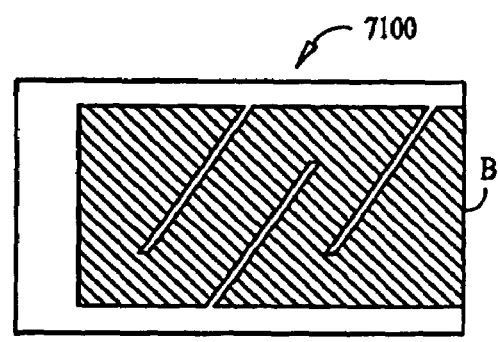
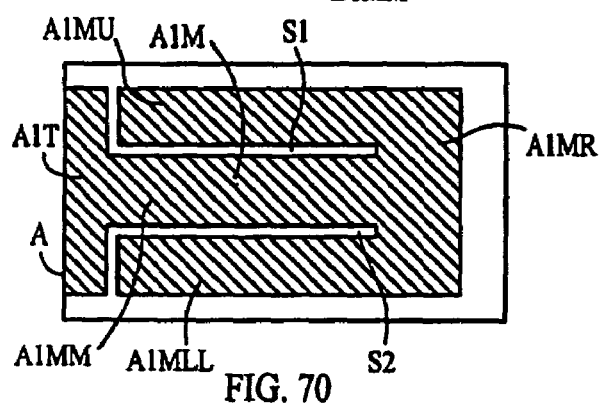
FIG. 70
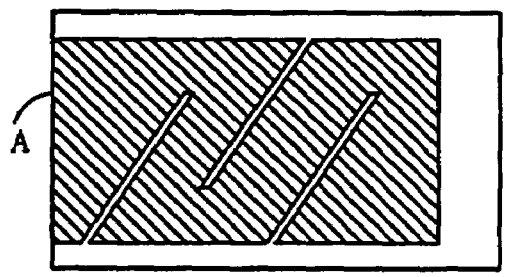
FIG. 71

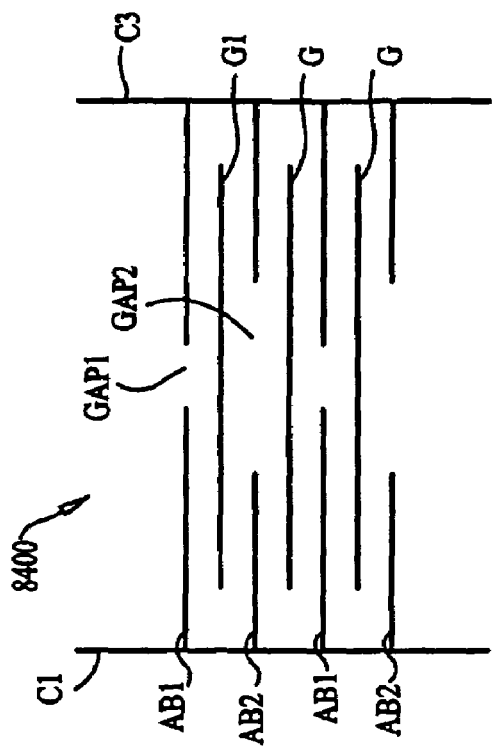
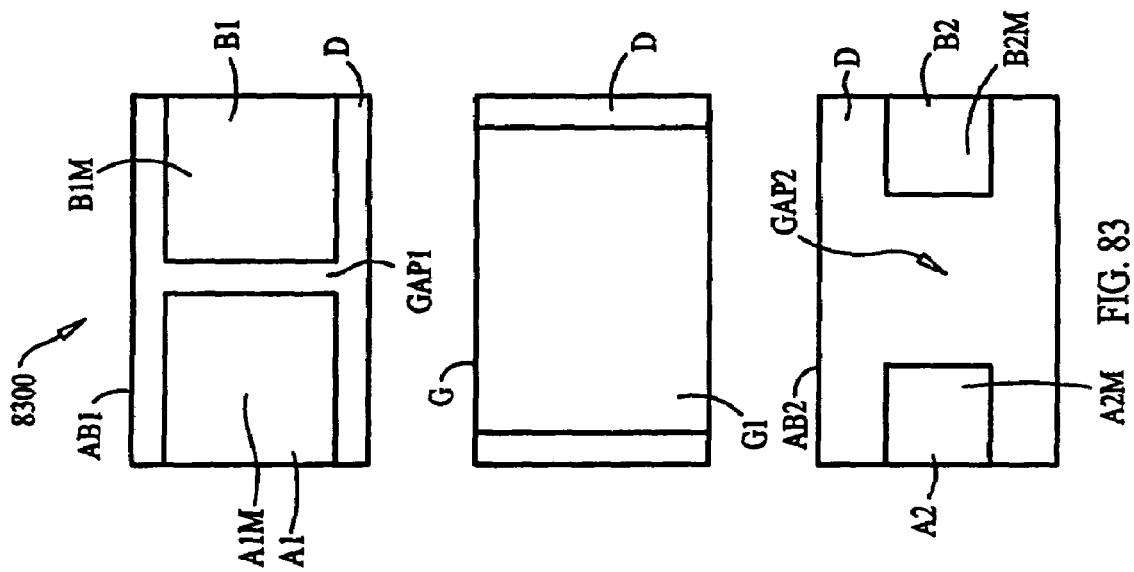
FIG. 84
FIG. 83

    
    
   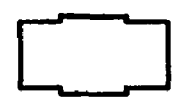 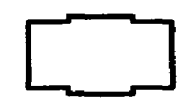
    
FIG. 92    FIG. 93
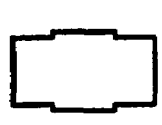 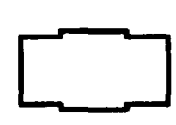
FIG. 94    FIG. 95
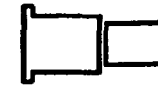
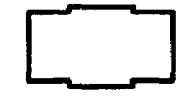
FIG. 96

CONDITIONER WITH COPLANAR CONDUCTORS

CROSS REFERENCE TO RELATED APPLICATIONS

This application claims priority to the U.S. provisional applications: 60/661,002, filed Mar. 14, 2005; 60/668,992, filed Apr. 7, 2005; 60/671,107, filed Apr. 14, 2005; 60/671,532, filed Apr. 15, 2005; 60/674,284, filed Apr. 25, 2005; and 60/751,273, filed Dec. 19, 2005.

The disclosures of all of the foregoing applications are incorporated herein by reference.

FIELD OF THE INVENTION

This invention relates to energy conditioning.

BACKGROUND OF THE INVENTION

Electrical circuits using low frequency electrical power generate noise that is coupled through the power distribution system. That noise is generally detrimental. In the past, capacitors have been used to condition the electrical power propagating to and from devices. One type of device in which capacitors have been used to condition electrical power is an active circuitry. Capacitors have been used to in active circuitry to decouple noise from the power lines. Typically, in applications involving Large or Very Large Scale Integration (LSI or VLSI) Integrated Circuits (ICs), multiple rows of capacitors are arrayed on a PC board as close as feasible to the location of the IC in the PC board, given design constraints. This arrangement provides sufficient decoupling of the power and ground from the IC's active circuitry. The terms "bypass" and "decoupling" are used interchangeable herein.

SUMMARY OF THE INVENTION

This application discloses novel energy conditioner structures and novel combinations of the connections of the energy conditioners on other structures, such as PC board structures, and novel circuit arrangements of the energy conditioners with structures, such as PC boards, described herein, generally provide improved decoupling, per conditioner, and require less conditioners and related structure, such as vias, to provide sufficient decoupling. Similarly to PC boards, the structures to which the novel conditioners and the novel combination of the connections of the energy conditioners may be applied include first level interconnects and semiconductor chips, including for example ASIC, FPGA, CPU, memory, transceiver, computer on a chip, and the like.

More particularly, this application discloses and claims energy conditioner internal structures, energy conditioner external structures, connection structure, and circuits including energy conditioners having A, B, and G master electrodes.

Novel energy conditioner internal structures disclosed herein contain a conductive layer of each one of the A and B master electrodes in the same plane as one another, have a conductive layer of a G master electrode in another plane, and have a footprint of the layers of the A and B master electrodes inset relative to the footprint of the layer of the G master electrode.

Novel energy conditioner internal structures disclosed herein contain a conductive layer of each one of the A and B master electrodes in the same plane as one another, contain a G master electrode, and the foregoing conductive layers of the A and B master electrodes have novel shapes.

The foregoing novel energy conditioner internal structures, in use, reside in an external structure (see for example FIGS. 3A-3K) forming a complete energy conditioner, and may be attached using various ones of the connection structures (see for example FIGS. 4A-4O) and connected in various manners to source and loads to form various circuits (for example circuits 1-6 shown in FIGS. 7-12).

In one aspect, the inventor discloses internal structures of an energy conditioners, and methods of making and using them, wherein said internal structure has a left side surface, a right side surface, an upper side surface, a lower side surface, a top side surface, and a bottom side surface; wherein said internal structure comprises a dielectric material and a conductive material; wherein surfaces of said dielectric material and surfaces of said conductive material define said left side surface, said right side surface, said upper side surface, said lower side surface, said top side surface, and said bottom side surface; wherein said conductive material comprises a first A conductive layer and a first B conductive layer in a first plane, and a first G conductive layer; wherein said first A conductive layer, said first B conductive layer, and said first G conductive layer are electrically isolated from one another in said internal structure; wherein said first A conductive layer comprises at least one first A conductive layer first tab and a first A conductive layer main body portion; wherein said first B conductive layer comprises at least one first B conductive layer first tab and a first B conductive layer main body portion; wherein said first G conductive layer comprises at least a first G conductive main body portion; wherein said first A conductive layer main body portion does not extend to any one of said left side surface, said right side surface, said upper side surface, and said lower side surface; wherein said first B conductive layer main body portion does not extend to any one of said left side surface, said right side surface, said upper side surface, and said lower side surface; wherein said first G conductive layer main body portion does not extend to any one of said left side surface, said right side surface, said upper side surface, and said lower side surface; and wherein said first G conductive layer extends towards said left side surface, said right side surface, said upper side surface, and said lower side surface further than said first A conductive layer main body portion and further than said first B conductive layer main body portion.

Aspects dependent upon the foregoing include wherein said first G conductive layer extends further towards said left side surface, said right side surface, said upper side surface, and said lower side surface than all portions of said first. A conductive layer, except for where said at least one first A conductive layer first tab extends toward surfaces of said internal structure; wherein said G conductor main body portion has a G conductor main body portion area, said A conductor main body portion has an A conductor main body portion area, and said G conductor main body portion area is larger than said A conductor main body portion area; wherein said G conductor main body portion has a G conductor main body portion area, said A conductor main body portion has an A conductor main body portion area, said B conductor main body portion has an B conductor main body portion area, and said G conductor main body portion area is larger than the sum of said A conductor main body portion area and said B conductor main body portion area; wherein said first G conductive layer further comprises a first G conductive layer first tab and a first G conductive layer second tab; an energy conditioner comprising the foregoing internal structure and an energy conditioner external structure; an assembly comprising the energy conditioner mounted on mounting surface structure, wherein said mounting surface structure consists of a first conductive region, a second conductive region, and a third conductive region; wherein said first A conductive layer conductively connects to said first conductive region; wherein said first B conductive layer conductively connects to said second conductive region; and wherein said first G conductive layer conductively connects to said third conductive region; the energy conditioner wherein said external conductive structure comprises a first conductive integration structure, a second conductive integration structure, and a third conductive integration structure; wherein said first conductive integration structure contacts said first A conductive layer first tab and said first conductive region; wherein said second conductive integration structure contacts said first B conductive layer first tab and said second conductive region; wherein said third conductive integration structure contacts a first G conductive layer first tab and said third conductive region; energy conditioner wherein said first conductive integration structure resides on a at least said left side surface, said second conductive integration structure resides on at least said right side surface, and said third conductive integration structure resides between said first conductive integration structure and said second conductive integration structure; further comprising a fourth conductive integration structure that contacts a first G conductive layer second tab and said third conductive region; the energy conditioner wherein said third conductive integration structure also contacts a first G conductive layer second tab and said third conductive region; wherein said first A conductive layer first tab extends to at least one of said left side surface, said upper side surface, and said bottom side surface; wherein said first A conductive layer first tab extends to all of said left side surface, a portion of said upper side surface at the intersection of said upper side surface and said left side surface, and a portion of said lower side surface at the intersection of said lower side surface and said left side surface; wherein said first A conductive layer first tab extends to only said left side surface; wherein said at least one first A conductive layer first tab consists of said first A conductive layer first tab and a first A conductive layer second tab; wherein said first A conductive layer first tab extends to only said upper side surface; and wherein said first A conductive layer second tab extends only to said lower side surface; wherein said at least one first A conductive layer first tab consists of said first A conductive layer first tab and a first A conductive layer second tab; wherein said first A conductive layer first tab extends to only upper side surface near said left side surface; and wherein said first A conductive layer second tab extends only to said lower side surface at a region near said left side surface; wherein said A conductive layer and said B conductive layer are mirror images of one another about a line extending from a center of said upper side surface to a center of said lower side surface; wherein said first A conductive layer first tab extends to a region at a corner of said lower side surface and said left side surface; wherein said first B conductive layer first tab extends to a region at a corner of said upper side surface and said right side surface; wherein said first G conductive layer is in said first plane; wherein said first G conductive layer is in said first plane and between said first A conductive layer and said first B conductive layer; wherein said first G conductive layer is in said first plane and between said first A conductive layer and said first B conductive layer, and said first G conductive layer comprises a first G conductive layer first tab and a first G conductive layer second tab; wherein said first G conductive layer includes only one tab; wherein said first G conductive layer has exactly two tabs; wherein said first G conductive layer comprises at least four tabs; wherein said first G conductive layer has internal surfaces defining at least one aperture in said first G conductive layer; wherein said first G conductive layer includes no tabs; further comprising surfaces defining a via, conductive material in said via, wherein said conductive material connects to only one of A, B, and G conductive layers; wherein said at least one first A conductive layer first tab consists of a first A conductive layer first tab, and said first A conductive layer main body extends in a direction parallel to the surface of said internal structure to which said first a conductive layer first tab contacts further than the extent in that direction of said first a conductive layer first tab; wherein said at least one first A conductive layer first tab consists of a first A conductive layer first tab, and said first A conductive layer main body extends in a direction parallel to the surface of said internal structure to which said first a conductive layer first tab contacts not as far as the extent in that direction of said first a conductive layer first tab; wherein said first A conductive layer main body portion includes a rounded corner; wherein said first A conductive layer main body extends to only an upper left quadrant, said first B conductive layer main body extends to only a lower right quadrant; wherein said at least one first A conductive layer first tab consists of a first A conductive layer first tab that spans a corner of said left side surface and said lower side surface, and said at least one first B conductive layer first tab consists of a first B conductive layer first tab that spans a corner of said right side surface and said upper side surface; wherein said at least one first A conductive layer first tab consists of a first A conductive layer first tab and a first A conductive layer second tab, said first A conductive layer first tab extends only to said upper side surface near said left side surface, and said first A conductive layer second tab extends only to said lower side surface near said left side surface; and wherein said at least one first B conductive layer first tab consists of a first B conductive layer first tab and a first B conductive layer second tab, said first B conductive layer first tab extends only to said upper side surface near said right side surface, and said first B conductive layer second tab extends only to said lower side surface near said right side surface; wherein said at least one first A conductive layer first tab consists of a first A conductive layer first tab and a first A conductive layer second tab, said first A conductive layer first tab extends only to a central region of said left side surface, and said first A conductive layer second tab extends only to a region of said lower side surface near said left side surface; and wherein said at least one first B conductive layer first tab consists of a first B conductive layer first tab and a first B conductive layer second tab, said first B conductive layer first tab extends only to a central region of said right side surface, and said first B conductive layer second tab extends only to said upper side surface near said right side surface; wherein said first A conductive layer defines slots; wherein said first A conductive layer defines slots and said first B conductive layer defines slots; wherein said first A conductive a layer main body is larger than said first B conductive layer main body.

In other aspects, the inventor discloses a circuits 1-6 comprising said internal structure, a source, and a load, wherein said internal structure is connected in said circuit in any one of circuits 1-6 configuration.

In other aspects, the inventor discloses an assembly comprising said internal structure and an external structure of said energy conditioner, wherein said external structure comprises:

a first conductive integration region that extends along at least one of said left side surface, said upper side surface, and said lower side surface and contacts there at, at least one of said at least one first A conductive layer first tab; and a second conductive integration region that extends along at least one of said right side surface, said upper side surface, and said lower side surface and contacts thereat at least one of said at least one first B conductive layer first tab; wherein said first G conductive layer includes a first G conductive layer main body portion, a first G conductive layer first tab, and a first G conductive layer second tab, and wherein said external structure further comprises a third conductive integration region that extends along at least one side surface of said internal structure and contacts thereat said first G conductive layer first tab; wherein said external structure further comprises a fourth conductive integration region that extends along at least one side surface of said internal structure opposite the one side surface of said internal structure along which said third conductive integration region extends where at said fourth conductive integration region contacts said first G conductive layer second tab; further comprising a mounting structure to which said external structure is mounted, wherein said mounting structure consists of only a first conductive region, a second conductive region, and a third conductive region; wherein said first conductive region comprises conductive material in a first via, said second conductive region comprises conductive material in a second via, and said third conductive region comprises conductive material in a third via; wherein each one of said first conductive region, said second conductive region, and said third conductive region have conductive material in no more than two vias; wherein said first conductive region, said second conductive region, and said third conductive region have conductive material in no more than a total of six vias; wherein said first conductive region, said second conductive region, and said third conductive region have conductive material residing in no more than a total of five vias.

In other aspects, the inventor discloses an assembly comprising: an energy conditioner having said internal structure of claim 1; a mounting structure; and wherein said internal structure is mounted on said mounting structure; wherein said mounting structure comprises no more than three separate conductive elements; wherein each one of said no more than three separate conductive elements has conductive material extended into no more than two vias.

In other aspects, the inventor discloses an assembly comprising: an energy conditioner having said internal structure and an external structure comprising conductive regions that conductively connect components in said internal structure of an A master electrode to one another, of a B master electrode to one another, and of a G master electrode to one another; a mounting structure; and wherein said energy conditioner is mounted on said mounting structure; wherein said mounting structure consists of only a first conductive region, a second conductive region, and a third conductive region; and wherein said A master electrode is connected to said first conductive region, said B master electrode is connected to said second conductive region, and said G master electrode is connected to said third conductive region; wherein said G master electrode includes a first G conductive integration region, and a second G conductive integration region spatially separated from and not contacting said first G conductive integration region, wherein both said first G conductive integration region and said second G conductive integration region contact said third conductive region.

BRIEF DESCRIPTION OF THE DRAWINGS

The figures show elements of embodiments of the inventions. The same reference number in different figures refers to identical elements or elements with similar structure or function.

FIG. 1A is a plan view of a conventional digital circuit board, also called a PC board, for a conventional high speed VLSI IC (Very Large Scale Integration Integrated Circuit) chip;

FIG. 1B is schematic partial edge side sectional view of the conventional board of FIG. 1A;

FIG. 2A is a partial side sectional view of a structure including a more than two terminal energy conditioner mounted via pads to a board, showing vias connecting the conditioner and conductive planes in the board;

FIG. 2B is another side sectional view showing power and ground planes and connection of the multi terminal conditioner to the power and ground planes;

FIG. 20 is a top plan view of a plate of an energy conditioner;

FIG. 21 is a top plan view of a plate of an energy conditioner;

FIG. 22 is a top plan view of a plate of an energy conditioner;

FIG. 23 is a top plan view of a plate of an energy conditioner;

FIG. 24 is a top plan view of a plate of an energy conditioner;

FIG. 36 is an exploded perspective view of a stack of plates of an energy conditioner;

FIG. 37 is an exploded perspective view of a stack of plates of an energy conditioner;

FIG. 38 is an exploded perspective view of a stack of plates of an energy conditioner;

FIG. 39 is an exploded view of a stack of plates of an energy conditioner in which the plates have been displaced from one another in the plane of the paper;

FIG. 40 is an exploded view of a stack of plates of an energy conditioner in which the plates have been displaced from one another in the plane of the paper;

FIG. 41 an exploded view of a stack of plates of an energy conditioner in which the plates have been displaced from one another in the plane of the paper;

FIG. 42 is an exploded view of a stack of plates of an energy conditioner in which the plates have been displaced from one another in the plane of the paper;

FIG. 43 is an exploded view of a stack of plates of an energy conditioner in which the plates have been displaced from one another in the plane of the paper;

FIG. 44 is an exploded view of a stack of plates of an energy conditioner in which the plates have been displaced from one another in the plane of the paper;

FIG. 45 is an exploded view of a stack of plates of an energy conditioner in which the plates have been displaced from one another in the plane of the paper;

FIG. 46 is an exploded view of a stack of plates of an energy conditioner in which the plates have been displaced from one another in the plane of the paper;

FIG. 47 is an exploded view of a stack of plates of an energy conditioner in which the plates have been displaced from one another in the plane of the paper;

FIG. 48 is an exploded view of a stack of plates of an energy conditioner in which the plates have been displaced from one another in the plane of the paper;

FIG. 49 is a top plan view of external structure of an energy conditioner suitable for internal structures shown in FIGS. 47 and 48;

FIG. 50 is an exploded view of a stack of plates of an energy conditioner in which the plates have been displaced from one another in the plane of the paper, and in which plates include at least one conductive layers having internal surfaces defining at least one non-conductive region wherein resides a via;

FIG. 51 is an exploded view of a stack of plates of an energy conditioner in which the plates have been displaced from one another in the plane of the paper, and in which each plate includes at least one conductive layer having internal surfaces defining a non-conductive region wherein resides a via;

FIG. 52 is an exploded view of a stack of plates of an energy conditioner in which the plates have been displaced from one another in the plane of the paper, and in which each plate includes at least one conducive layer having internal surfaces defining a non-conductive region wherein resides a via;

FIG. 53 is a top plan view of a plate of an energy conditioner;

FIG. 54 is a top plan view of a plate of an energy conditioner;

FIG. 55 is an exploded view of a stack of two plates of an energy conditioner in which the plates have been displaced from one another in the plane of the paper;

FIG. 66 is an exploded view of a stack of two plates of an energy conditioner in which the plates have been displaced from one another in the plane of the paper;

FIG. 67 is an exploded view of a stack of two plates of an energy conditioner in which the plates have been displaced from one another in the plane of the paper;

FIG. 68 is an exploded view of a stack of two plates of an energy conditioner in which the plates have been displaced from one another in the plane of the paper;

FIG. 69 is an exploded view of a stack of two plates of an energy conditioner in which the plates have been displaced from one another in the plane of the paper;

FIG. 70 is an exploded view of a stack of two plates of an energy conditioner in which the plates have been displaced from one another in the plane of the paper;

FIG. 71 is an exploded view of a stack of two plates of an energy conditioner in which the plates have been displaced from one another in the plane of the paper;

FIG. 83 is an exploded view of a stack of three plates of an energy conditioner in which the plates have been displaced from one another in the plane of the paper;

FIG. 84 is a side section view of an energy conditioner including a stack of plates like stack 8300 of FIG. 83;

FIG. 92 is an exploded view of a stack of two plates of an energy conditioner in which the plates have been displaced from one another in the plane of the paper;

FIG. 93 is an exploded view of a stack of two plates of an energy conditioner in which the plates have been displaced from one another in the plane of the paper;

FIG. 94 is an exploded view of a stack of two plates of an energy conditioner in which the plates have been displaced from one another in the plane of the paper;

FIG. 95 is an exploded view of a stack of two plates of an energy conditioner in which the plates have been displaced from one another in the plane of the paper;

FIG. 96 is an exploded view of a stack of two plates of an energy conditioner in which the plates have been displaced from one another in the plane of the paper;

DETAILED DESCRIPTION OF THE EMBODIMENTS

Figure 3A:
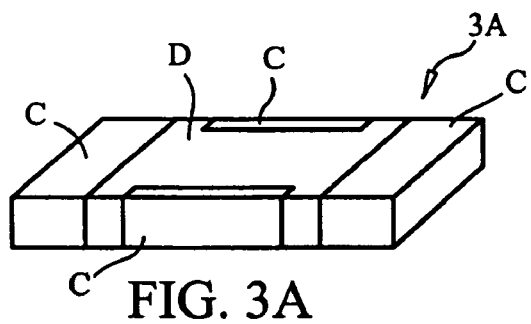
FIGS. 3A to 3K are perspective views of exterior surfaces of novel energy conditioners disclosed herein, particularly showing surfaces of conductive band structures, C, and surfaces of dielectric material, D.
Figure 3B:
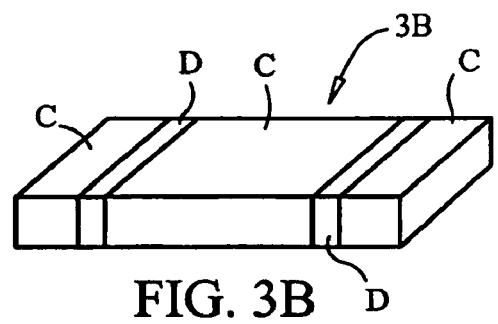
Figure 3C:
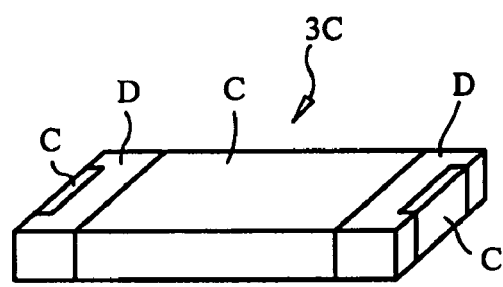
Figure 3D:
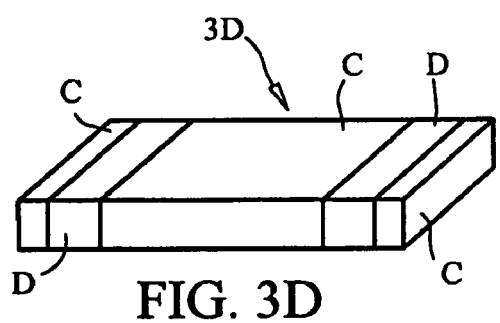
Figure 3E:
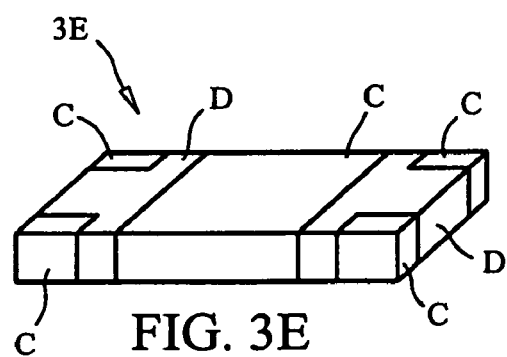
Figure 3F:
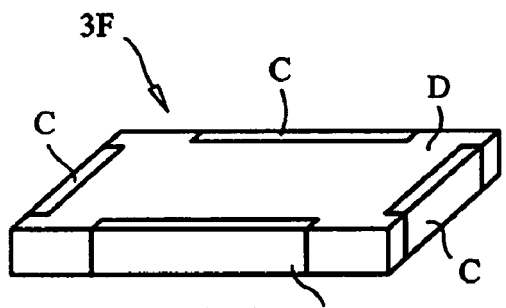

FIG. 1A shows PC board 1 having sides 2, 3, 4, and 5, top surface 6, array 7 of structure for mounting discrete capacitors, and region 8 for mounting an IC. Each side of array 7 defines plural rows, such as rows 9 and 10. Each element or array 7 represents mounting structure for mounting a discrete capacitor. Conventional PC boards often have an array including at least two rows of structure for mounting capacitors. Each row may have several to tens of array elements for mounting capacitors. The board is designed so that capacitors mounted to the elements of array 7 sufficiently decouple the power to the IC from active circuitry so that the IC and any other coupled circuit elements functions as intended.

Conventional capacitors are two terminal discrete devices.

FIG. 1B shows a portion of board 1, a source of electrical power 11, a ground 12, mounting structure 13 corresponding to one element of array 7, mounting structure 14 corresponding to another element of array 7, power plane 15, and ground plane 16. In addition, FIG. 1B shows three vias extend down from each mounting structure element, such as vias 17, 18, 19 below mounting structure 13. Use of more than two vias enables mounting unconventional devices, such as 3 terminal energy conditioners.

In operation, power source 11 distributes electrical power to circuit elements mounted to board 1 via conductive connection of power source 11 to power plane 15. Ground plane 16 conductively connects to ground 12. Vias 17 and 19 conductively connect to power plane 15. Via 18 does not conductively connect to power plane 15 and instead passes through an aperture in power plane 15 to ground plane 16. Power plane 15 is above ground plane 16.

FIG. 2A shows assembly 200 including energy conditioner 201 mounted on board 1. Board 1 includes pads 202, 203, 204 that separate conditioner 201 from board surface 6 by a distance 205 as indicated by the distance between facing arrows 206. Vias 17, 18, 19, have a width 207 as indicated by the distance between facing arrows 209.

FIG. 2B shows additional structure underneath conditioner 201 including additional power, ground, and/or signal planes 208, 209, 210, and aperture 211 through which the conductive path in via 18 passes without shorting to power plane 15. Additional power, ground and/or signal planes may exist in any particular board.

In operation, power feed from source 11 through one or more power planes provides power for active circuitry in the IC mounted in region 8 to operate. Conditioners mounted to the elements of array 7, one conditioner per array element, decouple transients otherwise induced in power due to switching and the like in the active circuitry of the IC.

FIGS. 3A to 3K are perspective views of exterior surfaces 3A to 3K of certain novel energy conditioners disclosed herein. In FIGS. 3A to 3K, "C" denotes electrically conductive material and "D" denotes dielectric material (electrically insulating). The electrically conductive portions, C, may be referred to herein as bands or outer terminals.

Figure 3G:
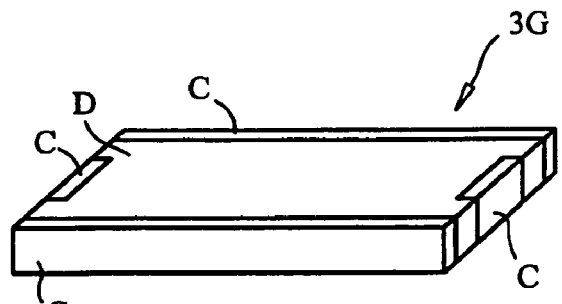
Figure 3H:
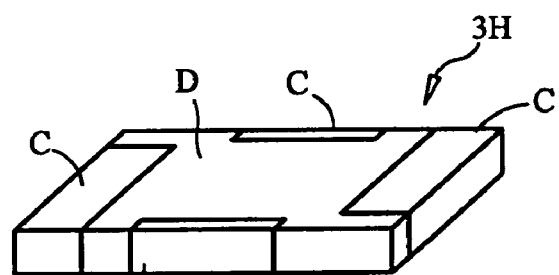
Figure 3I:
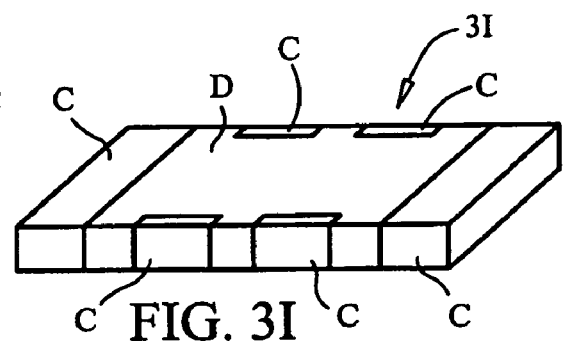
Figure 3J:
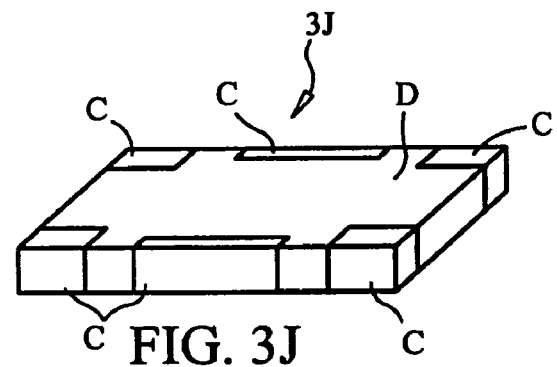
Figure 3K:
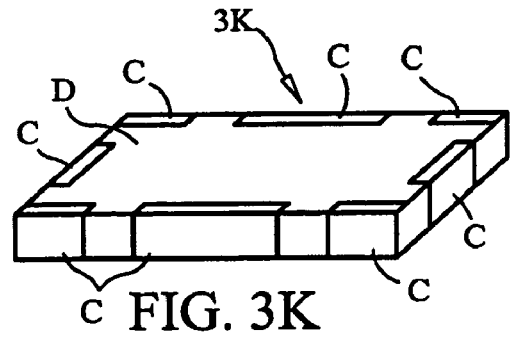

FIG. 3A shows conductive band C, each labeled C1, C2, C3, and C4, and FIG. 3G shows conductive bands C, each labeled C1-C6, for purpose of discussion with energy conditioner internal structure disclosed herein below.

Figure 4O:
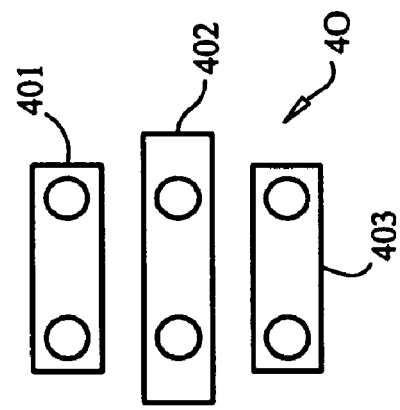
FIGS. 4A-O are plan views each showing arrangements of conductive elements of mounting surface structure, including conductive pad and/or via structure to which novel discrete component energy conditioners disclosed herein may be mounted.

FIG. 4A-4O each show one arrangement of conductive elements of mounting structure for mounting a single one of the novel discrete energy conditioners. These arrangements are also referred to as land patterns. The mounting surface may be a surface of a PC board, first level interconnect, or semiconductor chip.

FIG. 4A shows an arrangement 4A of mounting surface structure including a set of three generally rectangularly shaped conductive pads 401, 402, 403. Conductive pads 401, 402, 403, have relatively long sides (unnumbered) and relatively short sides. The relatively short sides are labeled 401A, 402A, 403A. Relatively short sides 401A, 402A, 403A are aligned with one another such that a straight line segment could contact substantially all of short sides 401A, 402A, 403A. Conductive pad 401 contains vias 401V1, 401V2. Conductive pad 402 contains vias 402V1, 402V2. Conductive pad 403 contains vias 403V1, 403V2. Vias 401 V1, 402V1, and 403 V1 are aligned such that a single line segment could intersect them. Vias 401V2, 402V2, and 403V2 are aligned such that a single line segment could intersect them.

In alternatives to arrangement 4A, pads may have different sizes, lengths, or widths from one another. For example, pad 402 may be shorter than pads 401, 403.

In another alternative to arrangement 4A, outer pads 401, 403 may have a different shape than central pad 402. For example, outer pads 401, 403 may include convex central regions and/or flared end regions. For example, outer pads 401, 403 may be the same length as one another but shorter or longer than central pad 402.

In another alternative to arrangement 4A, certain vias may have a diameter larger than the width or length of the pad to which they are attached such that the via is not entirely contained within the footprint of a conductive pad. For example, a via diameter may be equal to a width of a conductive pad, 1.5, 2, or 3 times a width of the conductive pad.

In another alternative to arrangement 4A, certain vias may have different cross-sectional diameters from one. For example, cross-section diameters of vias connecting to the central pad 402 may be $\frac{1}{3}$, $\frac{1}{2}$, 1, 1.5, 2, or 3 times the cross-sectional diameter of vias connecting to outer pads 401, 403.

In another alternative to arrangement 4A, vias 402V1, 402V2 may be spaced from one another by more than or less than the spacing between vias 401V1, 401V2 and the spacing between 403V1, 403V2.

In another alternative to arrangement 4A, each conductive pad may contain one, two, three, or more vias. For example, each conductive pad 401, 402, 403 may contain a single via. For example, pads 401 and 403 may contain 2 or 3 vias and pad 402 may contain one via. For example, pads 401 and 402 may contain 1 via and pad 402 may contain 2 or 3 vias.

In another alternative to arrangement 4A, the pads may not exist in which case just conductive vias exist in one of the foregoing arrangements. For example, two parallel rows of three vias.

In another alternative to arrangement 4A, some pads may have connected vias and some may not. For example, central pad 402 may contain 1, 2, 3, or more vias and outer pads 401, 403 may contain no vias. For example, central pad 402 may contain no vias and each outer pad 401, 403, may contain 1, 2, 3, or more vias.

In another alternative to arrangement 400A, the cross-sections of vias may not be circular, such as elliptical, elongated, or irregular.

FIGS. 4B-4L show various arrangements of the alternatives discussed above.

FIG. 4B shows arrangement 4B of mounting structure having vias of pad 402 more widely spaced from one another than the spacing between vias of either pad 401 or pad 403.

FIG. 4C shows arrangement 4C of mounting structure having vias having elongated elliptical cross-sections.

FIG. 4D shows arrangement 4D of mounting structure having a single via in each one of pads 401, 402, 403.

FIG. 4E shows arrangement 4E of mounting structure having outer pads 401, 403 having one centrally located via.

FIG. 4F shows arrangement 4F of mounting structure having pads 401, 402, 403 having no vias. In this alternative, conductive lines may radiate along the surface of the structure from each pad.

FIG. 4G shows arrangement 4G of mounting structure having pads 401, 402, 403 each having three vias, each via in each pad aligned with one via in each one of the other two pads.

FIG. 4H shows arrangement 4H of mounting structure having a single via in each pad, and in which the central pad 402 is short than the outer pads 401, 403.

FIG. 4I shows arrangement 400I of mounting surface structure having equal length pads 401, 402, 403, and in which the central pad 402 connects to only one via whereas the outer pads 401, 402 connect to 2 vias.

FIG. 4J shows arrangement 4J of mounting structure having three pairs of vias, and no pads.

FIG. 4K shows arrangement 4K of mounting structure having outer pads 401, 403 connecting to two vias and central pad 202 connecting to three vias.

FIG. 4L shows arrangement 4L of mounting structure having central pad 402 connecting to one via and outer pads 201, 203 having no vias.

Figure 4N:
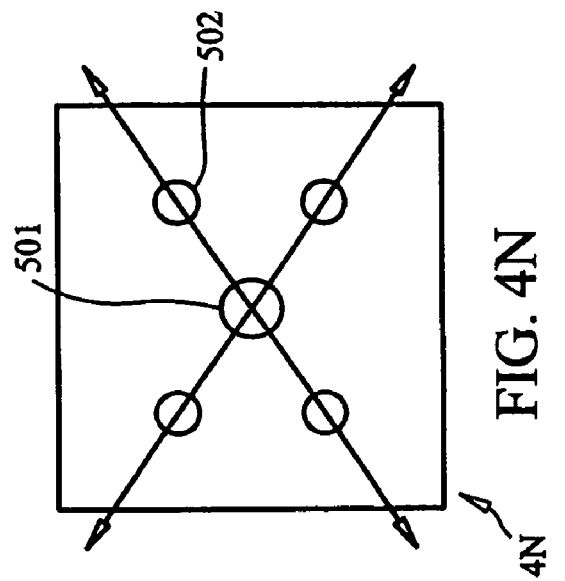
Figure 4M:
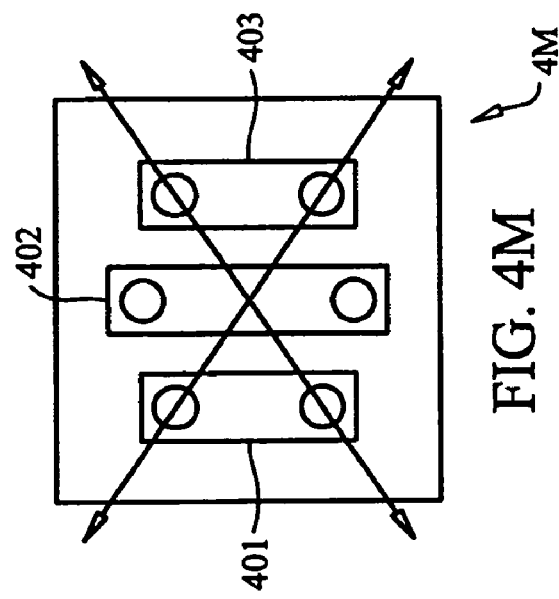

FIG. 4M shows mounting structure 4M having central pad 402 extending further than pads 401, 403, and vias in central pad 402.

FIG. 4N shows mounting structure 4N having via 410 having a larger diameter than via 411. Moreover, larger via 410 is more centrally located than the other smaller diameter vias. That is, FIG. 4N contemplates benefits from conductively filled or lined vias of different dimensions from one another, and in which the larger vias are more centrally located relative to the energy conditioner to which the connect.

FIG. 4O shows mounting structure 4O having central pad 402 extending symmetrically further than pads 401, 403.

Preferably, vias in each pad are spaced symmetrically on either side of the center of the pad. Preferably, the arrangement of vias is symmetric about the center point of central pad 202.

The inventors contemplate all variations of arrangements of mounting structures (pads and vias combinations, sizes, and shapes) and energy conditioners mounted therein that provide conductive connection between the conductive elements of the mounting structure and A, B, and G master electrodes (defined herein below) internal to the energy conditioner. The A, B, and G master electrodes either have regions forming part of the surface of the energy conditioner or internally physically contact conductive bands (outer electrodes) forming part of the surface of the energy conditioner. Thus, all variations of the conductive band structures and mounting structure that provide suitable connection to the A, B, and G master electrodes are contemplated. In addition, the inventors contemplate all variations of energy conditioners lacking conductive band (outer electrodes) that can be mounted on and soldered (or conductively pasted) to the board thereby conductively connecting the A, B, and G master electrodes to the conductive regions of the mounting structure.

Herein, conductive integration region, means either a conductive band or equivalent solder providing the contact to tabs of layers of a master electrode thereby conductively integrating those conductive layers to one master electrode. Tabs mean those portions of conductive layers of an internal structure of an energy conditioner that extend to the upper, lower, left or right side surfaces of the internal structure. Main body portions of conductive layers of an internal structure means those portions of the conductive layers that do not extend to the upper, lower, left or right side surfaces of the internal structure.

Thus, the inventors contemplate all combinations of the mounting structure configurations for mounting a conditioner to a surface and (1) either conductive band configurations or exposed A, B, and G master electrodes surfaces of energy conditioners that provide suitable connections for the A, B, and G master electrodes.

Some combinations of novel energy conditioner and surface mounting structure provide (1) a first conductive and mechanical contact, such as a solder connection, to at least one and more preferably all conductive bands connected to one side of the A and B master electrodes, (2) a second conductive and mechanical contact, such as a solder contact, to at least one and preferably all conductive bands connected to the opposite side of the A and B master electrodes, and (3) a third conductive contact to at least one and preferably all bands connected to both of the opposite ends of the G master electrode. The foregoing reference to electrical contact includes situations where DC current is blocked, such as where a dielectric cap or layer exists somewhere along a via.

Figure 5A:
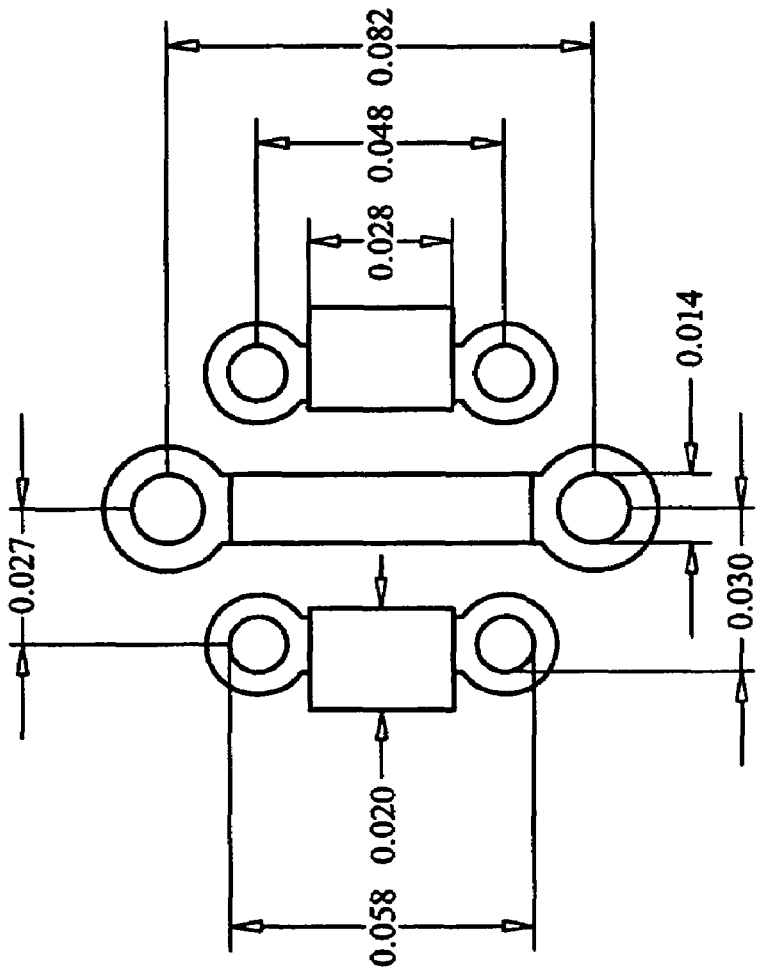
FIGS. 5A-5B are plan views showing geometric relationships of vias.

FIG. 5A shows geometric values and dimensions for one currently preferred mounting structure.

Figure 5B:
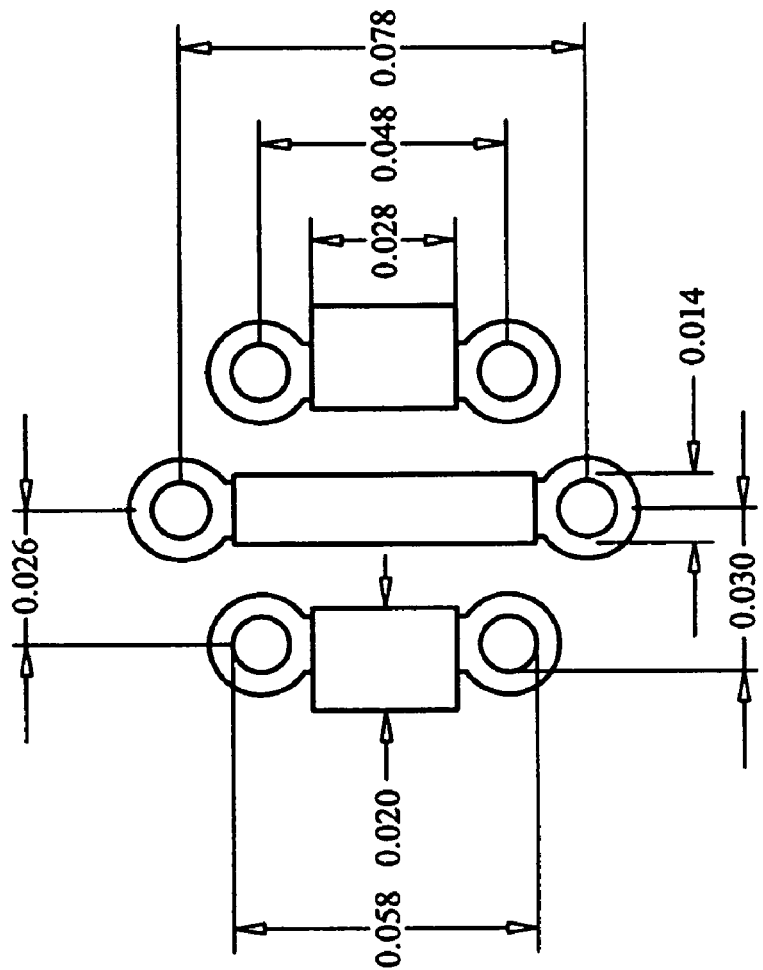

FIG. 5B shows geometric values and dimensions for another currently preferred mounting structure.

It has been determined by numerical calculations that the values shown in FIGS. 5A and 5B provided superior decoupling when 0603 X2Y type energy conditioners are mounted thereto. 0603 X2Y type capacitors have a capacitance of 1 to 100 nano farads, and nominal length, width, and thickness and height of 0.8, 0.6, 0.6, and 0.4 millimeters, respectively, as indicated for example by the URL:

http://www.yageo.com/pdf/X2Y_series_10.pdf?5423212= EE8DCCAFD2263EBA74A6443AF7A8BC75&4620207=.

Figure 6C:
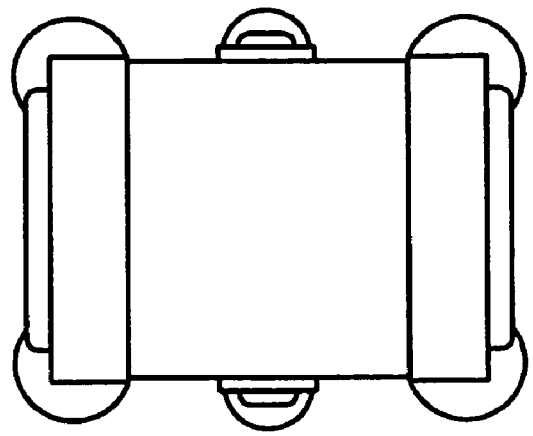
FIG. 6C is a top plan view showing a novel combination of a novel energy conditioner on an arrangement of mounting surface structure elements including conductive pads and vias showing overlap of terminals of the conditioner with vias.
Figure 6B:
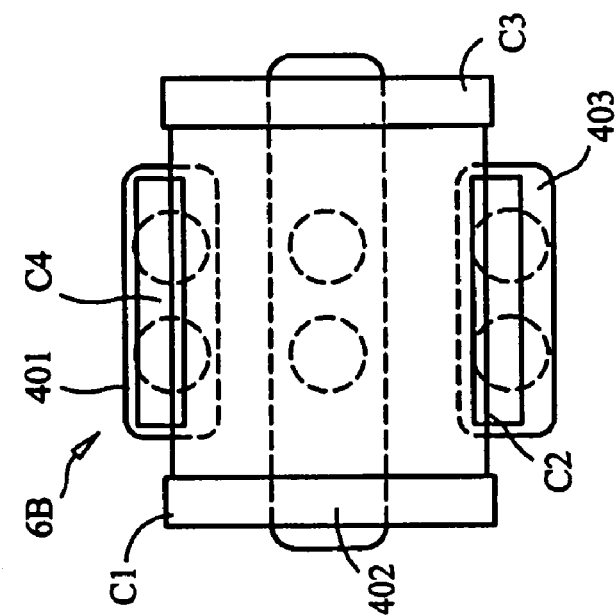
FIG. 6B is a schematic view showing a novel combination of a novel energy conditioner on an arrangement of mounting surface structure elements including conductive pads and vias, with two vias per pad, and a central pad that extends further than the outer two pads such that the central pad contacts conductive terminals, caps, or bands on left and right hand sides of the energy conditioner.
Figure 6A:
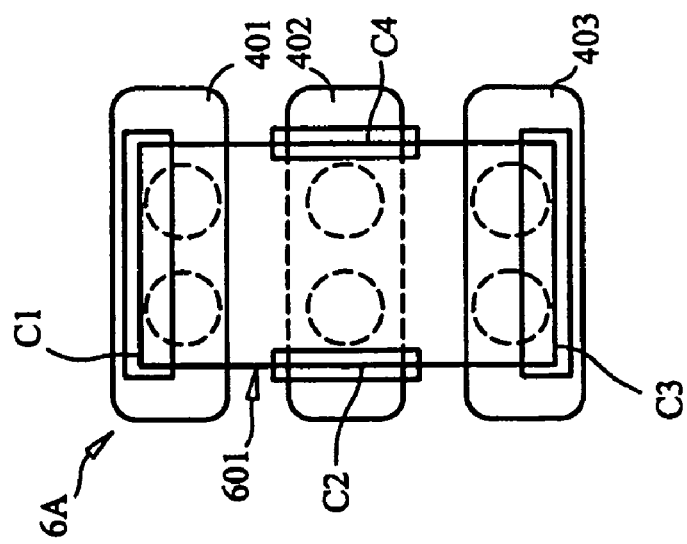
FIG. 6A is a schematic view showing a novel combination of a novel energy conditioner on an arrangement of mounting surface structure elements including conductive pads and vias, with two vias per pad.

FIGS. 6A-6B each schematically show a combination of a novel energy conditioner having a certain exterior surface structure in operable location on mounting structure.

FIG. 6A shows an arrangement 6A of energy conditioner 601 on mounting structure 4A. Conditioner 601 had exterior surface structure 3A. Conductive band C1 is on top of conductive pad 401. Part of conductive band C2 is on top (since its ends extend beyond) of a first end of conductive pad 402. Conductive band C3 is on top of pad 403. Conductive band C4 is on top of a second end of conductive pad 402. The first and second ends of conductive pad 402 are on opposite sides of energy conditioner 601 from one another. Vias and portions of pads hidden from view are shown in dashed lines.

FIG. 6B shows arrangement 6B of energy conditioner 602 mounted on arrangement 40 of FIG. 4O. Conditioner 602 also has exterior surface structure 3A. Conductive band C1, C3 contact near opposite ends of conductive pad 402. Conductive bands C4, C2 contact respectively to conductive pads 401, 403.

FIG. 6C shows arrangement 6C of energy conditioner 603 mounted on mounting structure 4J showing alignment of conductive bands of conditioner 603, and also solder, on vias of mounting structure 4J.

FIGS. 7-12 show circuits including an energy conditioner having A, B, and G master electrodes, which relate to the special properties of such conditioners. The inventors have determined that connection of the G master electrode at at least two points, preferably at two points on opposite sides from one another, provides significant advantages. This is in spite of the fact that the G master electrode is a single conductive structure wherein location of connection would not be relevant in a lumped circuit representation. Circuit diagrams rely upon a lumped circuit model for accuracy of representation. In order to represent this geometric requirement relating to distributed circuit design in lumped circuit figures, the inventors schematically represent the energy conditioners as devices having at least 3 terminal device, with A, B, G terminals. More terminals may exist for each master electrode, and additional master electrodes may be integrated into the same component. The inventors have also determined that relative locations of A, B, and G electrode terminals relative to the A, B, and G master electrode structures, may affect performance of the energy conditioners. FIG. 7-12 therefore show circuits peculiar to this type of energy conditioner.

In FIGS. 7-12, external terminal A conductively connects to the A master electrode, external terminal B conductively connects to the B master electrode, external terminal G1 conductively connects to the G master electrode. More specifically as used in FIGS. 7-12, embodiments having at least 2 G external terminals, such as a G1 and G2, a first side of the G master electrode, and external terminal G2 conductively connects to a different side of the G master electrode.

FIGS. 7-12 each show conditioner 700, and external terminals A, B, G1, and G2. The G master electrodes is represented by portions 702, 705, and the A and B master electrodes are represented respective by flat plate elements 703, 703. Internal to conditioner 700, the G master electrode is spaced between or acts to shield the effects of charge buildup on the A master electrode from the B master electrode. This is schematically represented by the portion 702 of the G master electrode extending between the flat plate elements 703, 704 of the A and B master electrodes. G master electrode portion 705 schematically represents shielding by the G master electrode of the A and B master electrodes relative to space outside conditioner 700.

Figure 7:
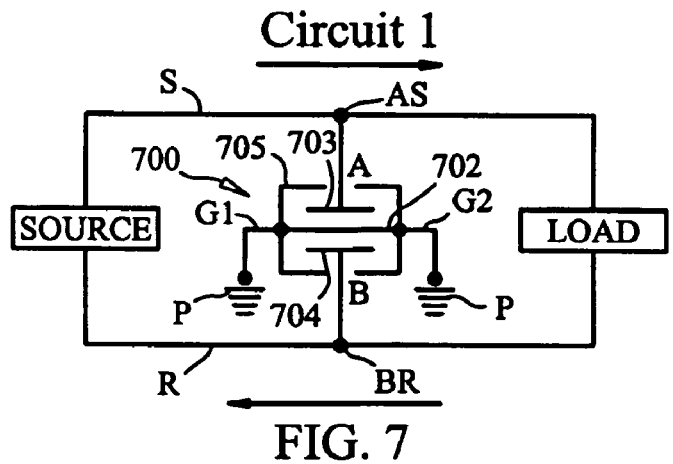
FIG. 7 is a partial schematic of circuit one for use with an energy conditioner having A, B, and G master electrodes.

FIG. 7 show a circuit 1 configuration for a conditioner 700 having A, B, and G master electrodes. In circuit one, external terminal A conductively connects to node AS of conductive path S between a source of electrical power, SOURCE, and a load, LOAD. In addition, external terminal B conductively connects to node BR of a return conductive path R between LOAD and SOURCE. In addition, external G1 and G2 terminals both conductively connect to a source of ground/constant potential P. Arrows above and below conductive paths between SOURCE and LOAD indicate that current flows in a loop.

Figure 8:
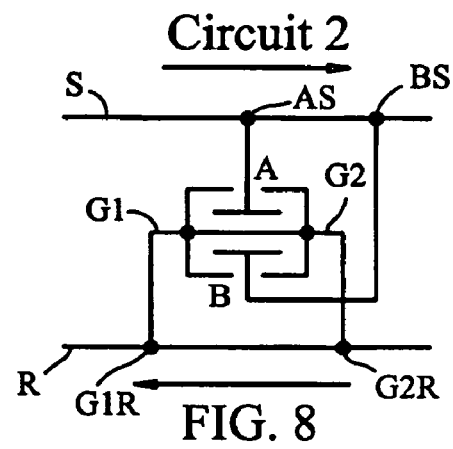
FIG. 8 is a partial schematic of circuit two for use with an energy conditioner having A, B, and G master electrodes.

FIG. 8 shows a circuit 2 configuration wherein external terminal A is tied to node AS on path S, external terminal B is tied to node BS also on path S, external terminal G1 is tied to node G1R on path R, and external terminal G2 is tied to node G2R also on path P.

Figure 9:
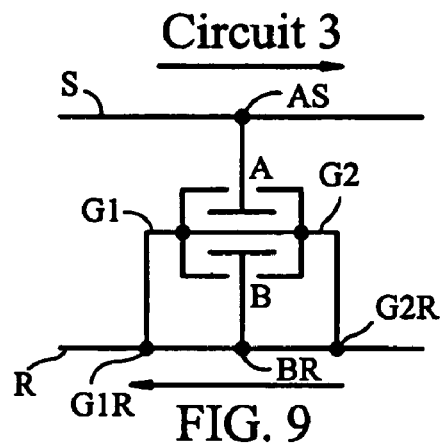
FIG. 9 is a partial schematic of circuit three for use with an energy conditioner having A, B, and G master electrodes.

FIG. 9 shows a circuit 3 configuration wherein external terminal A is tied to node AS on path S, external terminal B is tied to node BR on path R, external terminal G1 is tied to node G1R on path R, and external terminal G2 is tied to node G2R no path R.

Figure 10:
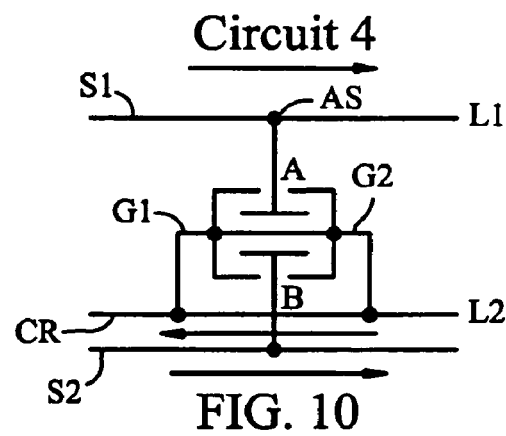
FIG. 10 is a partial schematic of a circuit four for use with an energy conditioner having A, B, and G master electrodes.

FIG. 10 shows a circuit 4 configuration wherein external terminal A is tied to a node on path S, and external terminals G1, B, and G2 are tied to nodes on path R.

Figure 11:
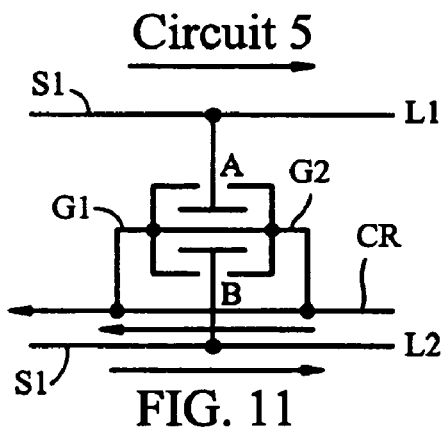
FIG. 11 is a partial schematic of a circuit five for use with an energy conditioner having A, B, and G master electrodes.

FIG. 11 shows a circuit 5 configuration wherein external terminal A is tied to a node on source path S1 from a first source to a load, external terminal B is tied to a node S2 on a path from a second source to a load, and external terminals G1 and G2 are tied to a common return path CR.

Figure 12:
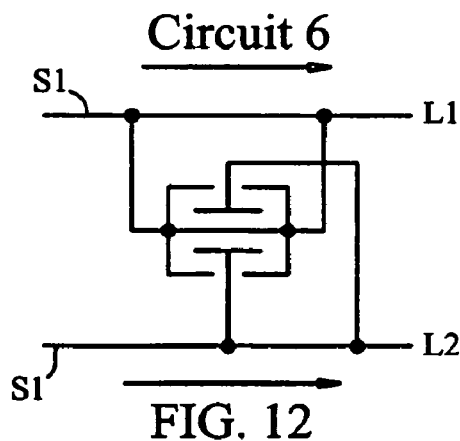
FIG. 12 is a partial schematic of a circuit six for use with an energy conditioner having A, B, and G master electrodes.

FIG. 12 shows a circuit 6 configuration wherein external terminal A is tied to a node on path R, external terminal B is tied to a node on path R, and external terminals G1 and G2 are tied to nodes on path S.

Relation of Internal Structure to External Structure of Energy Conditioners

FIGS. 13-57 generally show structure internal to the external surface 3A to 3K of FIGS. 3A-3K. The configuration of conductive layers of FIGS. 13-33 can be arranged relative to the external surfaces 3A to 3K so that the conductive layers of the A master electrode contact the same conductive band or bands as one, the conductive layers of the B master electrode contact the same conductive band or bands as one, and the conductive layers of the G master electrode contact the same conductive band or bands as one. Alternatively, instead of conductive bands, solder applied to the sides of the conditioners may conductively contact the conductive layers of the A master electrode to one another, the conductive layers of the B master electrode to one another, and the conductive layers of the G master electrode to one another. The same solder contacts may also contact corresponding conductive regions of the mounting structures shown in FIGS. 4A to 4O.

Meaning of "Plate", and Interconnector and IC Alternative Embodiments

The term "plate" herein generally is used to simplify explanation by defining a combination of a dielectric under layer with none, one, or more than one distinct conductive over layers. However, the relevant structure is the sequence of conductive layers separated by dielectric material. The hidden surface of the structures referred as plates in the following figures represents a dielectric surface; that is, dielectric material vertically separating the defined conductive layers from one another. In discrete energy conditioner component embodiments, the structure are often formed by layering dielectric precursor material (green material) with conductive layer precursor material (conductive paste or the like), firing that layered structure at temperatures sufficient to convert the dielectric precursor to a desired structurally rigid dielectric material and to convert the conductive precursor layer to a high relatively conductivity (low resistivity) conductive layer.

However, embodiments formed in interconnects and semiconductor structures would use different techniques, including conventional lithographic techniques, to fabricate equivalent or corresponding structures to those shown in FIGS. 13-48, 50, 52, 54, and 56. Importantly, the conductive bands and solder connections for stacked layers discussed herein below would in many cases be replaced by an array of conductively filled or lined vias selectively connecting conductive layers of the same master electrode to one another. Preferably, those vias would be spaced to selectively contact the tab regions of the A, B, and G layers discussed herein.

Regardless of the mechanism of formation, it is the existence of the master electrodes' morphologies, assembly with external conductive structure, assembly with mounting structure, and integration into circuits 1-6 that are functionally important for decoupling.

Common Features of Internal Structure of Energy Conditioners

A master electrode refers to the conductive layers or regions internal to an energy conditioner and the structure internal to the energy conditioner physically contacting those conductive layers or regions so that they form one integral conductive structure.

Internal structure of energy conditioners includes conductive layers or regions spaces by dielectric material from other conductive layers or regions. The conductive layers or regions each have tab regions which are regions that extend to an edge or periphery of the dielectric material or equivalently to the surface of the internal structure. In an energy conditioner, an edge of each tab region of each conductive layer is contacted to a conductive integration region. The external surface conductive structure may be either conductive bands integral to the discrete energy conditioner or by solder employed also to mount the energy conditioner internal structure to mounting structure. In energy conditioner internal structures having a plurality of conductive layers or regions designed to form a single master electrode, tabs of those conductive layers or regions are vertically aligned in the stack of layers so that a single conductive tab may conductively connect those conductive layers or regions to thereby form a master electrode.

Alternatively, or in addition to conductive bands or solder connecting to externally exposed edges of conductive layers or regions of a master electrode, conductively filled or lined vias may selectively connect to the same conductive layers or regions.

Relationship Between Internal Structures of Energy Conditioners and External Structure of Energy Conditioners Each one of the internal structures of energy conditioners shown in FIGS. 13-78, 80, 81, and 83-96 may reside in each one of external surface 3A to 3K of FIGS. 3A-3K in two distinct configurations. In one configuration, a first set of tabs of a G conductive layer of the G master electrode are on the left and right sides (as shown in FIGS. 3A to 3K) of the external surfaces 3A to 3K. In the other configuration, the same first set of tabs of that same G conductive layer of the G master electrode are on the upper and lower sides (as shown in FIGS. 3A to 3K) of the external surfaces 3A to 3K. In each configuration of the internal structures of energy conditioners shown in FIGS. 13-48, 50, 52, 54, and 56 and external surfaces 3A to 3K, the conductive layers of the A and B master electrodes each have a region that extends into contact with at least one conductive band (or solder, when solder is applied) of the corresponding one of external surfaces 3A to 3K.

Relationship Between Internal Structures of Energy Conditioners, External Structure of Energy Conditioners, and Circuits 1-6

At least in circuits wherein the A and B master electrode are not tied to the same conductive path of the circuit (circuits 1, 3, 4, and 5; see FIGS. 7-12), the conductive layer or layers of the A master electrode do not contact the same conductive band on external surfaces 3A to 3K as the conductive layer or layers of the B master electrode.

At least in circuits wherein the A master electrode is not tied to the same conductive path of the circuit as the G master electrode (circuits 1-6; see FIGS. 7-12), the conductive layer or layers of the A master electrode do not contact the same conductive band on external surfaces 3A to 3K as the conductive layer or layers of the G master electrode.

At least in circuits wherein the B master electrode is not tied to the same conductive path of the circuit as the G master electrode (circuits 1,2 and 6; see FIGS. 7-12), the conductive layer or layers of the B master electrode do not contact the same conductive band on external surfaces 3A to 3K as the conductive layer or layers of the G master electrode.

Features Common to Various Internal Structures Shown in FIGS. 13-56

FIGS. 13-78, 80, 81, and 83-96 each show internal structures of energy conditioners.

FIGS. 13-78, 80, 81, and 83-96 all show structures in which conductive layers of A and B master electrodes have each a footprint that, except for the tab portions of the conductive layers of the A and B master electrodes, is inset relative to a footprint of the conductive layers of the corresponding G master electrodes.

FIGS. 13-24, 31-48, 50-53, 55-63, 65, and 75-78, 80, 81, and 83-96 all show embodiments including a plate of an internal structure having at least one plane in which reside two separate conductive layers, each conductive layer having a tab, one of the conductive layers being part of the A master electrode and the other one of the conductive layers being part of the B master electrode.

FIGS. 18, 42-46, 54, 56-6577, 78, 80, 81, 83, and 84 all show embodiments of internal structures having at least one plate on which reside three separate conductive regions each having a tab, and each a conductive layer of an A, B or G master electrode.

FIGS. 13, 56-59, 61-65, 80, 81, 83, and show embodiments of internal structures in which a minimum of one plate may form internal structure of a useful energy conditioner, a so called minimum one plate build, although many of these figures depict stacks having more than one layer. Preferably, all though not necessarily in minimum one plate builds, each such structure includes in one plane conductive layers forming part of each one of the A, B, and G master electrodes. On less preferred embodiments, there is no G structure in the plane of the A and B layers of the plate, but there is G master electrode structure formed by the external structure of the energy conditioner.

FIGS. 56-60, 77, 78, and 83 each show embodiments of internal structures having at least one plate having four separate conductive layers, each conductive layer having a tab.

FIGS. 13-24, 31-48, 50-53, 56-69 72, 75-78, 80, 81, and 83 each show one or more plates of an internal structure, wherein that plate or plates have a conductive layer of an A master electrode and a conductive layer of a B master electrode in the same plate, and wherein two such plates are mirror images of one another about a line of symmetry extending vertically or horizontally in the plane of the paper of each figure or a point of symmetry at the center of the plate.

FIGS. 18, 36-38, 42-46, 50-52, all show embodiments of internal structures having at least one plate having three separate conductive regions that each having a tab wherein one conductive region, a G layer conductive region, separates the other two conductive regions. In the plates in these figures having the three separate conductive regions, a second plate having the same pattern as the first plate having the G region, stacked on the first plate, and rotated 180 degrees relative to the first plate results in tabs of the G region in each plate at least partially overlapping with one another. In some embodiments, parts of the tabs of the other conductive regions overlap with one another facilitating integration structure forming A and B master electrodes. In most embodiments, parts of the G region overlap with parts of the other two conductive regions.

Figure 80:
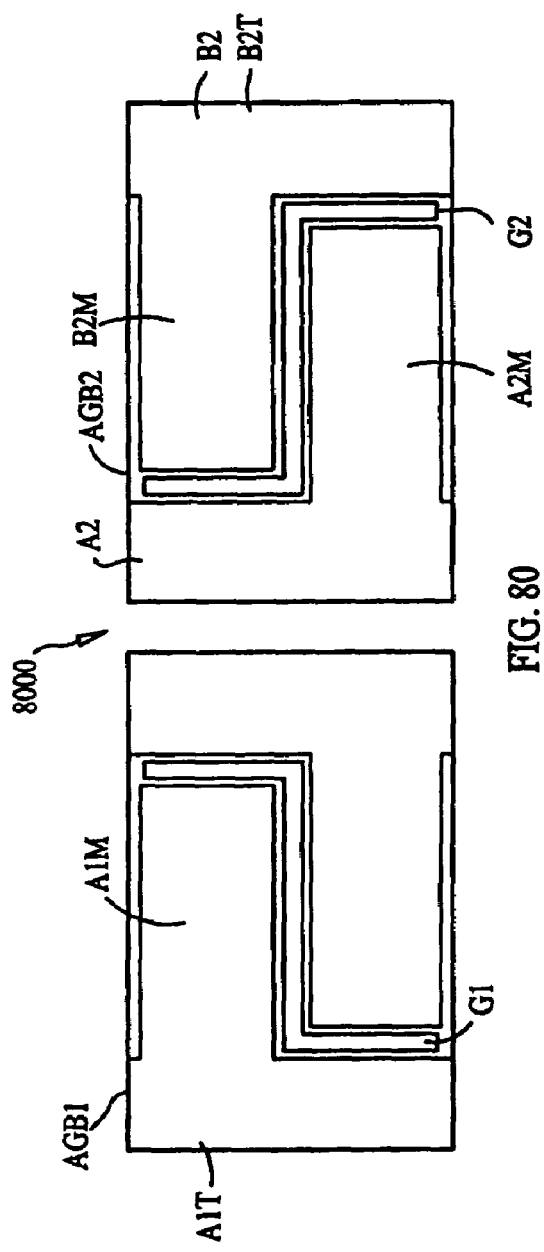
FIG. 80 is an exploded view of a stack of two plates of an energy conditioner in which the plates have been displaced from one another in the plane of the paper.
Figure 81:
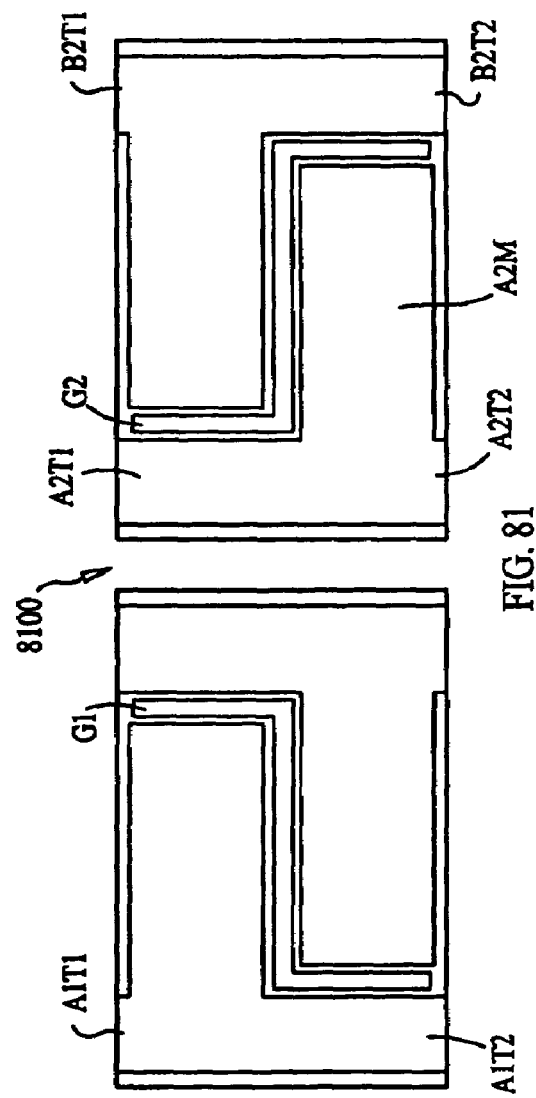
FIG. 81 is an exploded view of a stack of two plates of an energy conditioner in which the plates have been displaced from one another in the plane of the paper.

FIGS. 80-81 show structures in which the conductive layer between the A and B layers has no tab.

FIG. 24 shows a structure facilitating an internal structure enabling more master electrodes than just A, B, and G.

FIGS. 85-96 show internal structures in which A and B layers in the same plane have different dimensions.

Figure 75:
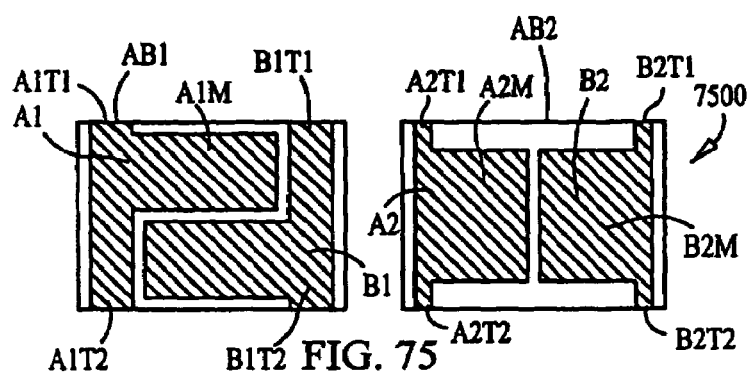
FIG. 75 is an exploded view of a stack of two plates of an energy conditioner in which the plates have been displaced from one another in the plane of the paper.
Figure 76:
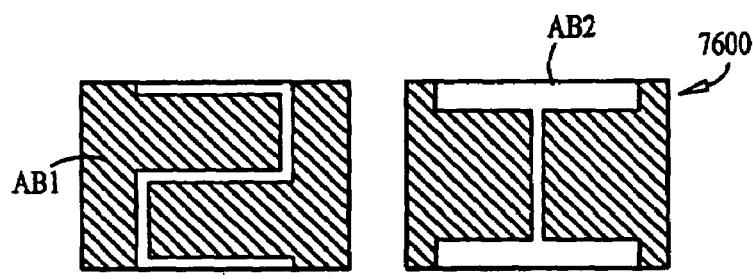
FIG. 76 is an exploded view of a stack of two plates of an energy conditioner in which the plates have been displaced from one another in the plane of the paper.

FIGS. 75-78 show structures including only a two plate build. FIGS. 75 and 76 show structures in which a first plate has a surface including a conductive layer of an A master electrode and a conductive layer of a B master electrode, and a second plate having a surface including conductive layers of the A master electrode and the B master electrode that have different shapes compared to the layers in the first plate. In these structure the external structure shown in the middle of FIG. 79 provides the G master electrode.

Figure 77:
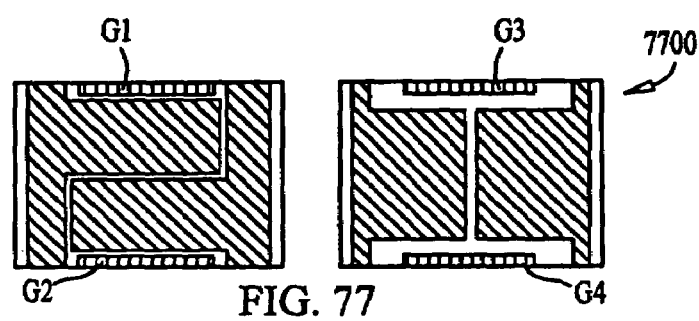
FIG. 77 is an exploded view of a stack of two plates of an energy conditioner in which the plates have been displaced from one another in the plane of the paper.
Figure 78:
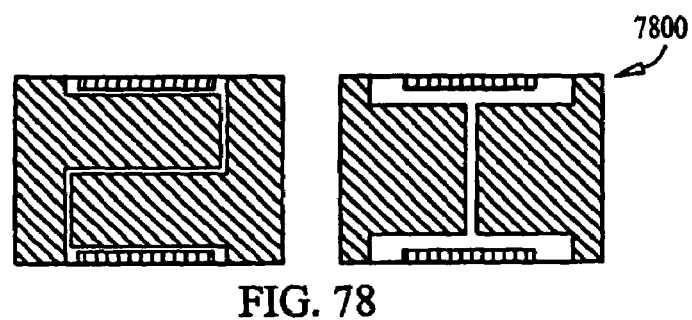
FIG. 78 is an exploded view of a stack of two plates of an energy conditioner in which the plates have been displaced from one another in the plane of the paper.
Figure 79:
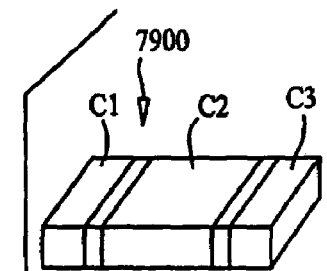
FIG. 79 is a perspective view of an external structure suitable for use in an energy conditioner including the internal structures shown in FIGS. 75-78.

FIGS. 77 and 78 are similar to FIGS. 75 and 76, except that two small G conductive regions reside in each plate.

FIG. 84 illustrates an embodiment in which A and B conductive layers have various set backs from the center line defined by the vertical space shown in between A and B layers in FIG.

FIGS. 29 and 50-52 show vias apertures inside of conductive regions enabling inclusion of conductively filled or lined vias facilitating conductive integration of non-adjacent conductive layers at regions inside the periphery of the layers.

FIGS. 53, 55, 58, 65-71 show cavities extending from edges of conductive layers to interior regions of the conductive layers to channel current flow therein.

Figures 34, 35:
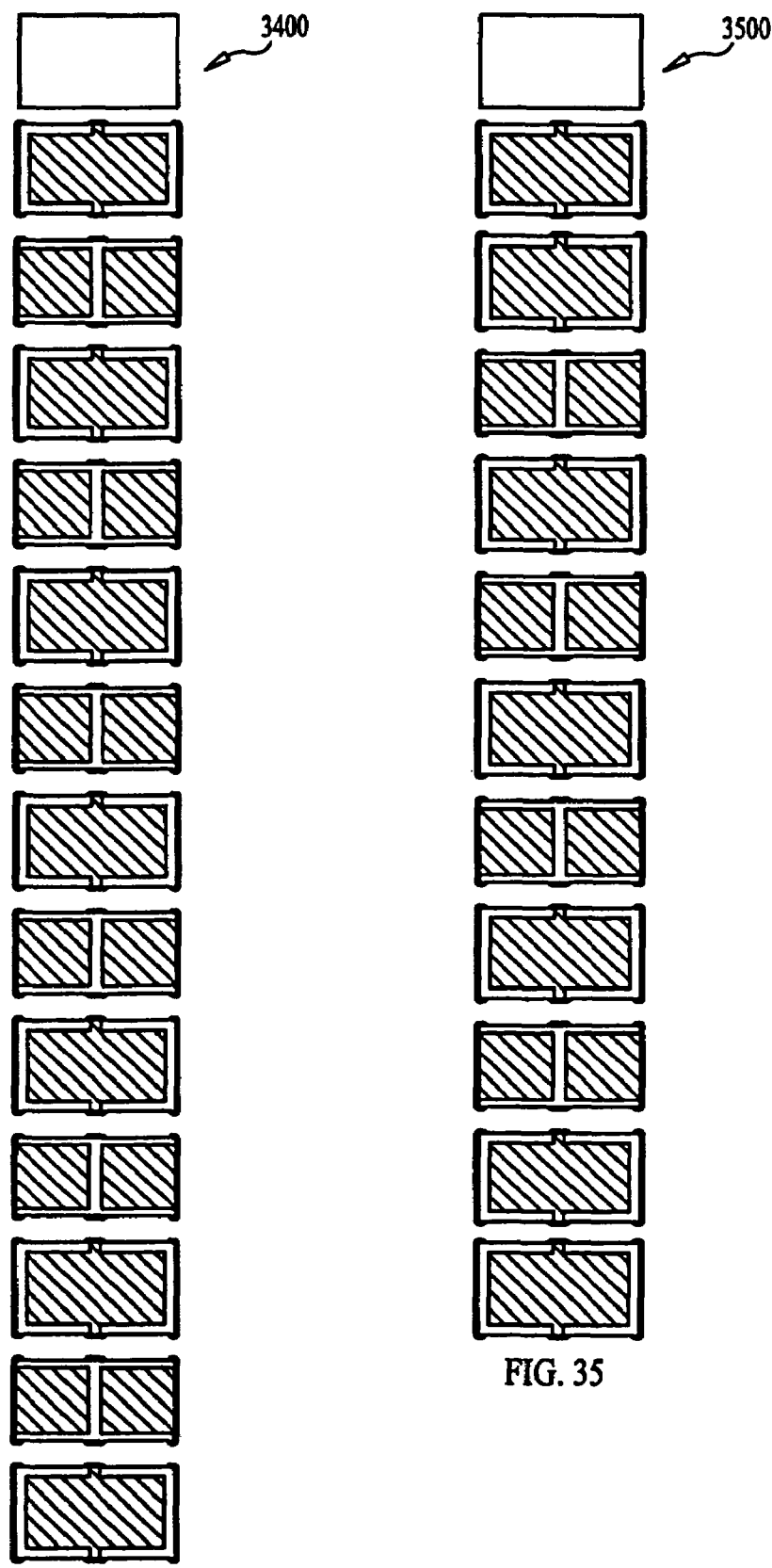
FIG. 34 is an exploded view of a stack of plates of an energy conditioner in which the plates have been displaced from one another in the plane of the paper.
FIG. 35 is an exploded view of a stack of plates of an energy conditioner in which the plates have been displaced from one another in the plane of the paper.

FIG. 35 shows a structure in which the outermost conductive layers on one or both ends of the stack have a sequence of two or three conductive G layers.

Figure 13:
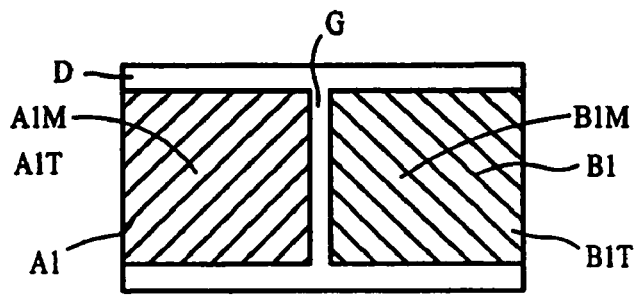
FIG. 13 is a top plan view of a plate of an energy conditioner.
Figure 103:
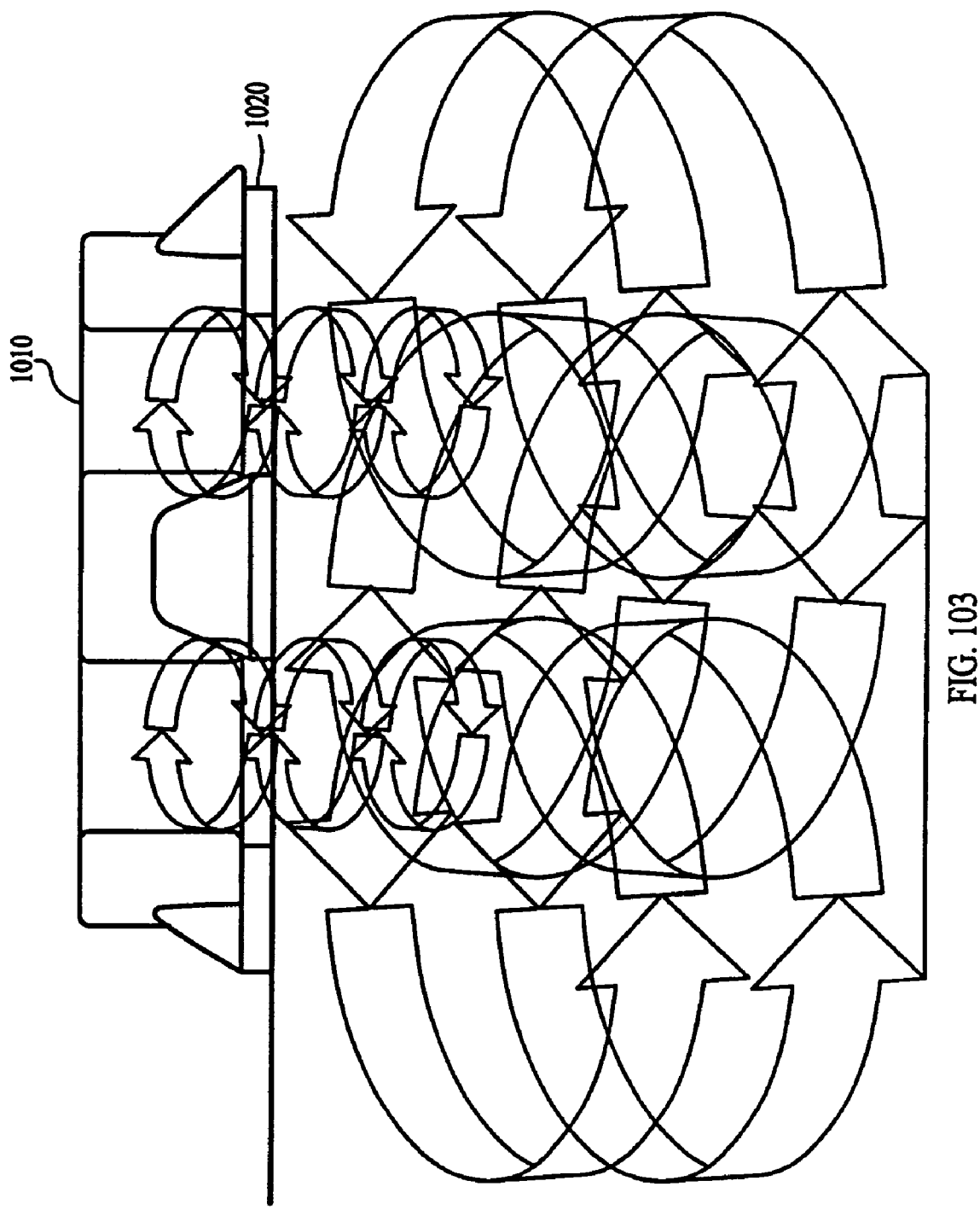
FIG. 103 is another illustration of magnetic fields relating to FIG. 101.

Detailed Description of FIGS. 13-103

In the following figures, plates of a stack shown displaced horizontally or vertically in the page exist in the stack in the sequence as expanded horizontally or vertically in the page. Each stack includes a top and a bottom spaced from one another in a direction perpendicular to the face of the paper of the figures. In addition, each plate of each stack is shown in the figures as having in the plane of the paper a left side LS, right side RS, upper side US, and lower side LLS.

FIG. 13 shows plate 1300 that includes dielectric material uniformly extending to the LS, RS, US, and LLS. Conductive layer A1 designed to be part of the A master electrode, and conductive layer B1 designed to be part of the B master electrode, cover hidden portions of the top surface of dielectric material of plate 1300. Conductive layers A1 and B1 are separated from one another by an exposed portion of the top surface of dielectric D. Conductive layers A1 and B1 have the same size and shape as one another, and they are placed symmetrically on the top surface of dielectric D.

Conductive layer A1 has a tab A1T extending to a portion of the LS of plate 1300 between the US and the LLS, and not extending to any of the US, LLS, and RS. Conductive layer B1 has a tab B1T extending to a portion of the RS between the US and the LLS, and not extending to any one of the US, LLS, and LS.

Conductive layer A1 has a main body portion A1M extending beyond tab A1T toward the RS less than a majority of the distance from the LS to the RS. Conductive layer B1 has a main body portion B1M extending from tab B1T toward the LS less than a majority of the distance from the RS to the LS. Exposed (not covered by conductive material of the A1 or B1 layers) surfaces of the dielectric exist on the upper LS, lower LS, upper RS, lower RS, and the entirety of the US and LLS, including in the gap G between A1 and B1.

In one embodiment of an internal structure of an energy conditioner, a G1 layer exists above or below the plane in which A1 and B1 reside. Preferably, the G1 layer extends in the directions from the LLS to the US and the RS to the LS further than the periphery of A1 and B1, except in the regions of tabs A1T and B1T. In other words, the footprint of the G1 layer includes the footprints of A1M (A1 less A1T) and B1M (B11 less B1T).

In alternative embodiments of stacks forming internal structures of an energy conditioner including plate 1300: there exist a plurality of plates identical to plate 1300 at different planes; there exists at least one G layer interleaved between two plates identical to plate 1300; there exists at least one G layer interleaved between each plate identical to plate 1300; there exists an odd total number of plates; there exists a G layer having an equal number of plates having A and B layers above and below that G layer; there exists one, or two, or more than two G layers on one or both ends of the stack.

In other alternative embodiments of stacks forming internal structures of an energy conditioner relating to plate 1300: the length in the direction from LS to RS of A1 and B1 in the direction from the LLS to the US may be greater or lesser than as shown for plate 1300; and the length from the US to the LLS of A1 and B1 may be greater or lesser than shown.

Embodiments including in at least two planes layers similar to A1 and B1 provide embodiments in which A layers stack over A layers and B layers stack over B layers such that tabs of the A layers may be conductively connected by one or more conductive integration regions, the tabs of the B layers may be conductively connected by one or more conductive integration regions while remaining conductively isolated from the A layers in the internal structure of the energy conditioner. In addition, in embodiments including G layers in at least two planes layers have the tabs of the G layers not overlapping the tabs of the A or B layers, and the tabs of the G layers overlapping one another, so that the tabs of the G layers may be conductively connected to one another by one or more conductive integration regions while remaining conductively isolated from the A and B layers in the internal structure of the energy conditioner.

In one embodiment of internal structure of an energy conditioner including plate 1300, the internal structure consists of only the conductive layers of plate 1300. In this embodiment, the A and B master electrodes are formed by the A1 and B1 layers and the conductive integration regions of the external structure of the energy conditioner to which they each contact. In this embodiment, the G master electrode consists of the conductive integration regions of the external structure of the energy conditioner that are isolated from the A and B master electrodes. For example, referring to FIG. 3, the bands having conductive material C in the LS surface and the RS in each one of FIGS. 3A-K may form conductive integration structure contacting the A1 and B1 layers respectively, and the conductive bands between the bands contacting to the A1 and B1 layer define the G master electrode.

In other embodiments, there exists at least one other plane having layers A2 and B2 wherein A2 and B2 have the same size and shape as one another, but have different sizes and shapes from A1 and B1. For example the gap G separating A2 and B2 may be larger or smaller than the gap separating A1 and B1, the length in the direction from the US to the LLS of A2 and B2 may be greater or lesser than the corresponding length of A1 and B1. The pattern of a large and a smaller gap between the A and B layers in adjacent planes containing A and B layers may repeat in a stack. For example, the tabs of A2 and B2, A2T and B2T, may not extend in the direction from the US to the LLS further or less than the extent of the main bodies, A2M and B2M, of A2 and B2. The pattern of A and B layers in one plane and A2 and B2 layers in another plane may repeat in a stack. Obviously, various other patterns of layer sequences exist, including those with G layers, and all such patterns are within the scope contemplate by the inventors so long as the A, B, and G layers may be integrated into A, B, and G master electrodes, either by external structure or internal structure including conductive material in vias. Such patterns include sequences of the A, B, A2, and B2 layers discussed in connection with FIG. 13, and the A and B coplanar conductive layers and G conductive layers described below with respect to the remaining figures, and all variations and combinations thereof, so long as the A, B, and G layers may be integrated into A, B, and G master electrodes, either by external structure or internal structure including conductive material in vias.

Furthermore, some embodiments contemplate more master electrodes than just A, B, and G, wherein tab or via structure enables formation of A, B and G master electrodes and for example A' and B' master electrodes such that there are five integrated conductive structures in an energy conditioner each of which is conductively isolated from one another in the energy conditioner. For example, formation of such structure using conductive integration regions of the external structure of the energy conditioner have tabs of each one of the A, B, A', B' and G layers having a region overlapping with tabs of the same region allowing a conductive band or solder on the outside side surfaces to conductively connect to only layers of the same type (A, B, A', B', or G).

Alternative plate embodiments also include plates with more than only a LS, RS, US, and LLS. Alternative plate embodiments include plates that are generally square or rectangular, meaning plates that are either square or rectangular within engineering tolerance or plates in which the LS, RS, US, or LLS are designed non-planar, such as bowed concave or convex.

FIG. 14-17 each show plates (1400-1700) having conductive layers A1, B1, on dielectric surface D wherein the conductive layers are symmetric about a line of symmetry in a dielectric gap G separating the conductive layers from one another, and each conductive layer has a tab and a main body. Variations from FIG. 13 are described below.

Figure 14:
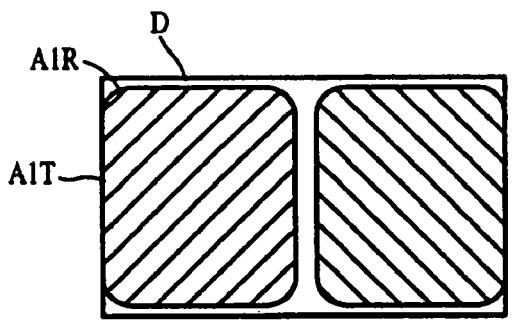
FIG. 14 is a top plan view of a plate of an energy conditioner.

FIG. 14 show a plate 1400 in which corners of conductive layers, such as corner A1R, of plate A1 are rounded. FIG. 14 shows all corners of conductive layers rounded. In this context, rounded means that the patterns from which features of conductive layers are derived, such as screens and plates designed to provide patterns of conductive layers, are designed with a curve corner greater than an engineering tolerance. In lithographic techniques, planar engineering tolerances are generally on the order of 100 Angstroms. In screen print of ceramics, planer engineering tolerances are generally on the order of 10 microns. Generally, rounded also means that the curvature to the rounded feature of a conductive layer is at least one percent, and preferably at least five percent of the longest dimension of the conductive layer.

Figure 15:
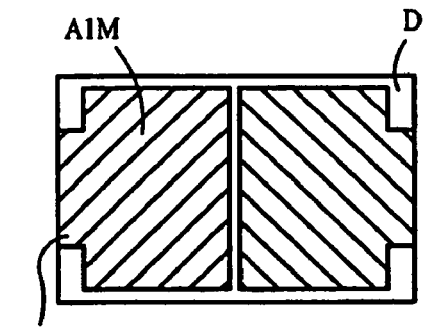
FIG. 15 is a top plan view of a plate of an energy conditioner.

FIG. 15 shows a plate 1500 in which conductive layers each have a tab, such as A1T, and a main body portion, such as A1M, wherein the tab is narrower than the main body in the direction defined by the side to which the tab extends.

Figure 16:
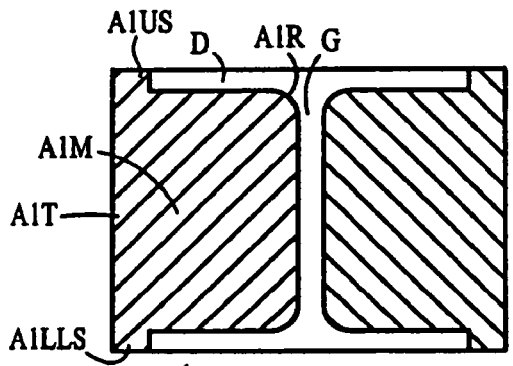
FIG. 16 is a top plan view of a plate of an energy conditioner.

FIG. 16 shows plate 1600 in which conductive layers have a tab, such as A1T, and a main body portion, such as A1M, wherein the tab is both wider than the main body in the direction defined by the side from which the tab projects from the main body to a side surface of the plate (the LS), and in which the tab also has portions extending into a region of the US and LLS adjacent the side from which the tab projects from the main body to a side surface of the plate, the portion A1U5 at the left end of the US, and the portion A1LLS, at the left end of the LLS. FIG. 16 also shows corners of plates adjacent the gap G, such as corner A1R, are rounded.

Figure 17:
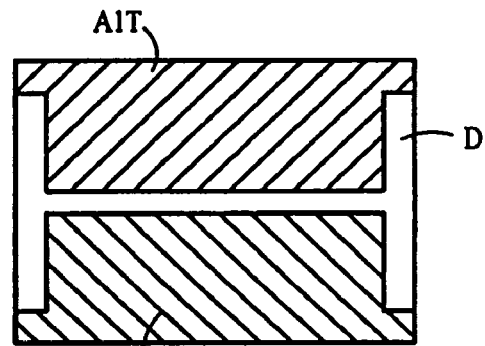
FIG. 17 is a top plan view of a plate of an energy conditioner.

FIG. 17 shows plate 1700 having the same tab structure as plate 1600, and no rounded corners. In addition, plate 1700 has a reversed aspect ration compared to plate 1600 in that plate 1700 has tabs A1T and B1T spanning the longer side edges of the US and the LLS. Alternative plate embodiments for all plates disclosed herein include the reverse aspects of any of the plates shown herein, wherein the tabs of the A and B layers contact the longer as opposed to the shorter sides.

Figure 18:
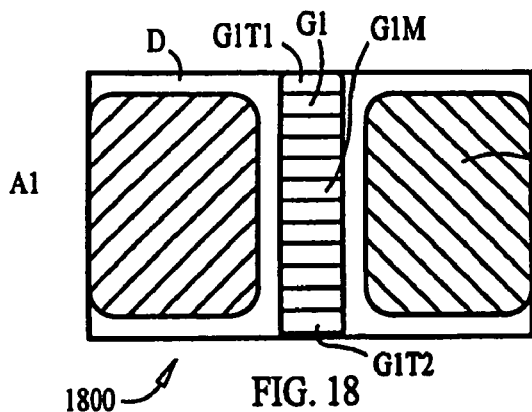
FIG. 18 is a top plan view of a plate of an energy conditioner.

FIG. 18 shows plate 1800 including conductive layers A1, B1, and G1 separated by dielectric D. A1 and B1 are similar in size, shape, and position to the same elements in plate 1400. G1 includes tab G1T1 in the US and G1T2 in the LLS connected by main body G1M such that A1 and B1 are separated by G1.

Figure 19:
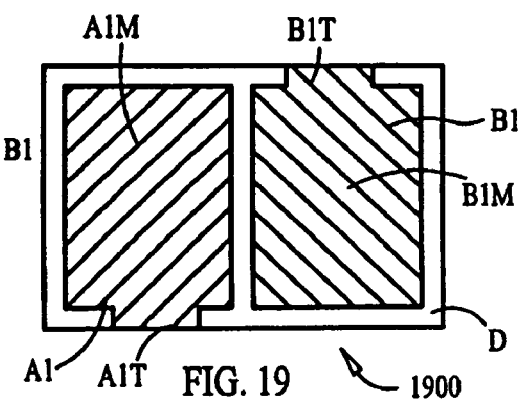
FIG. 19 is a top plan view of a plate of an energy conditioner.

FIGS. 19-21 show plates 1900-2100 with conductive layers A1, B1 in the same plate, wherein A1 and B1 are not mirror images of one another about a line of symmetry. A1 and B1 are inverse images of one another about a point of symmetry at the center of the plate. FIG. 19 shows conductive layer A1 having main body A1M in the left half of plate 1900, tab A1T in the left half side of the LLS, and tab A1T narrower in the direction from the LS to the RS than A1M. Conductive layer B1 includes main body b1M in the right half of plate 1900, tab B1T in the right half of the US, and tab B1T narrower in the direction from the LS t the RS than B1M.

FIG. 20 shows plate 2000 including conductive layer A1 having main body A1M limited to the upper left quadrant (upper half and left half of plate 2000), and tab A1T extending to a portion of the LS excluding the corners with the US and LLS. A1T extends further toward the US than A1M, and A1T extends further toward the LLS than A1M. B1 is sized and shaped inversely to A1M about a center point of plate 2000.

Stack embodiments having plates 2000 aligned with one another provide overlap of A layer main body with A layer main bodies, and A tabs with A tabs.

Stack of plate 2000 with a plate 2000' obtained by rotated 180 degrees about a line running from the LS to the RS through the center of plate 2000, provide a stack of two plates in which the A tabs overlap but the a main bodies do not. A sequence of such pairs of plates provide a stack in which every other A layer has main bodies that overlap, for example with main bodies overlapped in the upper left hand quadrant, and other main bodies overlapped in the lower left hand quadrant. Similar overlap exists in these stacks for the B main bodies.

FIG. 21 show plate 2100 including plate A1 having tab A1T spanning the region about the corner of the LLS and the LS, and main body A1M. Tab A1T and main body A1M are coextensive in the directions from the LLS to the US and from the LS to the RS. Similarly, B1 includes main body B1M and tab B1T wherein B1M and tab B1T are coextensive in the directions from the LLS to the US and from the LS to the RS, and B1T spans the region about the corner of the US and the RS.

Embodiments of stack of plates 2100 aligned with one another provide overlap of all of the A layer main body portions and A tabs. Stacks of layers including either plates 2100' formed by rotating a plate 2100 about either a line through the center of that plate extending from the LS to the right side or a line through the center of that plate extending from the US to the LLS do not have tabs or main bodies of either plates 2100' or 2100" aligned with tabs of plate 2100. Instead, such stacks have non-overlapped tabs at the edge of each quadrant of the stacks. Such stacks allow conductive integration structure to form four master electrodes, each master electrode having conductive layers limited to one quadrant of the stack. Spacing the tab regions of the conductive layers in the US, LLS, RS, and LS sufficiently from one another allows inclusion in the stack of G layers having tabs non-overlapping with the tabs fo the other layers, such that an additional conductive structure, a G master electrode structure can be incorporated.

FIG. 22 shows plate 2100 having conductive layers A1 and B1 wherein A1 consists of tab A1T and main body A1M, and B1 consists of tab B1T and main body B1M. A1T extends to the entirety of the US and regions of the LS and RS near the US. B1T is asymmetric with A1T. B1T extends only to a central region of the LLS.

FIG. 23 shows plate 2300 including conductive layers A1 and B1 which are mirror images of one another about a line of symmetry running through the center of plate 2300 from the LLS to the US. Plate A1 includes main body portion A1M, tab A1T1, and tab A1T2. Plate B1 includes main body portion B1M, tab B1T1, and tab B1T2. A1M and B1M oppose one another across dielectric gap G. A1T1 resides in the US near the LS, A1T2 resides in the LLS near the LS, B1T1 resides in the US near the RS, B1T2 resides in the LLS near the RS. A1 and B1 have no tab in either the RS or LS. This structure, in conjunction with certain external structure appropriately configured, enables electrical current or energy to pass through the resulting energy conditioner from A1T1 to A1T2, and from B1T1 to B1T2.

Structures in which electrical current or energy can pass through the resulting energy conditioner along tabs of one conductive layer are sometimes referred to as feed through energy conditioners.

FIG. 24 shows plate 2400 including conductive layers A1 and B1. A1 consists of tabs A1T1, A1T2, and main body A1M. A1T1 extends to the LS and does not extend to the US or the LLS. A1T2 extends to the LLS and does not extend to the LS or the RS. B1 consists of tabs B1T1, B1T2, and main body B1M. B1T1 extends to the RS and does not extend to the US or the LLS. B1T2 extends to the US and does not extend to the LS or the RS.

Stacking of plates identical to plate 2400 results in a stack in which main bodies of A layers are aligned and tabs of A layers are aligned, and similarly for B layers. Stacking of a plate 2400 with a plate 2400' obtained by rotating a plate 2400 by 180 degrees about a horizontal or vertical line passing through the center of plate 2400 provides a stack in which tabs of A1T2' of plate 2400' and B1T2' of plate 2400' do not overlap with other tabs, tab A1T1' and A1T1 have at least some overlap, and tabs B1T1' and B1T1 have at least some overlap. A stack of plates having the patterns of plates 2400, 2400' enables formation of energy conditioners in which a conductive integration structure conductively connects to all of the A1T1' and A1T1 tabs, a conductive integration structure conductively connects to all of the B1T1' and B1T1 tabs, a conductive integration structure conductively connects to all of the B1T2 tabs, a conductive integration structure conductively connects to all of the B1T2' tabs, a conductive integration structure conductively connects to all of the A1T2 tabs, and a conductive integration structure conductively connects to all of the A1T2' tabs. However, not including the conductive integration structure conductively connecting to the A1T1, A1T1', B1T1, and B1T1' tabs enables formation of four master electrodes, A, A', B, B'. In addition, space along any of the sides not otherwise overlapped with A, A', B, B' tabs, may be used for G tabs to include G conductive layers and additional conductive integration structure to conductively connect the G conductive layers thereby forming a G master electrode.

FIG. 25-30 show G layers G1 generally designed to form only part of a G master electrode.

Figure 25:
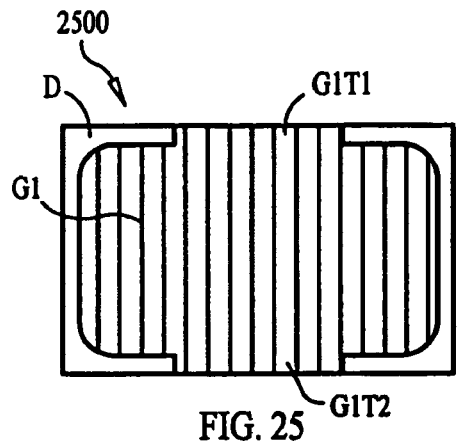
FIG. 25 is a top plan view of a plate of an energy conditioner.

FIG. 25 shows plate 2500 including conductive layer G1 consisting of tabs G1T1 and G1T2 and main body portion G1M. G1T1 extends to a central portion of the US and G1T2 extends to a central portion of the lower surface.

Figure 26:
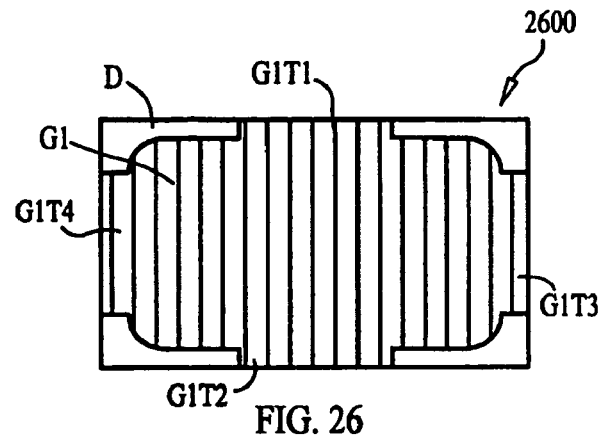
FIG. 26 is a top plan view of a plate of an energy conditioner.

FIG. 26 shows plate 2600 including conductive layer G1 consisting of tabs G1T1, G1T2, G1T3, G1T4, and main body portion G1M. Each one of tabs G1T1, G1T2, G1T3, G1T4 extends to a central portion of the US, RS, LLS, and LS of plate 2600.

Figure 27:
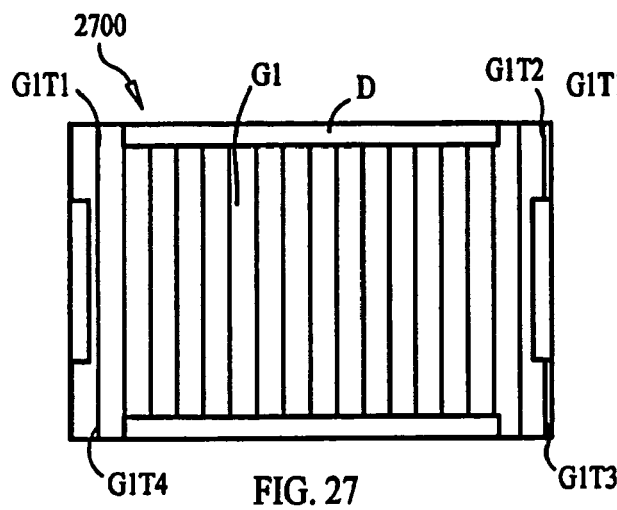
FIG. 27 is a top plan view of a plate of an energy conditioner.

FIG. 27 shows plate 2700 including conductive layer G1 consisting of tabs G1T1, G1T2, G1T3, G1T4, and main body portion G1M. Each one of tabs G1T1, G1T2, G1T3, G1T4 extends to a corner spanning two sides of the US, RS, LLS, and LS of plate 2600. On each side, the US, RS, LLS, and LS there exists a region of exposed dielectric, D.

Figure 28:
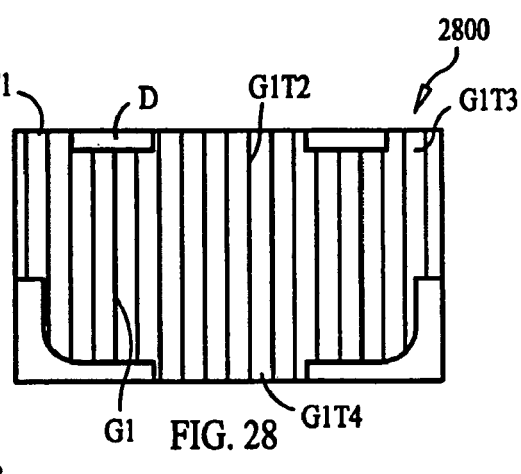
FIG. 28 is a top plan view of a plate of an energy conditioner.

FIG. 28 shows plate 2800 including conductive layer G1 consisting of tabs G1T1, G1T2, G1T3, G1T4, and main body portion G1M. Each one of tabs G1T1, G1T2, G1T3, extends to a portion of the US. G1T1 also extends to a an upper portion of the LS. G1T3 also extends to an upper portion of the RS. G1T4 extends to a central portion of the LLS.

Figure 29:
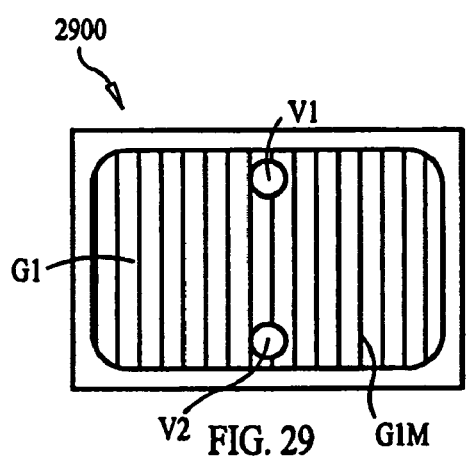
FIG. 29 is a top plan view of a plate of an energy conditioner.

FIG. 29 shows plate 2900 including conductive layer G1 consisting of main body portion G1M. Apertures V1, V2 exist in G1M enabling conductive material in vias therein to extend through G1 without conductively contacting G1. Alternatively, one or both of apertures V1, V2 may include vias containing conductive material that does contact G1, thereby enabling conductive integration of G1 with conductive layers in other planes.

Figure 30:
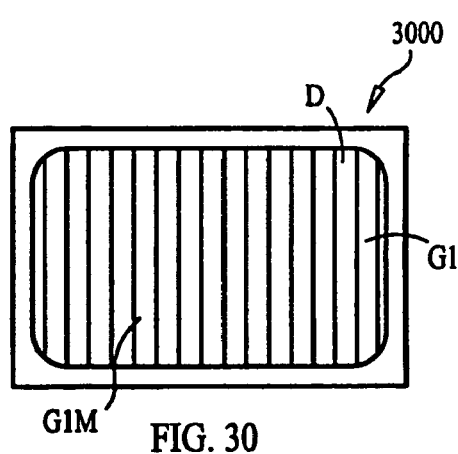
FIG. 30 is a top plan view of a plate of an energy conditioner.

FIG. 30 shows plate 3000 including conductive layer G1 consisting of main body portion G1M. G1M has no tabs, and no conductive connection to other layers. G1 acts in an energy conditioner as a floating master electrode. The inventors contemplate embodiments wherein a stack forming an internal structure of an energy conditioner includes plural plates 2900, for example every other plate, wherein each plate 2900 acts as a conductively isolated G electrode.

FIGS. 31-48 show stacks illustrating some of the stacking sequences including the foregoing plates. FIGS. 31-35 also show section views of one possible external structure of the energy conditioners; conductive bands labeled C1-C4.

Figure 31:
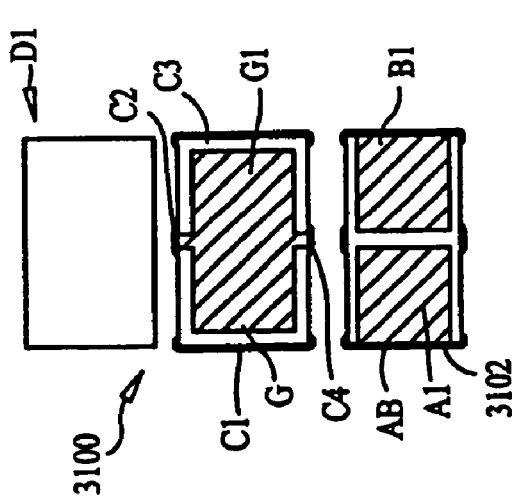
FIG. 31 is an exploded view of a stack of plates of an energy conditioner in which the plates have been displaced from one another in the plane of the paper.

FIG. 31 shows stack 3100 including dielectric top plate D1a indicating that preferably the top of each energy conditioner includes dielectric to prevent exposure of non-tab conductive regions of conductive layers of the internal structure. Stack 3100 also includes plates G and AB. Plate G includes conductive layer G1 and also shows sections of conductive bands C1, C2, C3, and C4. Plate AB includes conductive layers A1 and B1 an also shows sections of conductive bands C1, C2, C3, and C4. Tabs of G1 contact to bands C2 and C4. Tabs of A1 and B1 contact to conductive bands C1 and C3 respectively.

Figure 32:
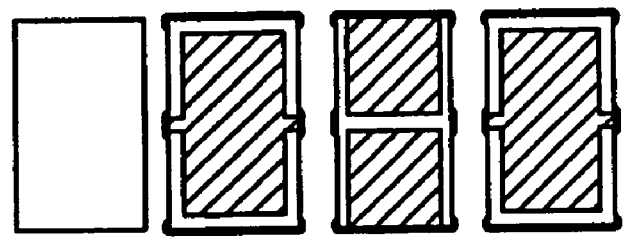
FIG. 32 is an exploded view of a stack of plates of an energy conditioner in which the plates have been displaced from one another in the plane of the paper.

FIG. 32 shows stack 3200 including the same patterns in plates G and AB and band structure as FIG. 31. FIG. 32 includes a second G layer sandwiching the AB layer between the G layers.

Figure 33:
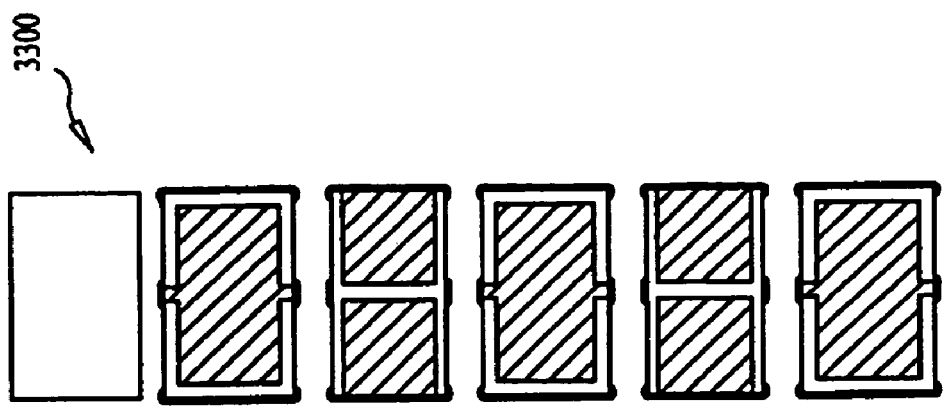
FIG. 33 is an exploded view of a stack of plates of an energy conditioner in which the plates have been displaced from one another in the plane of the paper.

FIG. 33 shows stack 3300 including the same patterns in plates G and AB and band structure as FIG. 31. FIG. 33 shows a stack sequence including the sequence: G, AB, G, AB, G.

FIG. 34 shows stack 3400 including the same patterns in plates G and AB and band structure as FIG. 31. FIG. 34 shows the stack sequence including the sequence: G, AB, G, AB, G, AB, G, AB, G, AB, G, AB, G.

FIG. 35 shows stack 3500 including the same patterns in plates G and AB and band structure as FIG. 31. FIG. 35 shows the stack sequence including the sequence: G, G, AB, G, AB, G, AB, G, AB, G, G. This sequence has two G plates on the top of the stack of conductive layers and two G plates on the bottom of the stack of conductive layers.

FIG. 36 shows stack 3600 including plates G and AGB. Plate AGB includes A, G, and B conductive layers. The G plate of stack 3600 has the same conductive pattern as the G plate of stack 3100 in FIG. 31. Plate AGB of stack 3600 has the same conductive pattern as plate 1800 of FIG. 18. Stack 3600 includes the plate sequence G, AGB, G.

FIG. 37 shows stack 3700 including the same G and AGB plates having the same conductive patterns as in stack 3600. Stack 3700 includes the plate sequence: G, AGB, G, AGB, G.

FIG. 38 shows stack 3800 including the same G and AGB plates having the same conductive patterns as in stack 3600. Stack 3800 includes the plate sequence: G, AGB, G, AGB, G.

Stacks 3700 and 3800 each have a central G plate, GC, meaning that there are an equal number of planes having conductive layers above and below the central G plate.

FIGS. 39-46 show stacks including mixes of plates having different patterns of only A or B conductive layers, plates having both A and B conductive layers, plates having A, B, and G conductive layers, and plates having only G conductive layers, so long as tabs of the G conductive layers overlap enabling formation of a G master electrode, and so long as tabs of the other layers overlap sufficient to form either A and B master electrodes, or A, B, A', and B' master electrodes. Alternatively, the G conductive layers may include no tabs, forming non integrated G electrodes, or may include no tabs and the structure may include vias enabling conductive connection of the G conductive layers in different planes to one another, or may include vias enabling conductive connection of the A and B conductive layers respectively to one another. FIGS. 39-42 each show a structure having a plane with a single conductive A or B layer, and another plane with either only A and B conductive layers or with A, B, and G conductive layers.

FIG. 39 shows stack 3900 including a sequence of plates: B, G, A, G, AB, G. Plates A and B each have only a single A or B conductive layer. The B plate includes only one conductive layer; conductive layer B1 consisting of a main body B1M and tab B1T. B1T extends to the RS, The A plate includes only one conductive layer; conductive layer A1 consisting of main body A1M and tab A1T. A1T extends to the LS. The G plate has the same conductive pattern shown in the G layer in FIG. 31. The AB plate has the same conductive pattern shown in FIG. 31, except that the tabs of the A and B conductive layers on plate AB in stack 3900 each also extend to and adjacent portion of the US and LLS.

FIG. 40 shows stack 4000 including a sequence of plates: G, A, G, B, G, AB. Each plate has the same conductive pattern as plates in stack 3900.

FIG. 41 shows stack 4100 including a sequence of plates: G, B, G, A, G, AB, G. Each plate has the same conductive pattern as plates in stack 3900.

FIG. 42 shows stack 4200 including a sequence of plates: B, AGB, A, AGB. The AGB plate is of the species of plates that include A1, B1, and G1 conductive layers, A having a tab extending to at least the LS, B having a tab extending to at least the RS, and G having two tabs and extending between A and B.

FIG. 43 shows stack 4300 including a sequence of plates: B, AGB, A.

FIG. 44 shows stack 4400 including a sequence of plates: G, B, AGB, A, G.

FIG. 45 shows stack 4500 including a sequence of plates: AGB, B, G, A, AGB.

FIG. 46 shows stack 4600 including a sequence of plates: G, G, AGB, B, G, A, AGB, G, G.

FIGS. 47-49 show elements suitable for an energy conditioner containing A, A', B, B' and G master electrodes.

FIG. 47 shows stack 4700 including a sequence of plates: AB, G, AB'. Plate AB includes conductive layers A1 and B1 each of which include a tab, A1T, B1T, and a main body portion, A1M, B1M. Tabs and main body portions are shown having the same dimension in the direction from the LS to the RS. Alternatively, the tabs could be narrower or wider than the main body portions in the direction from the LS to the RS. Plate G includes conductive layer G1 having tabs G1T1 and G1T2 and main body portion G1M. Tabs G1T1 and G1T2 extend to the LS and RS edges of plate G. Plate AB' is a mirror image of plate AB about a line from the LS to the RS passing through the center of plate AB.

FIG. 48 shows stack 4800 including a sequence of plates: G, AB, G, AB', G.

FIG. 49 shows external structure 4900 having conductive bands C1-C6. Assembly of stacks 4700 or 4800 in the external structure 4900 in orientations wherein G1T1 and G1T2 contact conductive bands C1, C2 respectively, also results in each one of A1T, B1T, A1'T, B1'T contacting a different one of conductive bands C3-C6 thereby resulting in five master electrodes.

FIGS. 50-52 show how conductive materials in vias can selectively conductively integrate conductive layers in different planes into master electrodes, with or without additional conductive connections enabled by tabs.

FIG. 50 shows stack 5000 including a sequence of plates: G, AGB, G1. G and G1 are plates each of which contain only a G conductive layer. G1 contains no tabs. The G conductive layers each show vias V1, V2. Each such via only passes through G conductive layers in stack 5000. Each such via may be lined or filed with conductive material conductively integrating the G conductive layers in all planes into a G master electrode.

FIG. 51 shows stack 5100 including plates G, AGB, G1. Each plane shows four vias, V1, V2, V3, and V4. G conductive layers are designed so that V1 and V2 contact all G conductive layers. Conductive layers A1 and B1 are designed with a dielectric annulus so that conductive material passing through vias V3, V4 inside those annuluses do not conductively contact conductive layers A1, B1. Inclusion of regions in a plane having no conductive material around vias enables the conductive layer or layers in that plane to remain conductively isolated from layers immediately above or below that do conductively contact to material in a corresponding via.

FIG. 52 shows a stack 5200 including a sequence of plates ABG, AB, G. G is a plate having two conductive layers each having no tabs, wherein these conductive layers overlap A and B conductive layers in other planes. Stack 5200 includes various vias, and dielectric regions surrounding certain vias. Stack 5200 includes via V5 passing through all three planes of conductive layers in stack 5200. V5 conductively contacts the A conductive layer in plate AGB, is isolated by a dielectric region D5 from the A conductive layer in plate AB, and is isolated from an overlapped conductive layer in plate G by dielectric region D6. This stack illustrates use of vias to selectively conductively connect using a via structure only certain layers of the same A, B, or G type that reside in different planes from one another.

FIG. 53 shows plate 5300 having a top surface consisting of conductive layers A1 and B1 and dielectric D. A1 includes tab A1T extended to the LS, and main body A1M extended toward the RS to edge A1E. A1 includes edges defining cavities or slots S1, S2, S3, wherein there exists only dielectric. S1 and S3 extend from the edge of A1 closest to the LLS toward the edge of A1 closest to the US. S2 extends from the edge of A1 closest to the US toward the LLS and to a region between S1 and S3. As a result, any conductive path in A1 from A1T to A1E has a serpentine shape. In addition, S1, S2, and S3 are slanted relative to the direction from the LLS to the US such that lower portions of each slot are further towards the LS than upper portions of each slot. Serpentine conductive paths in A1 from A1T to A1E may also be slanted.

B1 includes tab B1T extended to the RS, and main body B1M extended toward the RS to edge B1E. B1 includes edges defining cavities or slots S4, S5, S6, wherein there exists only dielectric. S4 and S6 extend from the edge of B1 closest to the US toward the edge of B1 closest to the LS. S5 extends from the edge of B1 closest to the LS toward the US and to a region between S4 and S6. As a result, any conductive path in B1 from B1T to B1E has a serpentine shape. In addition, S4, S5, and S6 are slanted relative to the direction from the LLS to the US such that lower portions of each slot are further towards the LS than upper portions of each slot. Serpentine conductive paths in B1 from B1T to B1E may also be slanted.

Alternatively, S4, S5, and S6 are slanted relative to the direction from the LLS to the US such that lower portions of each slot are further towards the RS than upper portions of each slot. Preferably, all slots have the same slant angle relative to a direction from the LLS to the US. Alternatively, the slots may be shorter such that S2 does not extend to a region between S1 and S3, and S5 does not extend to a region between S4 and S6. Alternatively, the slots may have no slant. Alternatively, one or more, but no all of S1, S2, and S3 may be slanted, and one or more, but not all of S4, S5, and S6 may be slanted. Alternatively, there may be a greater or lesser number of slots, 1, 2, 4, 5, up to hundreds, in each one of A1 and B1.

FIG. 54 shows plate 5400 including conductive layers G1, G2, and A1. A1 consists of tab A1T extended to the left side, and main body A1M extending toward the RS. G layers G1 and G2 have tabs G1T and G2T and main bodies G1M and G2M. G1T and G2T extend to the US and LLS respectively. G1M extends from G1T toward the LLS. G2T extends from G1M toward the US.

FIG. 55 shows stack 5500 consisting of plates AB and BA. Plates AB and BA have the same conductive pattern as one another but rotated 180 degrees in the plane of the paper from one another. AB includes conductive layers A1 and B1. A1 consists of tab A1T extended to the LS and A1M extending from tab A1T less than half way towards the RS. B1 has the same pattern as B1 in plate 5300, except that B1M extends more than half way towards the LS. AB includes conductive layers A2 and B2. Tabs of A1 and A2 overlap. Tabs of B1 and B2 overlap. Stack 5500 have substantial portions of main bodies B1M and A2M overlapped.

FIGS. 56-60 show plates that each include A1, B1, G1, and G2 conductive layers.

Figure 56:
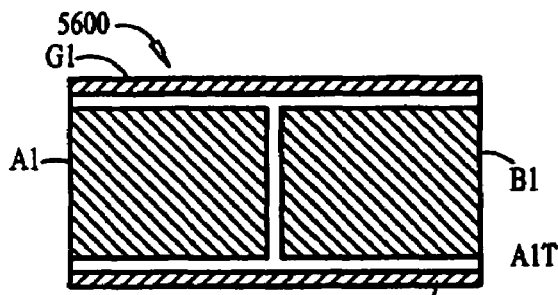
FIG. 56 is a top plan view of a plate of an energy conditioner.

FIG. 56 shows plate 5600 including conductive layers A1, B1, G1, and G2. G1 extends along the entirety of the US. G2 extends along the entirety of the LLS. A1 extends from the LS between G1 and G2 less than halfway towards the RS. B1 extends from the RS between G1 and G2 less than half the way toward the LS.

Figure 57:
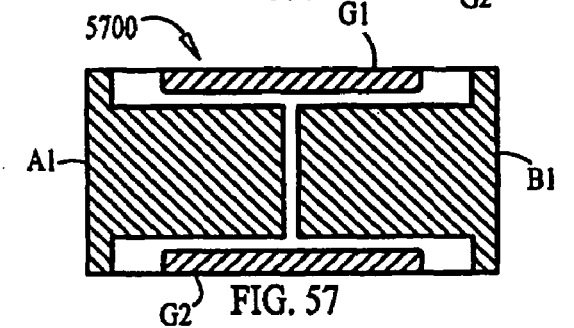
FIG. 57 is a top plan view of a plate of an energy conditioner.

FIG. 57 shows plate 5700 which is similar to plate 5600, except that tabs of A1 and B1 each extend to the US and LLS, and tabs of G1 and G2 do not extend to either the LS or RS.

Figure 58:
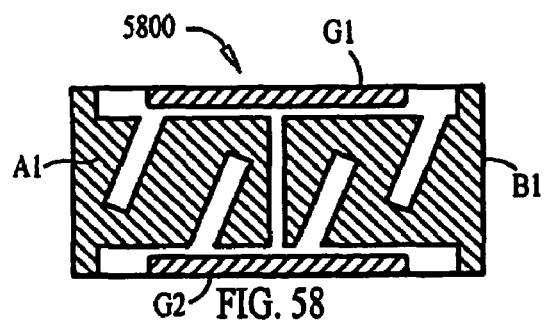
FIG. 58 is a top plan view of a plate of an energy conditioner.

FIG. 58 shows plate 5800 which is similar to plate 5700, except that the main bodies of A1 and B1 include slots similar to the slots described for plate 5300 of FIG. 3.

Figure 59:
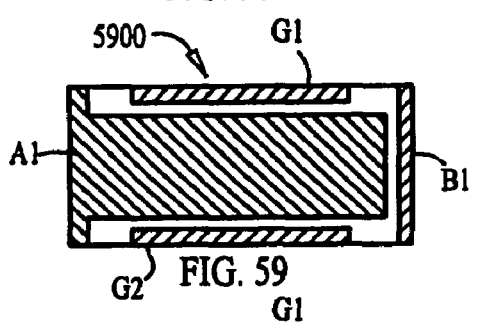
FIG. 59 is a top plan view of a plate of an energy conditioner.

FIG. 59 shows plate 5900 which is similar to plate 5700, except that the main body of A1 extends further than half way from the LS toward the RS and the main body of B1 is correspondingly shorter.

Figure 60:
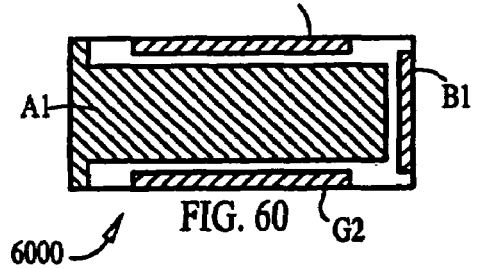
FIG. 60 is a top plan view of a plate of an energy conditioner.

FIG. 60 shows plate 6000 which is similar to plate 5900, except that B1 does not extend to the US or the LLS.

FIGS. 61-65 show plates each of which have A1, B1, and G1 conductive layers.

Figure 61:
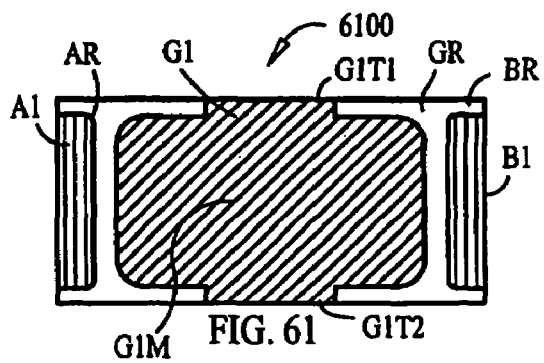
FIG. 61 is a top plan view of a plate of an energy conditioner.

FIG. 61 shows plate 6100 including conductive layers A1, B1, and G1. A1 consists of tab A1T and main body portion A1M. A1T extends to the LS, but not to the US or the LLS. A1M extends from A1T less than half way towards the RS. B1 consists of tab B1T and main body portion B1M. B1T extends to the RS, but not to the US or the LLS. B1M extends from B1T less than half way toward the RS. A1 has rounded corners AR at the far RS end of A1M. B1 has rounded corners BR at the far LS end of B1M.

G1 consists of tabs G1T1 and G1T2, and main body portion G1M. G1T1 extends to the US, but not to the US or the LLS. G1T2 extends to the LLS, but not to the LS or RS. G1M is wider in the direction from the LS to the RS than either G1T1 or G1T2. G1 is between A1 and B1. G1 has rounded corners GR at the far RS and LS ends of G1.

Figure 62:
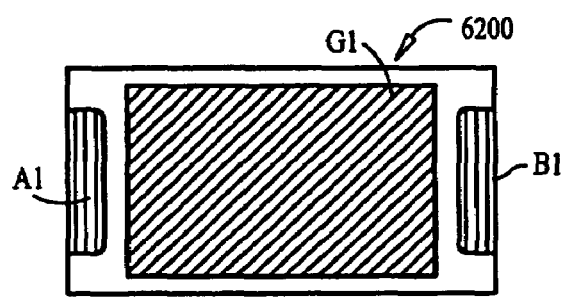
FIG. 62 is a top plan view of a plate of an energy conditioner.

FIG. 62 shows plate 6200 which is similar to plate 6100, except that G1 has no tabs and edges of G1 are not rounded.

Figure 63:
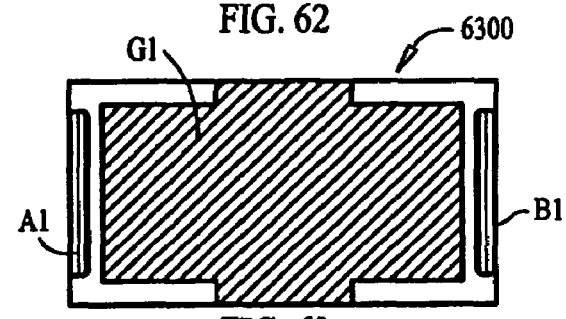
FIG. 63 is a top plan view of a plate of an energy conditioner.

FIG. 63 shows plate 6300 which is similar to plate 6100, except that edges of G1 are not rounded.

Figure 64:
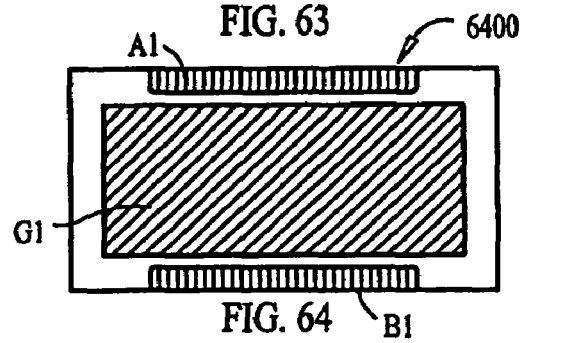
FIG. 64 is a top plan view of a plate of an energy conditioner.

FIG. 64 shows plate 6400 which is similar to plate 6200, except that plate 6400 has a reverse aspect compared to plate 6200 such that A1 extends to the US and B1 extends to the LLS.

Figure 65:
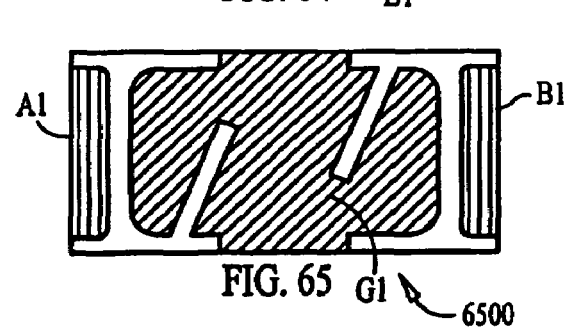
FIG. 65 is a top plan view of a plate of an energy conditioner.

FIG. 65 shows plate 6500 which is similar to plate 6100, except that G1 includes slots similar to the slots in the A1 and B1 layers of plate 5800 of FIG. 58.

FIGS. 66-70 show stacks of two plates wherein each plate includes a single conductive layer having a tab, a main body including slots and having a main body end. The location of the tabs and slots are configured such that the shortest paths in the conductive material from the tab to the main body end are serpentine, and those shortest paths from tab to main body end in the conductive layer in one plate in a stack are opposite the shortest path in the conductive layer in the other plate.

FIG. 66 shows stack 6600 including plates A and B. Plate A includes conductive layer A1 consisting of tab A1T and main body A1M. A1T extends only to a portion of the LLS near the LS. A1M extends from A1T towards the US and LS. Slots S1 and S2 in A1M limit conductive paths in A1 from A1T to A1E to non linear paths. Plate B includes conductive layer B1 consisting of tab B1T and main body B1M. B1T extends only to a portion of the LLS near the LS. B1M extends from B1T towards the US and the RS. A1M and B1M have substantial overlap. Slots S3 and S4 in B1M limit conductive paths in B1 from B1T to B1E to non linear paths. The conductive patterns A1 and B1 including location of tabs, slots, and extension of main bodies results in the conductive paths in A1 from A1T to A1E generally being similar to but in opposite direction from conductive paths in B1 from B1T to B1M. Slots S1-S4 are uniformly slanted relative to the direction from the LLS to the US.

FIG. 67 shows stack 6700 which is similar to stack 6600, except that slots S1-S4 are not slanted relative to the direction from the LLS to the US.

FIG. 68 shows a stack 6800 including plates A and B. Plate A includes conductive layer A1. A1 consists of tab A1T and main body portion A1M. A1M consists of portions A1U, A1R, and A1LL. A1T extends to a portion of the LS toward the US. A1U extends from A1T more than half way toward the RS. A1LL extends from near the RS to near the LS below A1U. A1R extends from the end of A1U closest to the RS to the end of A1LL closest the RS. The separation between the upper surface of A1LL and the lower surface of A1U defines slot S1 wherein there is no conductive layer. Plate B includes conductive layer B1. B1 consists of B1T and B1M, and B1M defines slot S2. Slots S1 and S2 overlap.

FIG. 69 shows stack 6900 which is similar to stack 6800, except that tabs A1T and B1T each extend in the direction from the LLS to the US as far as their corresponding main body portions. As a result, slots S1, S2 each include a portion S1', S2', extending along the direction from the LLS to the US having one surface defined by an end of the B1U, A1LL portions of the main body.

FIG. 70 shows a stack 7000 of plates A and B.

A includes conductive layer A1 that consists of tab portion A1T and main body portion A1M. Main body portion A1M consists of upper portion A1MU, middle portion A1MM, lower portion A1MLL, and right side portion A1MR. A1T extends to a region of the LS between the US and the LLS. A1MM extends from A1T more than halfway towards the LS. A1MR extends from the portion of A1MM furthest towards the RS towards the US and towards the LLS. A1MU extends from an upper portion of A1MR more than half way toward the LS. A1MLL extends from an lower portion of A1MR more than half way toward the LS. Slots S1 and S2 are defined by facing sections of the portions of A1. S1 and S2 includes a portion extending in the direction from the LLS to the US where the main body portion opposes A1T. S1 and S2 includes a portion extending in the direction from the LS to the RS where of the main body portion oppose one another.

B includes conductive layer B1 that consists of tab portion B1T and main body portion B1M. B1M includes upper portion B1MU, middle portion B1MM, lower portion B1MLL, and right side portion B1MR. B1T extends to the RS. B1MU extends from an upper portion of B1T more than half way towards the LS. B1MLL extends from a lower portion of B1T more than half way toward the LS. B1MR extends between the left most portions of B1MU and B1MRR. B1MM extends from a middle portion of B1MR more than half way towards the LS. Interior edges of conductive layer B1M between its various portions define a C shaped enclosed region, S, of dielectric material.

The upper and lower portions of enclosed region S overlap with slots S1 and S2.

FIG. 7100 shows stack 7100 which is similar to stack 6600, except that A and B tabs extend to the LS and RS, and except that there are three slots instead of two slots in each conductive layer.

Figure 72:
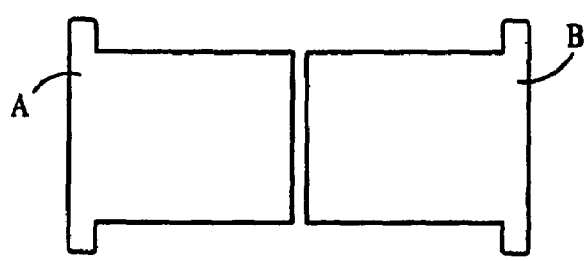
FIG. 72 is a top plan view of a plate of an energy conditioner including A and B layers.
Figure 73:
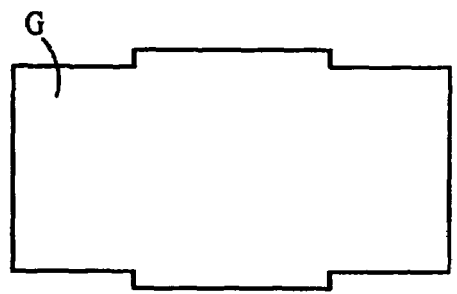
FIG. 73 is a top plan view of a plate of an energy conditioner including a G layer.
Figure 74:
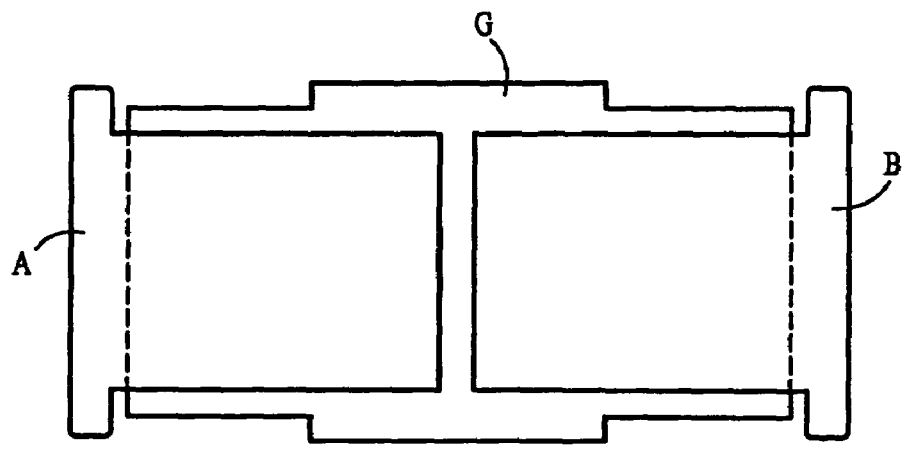
FIG. 74 is a plan view of a stack of the plates of FIGS. 72 and 73.

FIGS. 72-74 illustrate overlap of an AB type plate (FIG. 72 having conductive layers A1 and B1) with a G type plate (FIG. 73 having a G1 conductive layer) in FIG. 74. Dotted lines in FIG. 74 indicate the extension of the G1 conductive layer relative to the tabs of the A1 and B1 layers. An important feature of FIG. 74 is that the G1 layer extends beyond the A1 and B1 layers in all directions in the plane (US, LLS, LS, and RS) except where tabs of the A1 and B1 layers extend to the edge of the dielectric D (not shown).

FIGS. 75-79 illustrate novel energy conditioner structures including internal structure having conductive layers in two planes. In energy conditioners including the internal structure showing in FIGS. 75 and 76, the G master electrode consists of the external band structure C2 shown in FIG. 79. In energy conditioners including the internal structure shown in FIGS. 77 and 78, the G conductive structure includes the C2 band of FIG. 79 and the additional G1 and G2 conductive layers shown in FIGS. 77 and 78. In energy conditioners including the internal structure showing in FIGS. 75 and 77, conductive paths between tabs of the A1 layers through the A1 layer and through the C1 band are separated from one another by dielectric at the LS. Each one of the internal structures of FIGS. 75-79 show some overlap of A and B conductors in different planes.

FIG. 75 shows stack 7500 including plates AB1 and AB2. Plate AB1 includes conductive layers A1 and B1.

A1 consists of tabs A1T, A1T2, and main body portion A1M. A1T1 extends to the US near the LS. A1T2 extends to the LLS near the LS. A1M extends between A1T1 and A1T2 and, in the upper half of plate AB1, to a region more than half way towards the RS.

B1 consists of tabs B1T1, B1T2, and main body portion B1M. B1T1 extends to the US near the RS. B1T2 extends to the LLS near the RS. B1M extends between B1T1 and B1T2 and, in the lower half of plate AB1, to a region more than half way towards the LS.

Plate AB2 includes conductive layers A2 and B2.

A2 consists of tabs A2T1 and A2T2 and main body portion A2M. A2T1 extends to the US near the LS. A2T1 extends to the LLS near the LS. A2M extends between A2T1 and A2T2 and less than half way towards the RS.

B2 consists of tabs B2T1 and B2T2 and main body portion B2M. B2T1 extends to the US near the RS. B2T1 extends to the LLS near the RS. B2M extends between B2T1 and B2T2 and less than half way towards the LS.

A1T1 and A2T1 tabs are aligned. A2T1 and A2T2 tabs are aligned. B1T1 and B2T1 tabs are aligned. B1T1 and B2 tabs are aligned.

When stack 7500 is assembled in external structure 7900, aligned tabs are conductively connected by the corresponding bands (conductive integration structure). In addition, band C1 contact all of the A tabs and band C3 contacts all of the B tabs.

FIG. 76 shows stack 7600 which is similar to stack 7500, except that tabs of A conductive layers extend to the LS and tabs of the B conductive layers extend to the RS. As a result, no dielectric separates conductive paths from A1T1 to A1T2 in layer A1 and in band C1.

FIG. 77 shows stack 7700 which is similar to stack 7500, except that there exist additional conductive layers G1-G4 having tabs extending to central portions of the US and LLS respectively. As a result, a G master electrode of an energy conditioner including internal structure 7700 and external structure 7900 includes C2 and G1-G4.

FIG. 78 shows stack 7800 which is similar to stack 7500, except that there exist additional conductive layers G1-G4 having tabs extending to central portions of the US and LLS respectively. As a result, a G master electrode of an energy conditioner including internal structure 7800 and external structure 7900 includes C2 and G1-G4.

FIG. 79 shows external structure 7900 including conductive bands C1, C2, and C3. C2 forms a closed ring. C1 and C3 have portions extending from the LS or RS over portions of the US, LLS, front side, and back side. Alternatively, C1 and C3 may have no conductive material on the LS or RS.

Figure 82:
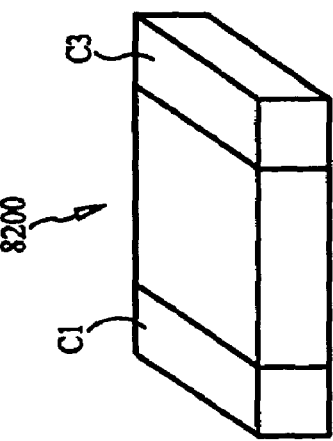
FIG. 82 is a perspective view of an external structure suitable for use in an energy conditioner including the internal structures shown in FIGS. 80-81.

FIGS. 80-82 illustrate energy conditioners with AGB plates having a floating G layer and overlapping A and B layers. The stacks of FIGS. 80 and 81 differ in that A and B layers in stack 8000 extend to the LS and RS forming therefore a single tab in each A or B layer, whereas A and B layers in stack 8100 do not extend to the LS or RS forming therefore two tabs in each A or B layer.

FIG. 80 shows stack 8000 consisting of plates AGB1 and AGB2. These plates are mirror images of one another about a line extended through the center of the plate from the LLS to the US. AGB1 includes conductive layers A1, B1, and G1. AGB1 is similar to plate AB1 of FIG. 76, except for the existence of G1 between A1 and B1. G1 does has no tabs.

A significant feature of stack 8000 is that a substantial portion of the main bodies of A1 and B2 overlap, and a substantial portion of the main bodies of A2 and B1 overlap.

FIG. 81 shows stack 8100 which is similar to stack 8000, except that A and B layers do not extend to the LS or RS.

FIG. 82 shows external structure 8200 including only conductive bands C1 and C3, which are at opposite ends from one another. In an energy conditioner including either internal structure 8000 or 8100, the stack is arranged so that tabs near the LS contact to band C1 and tabs near the RS contact to band C3.

FIGS. 83 and 84 illustrate internal structure wherein there exists more than one size of gap between A and B layers in a plane.

FIG. 83 shows stack 8300 including plates AB1, G, AB2. Plate AB1 includes conductive layers A1 and B1. Main body portions A1M and B1M oppose one another across gap GAP1. Plate AB2 includes conductive layers A2 and B2 wherein main body portions A2M and B2M oppose on another across gap GAP2. GAP2 is larger than GAP1. Plate G containing conductive layer G1 resides in a plane between plates AB1 and AB2.

FIG. 84 shows in cross section a stack of plates AB1, G, and AB2 of FIG. 83 in the sequence: AB1, G, AB2, G, AB1, G, AB2. FIG. 84 also shows conductive bands C1 and C3 contacting the tabs of the A layers on the LS and the tabs of the B layers on the RS. Alternatives include any of the plates shown herein including at least an A layer and a B layer that oppose on another across a gap, specifically including plates having additional G layers on the same plane as the A and B layers. Alternatives also include any sequence of and intermixing of various shapes and patterns of AB and AGB plates.

Figure 85:
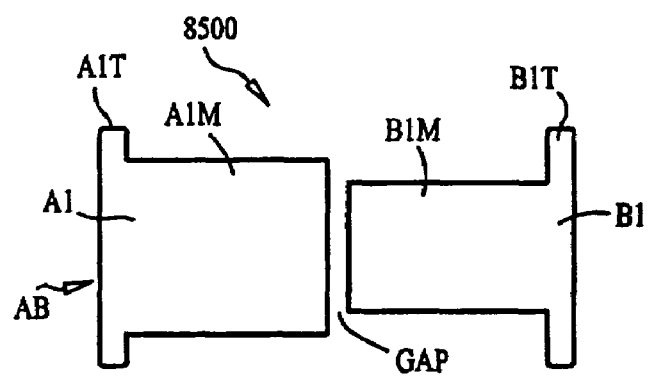
FIG. 85 is a top plan view of a plate of an energy conditioner including A and B layers.
Figure 86:
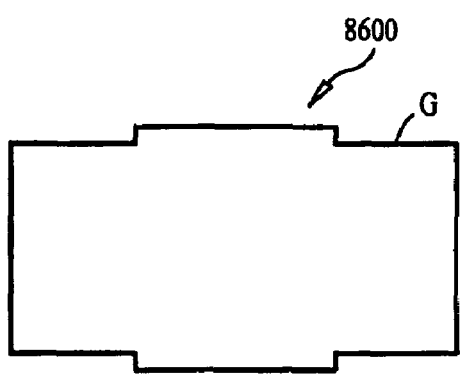
FIG. 86 is a top plan view of a plate of an energy conditioner including a G layer.
Figure 87:
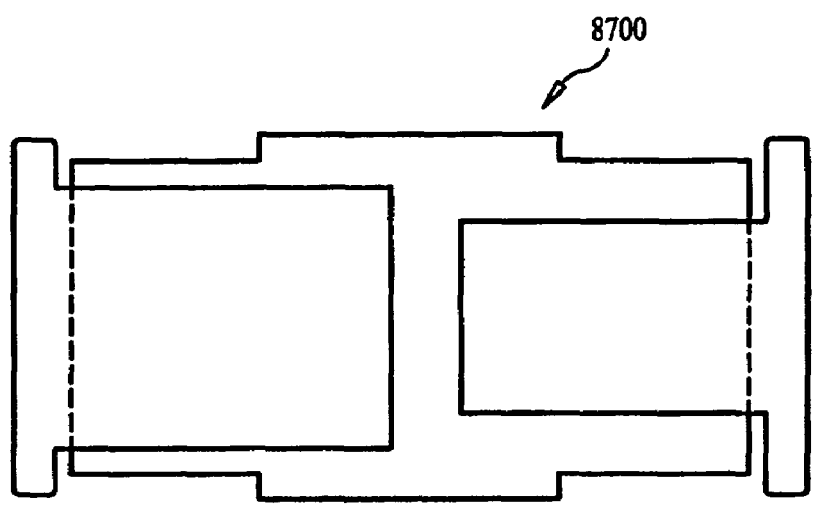
FIG. 87 is a plan view of a stack of the plates of FIGS. 85 and 86.

FIGS. 85-96 disclose plates and stacks of plates including AB plates wherein the size of the A and B conductors is different from one another. These figures all show AB plates wherein the A and B conductive layers each have a single tab extending over the entire LS or RS and adjacent portions of the US and LLS. In addition, the A and B layers oppose one another across a gap approximately at the center from the LS to the RS of each plate. However, the extent of the main body portions of the A and B layers in the direction from the LLS to the US differs from one another. Like FIGS. 72-74, no dielectric appears in these figure; only conductive regions. FIG. 87, like FIG. 74, exists, therefore, to show the overlap of the conductive layers.

FIG. 85 shows AB plate 8500 including conductive layers A1 and B1. A1 consists of tab A1T and main body portion A1M. B1 consists of tab B1T and main body B1M. A1T extends to the entire LS and adjacent portions of the US and LLS. A1M extends from A1T less than half way to the RS. B1 consists of tab B1T and main body portion B1M. B1T extends to the entire RS and adjacent portion of the US and LLS. B1M extends from B1T less than half way to the LS. Main body portions A1M and B1M oppose one another across a gap, GAP, at the approximate center in the direction from the LS to the RS of plate 8500.

FIG. 86 shows G plate 8600 including conductive layer G1. G1 is identical to G1 in stack 3100 in FIG. 31.

FIG. 87 shows stack 8700 including plate 8500 on plate 8600. Dashed lines so the left and right hidden edges of plate 8600. Note that G1 extends in to the LS, RS, US, and LLS further than A1 and B1, except in those regions where tabs of A1 and B1 project to form parts of the surface of the internal structure of an energy conditioner.

Figure 91:
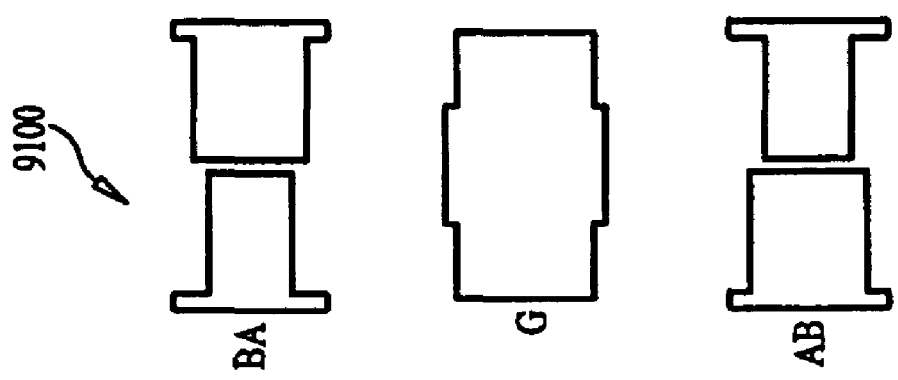
FIG. 91 is an exploded view of a stack of two plates of an energy conditioner in which the plates have been displaced from one another in the plane of the paper.

FIG. 91 shows a stack including top plate BA. BA differs from AB of FIG. 85 in that BA has B1 relatively larger (in the direction from the LLS to the US) than A1.

FIGS. 88-96 show various internal structures of energy conditioners.

Figure 88:
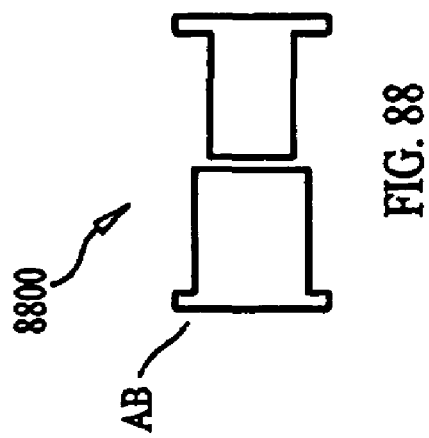
FIG. 88 is a top plan view of a plate of an energy conditioner.

FIG. 88 shows plate AB.

Figure 89:
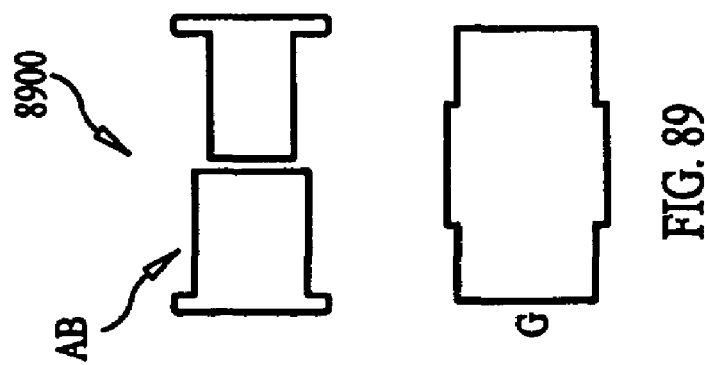
FIG. 89 is an exploded view of a stack of two plates of an energy conditioner in which the plates have been displaced from one another in the plane of the paper.

FIG. 89 shows stack 8900 including the sequence of plates: AB and G.

Figure 90:
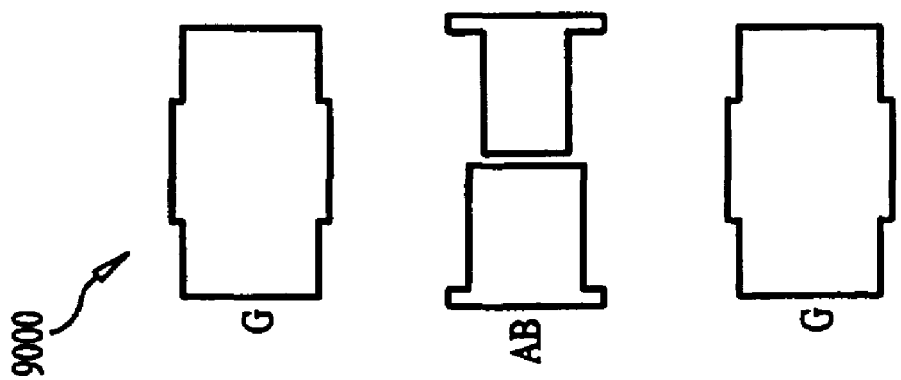
FIG. 90 is an exploded view of a stack of two plates of an energy conditioner in which the plates have been displaced from one another in the plane of the paper.

FIG. 90 shows stack 900 including the sequence of plates: G, AB, G.

FIG. 91 shows stack 9100 including the sequence of plates: BA, G, AB.

FIG. 92 shows stack 9200 including the sequence of plates: G, AB, G, AB.

FIG. 93 shows stack 9300 including the sequence of plates: G, BA, G, AB.

FIG. 94 shows stack 9300 including the sequence of plates: G, AB, G, AB, G.

FIG. 95 shows stack 9300 including the sequence of plates: G, AB, G, BA, G.

FIG. 96 shows stack 9300 including the sequence of plates: G, BA, G, AB, G, BA, G, AB, G.

Figure 97:
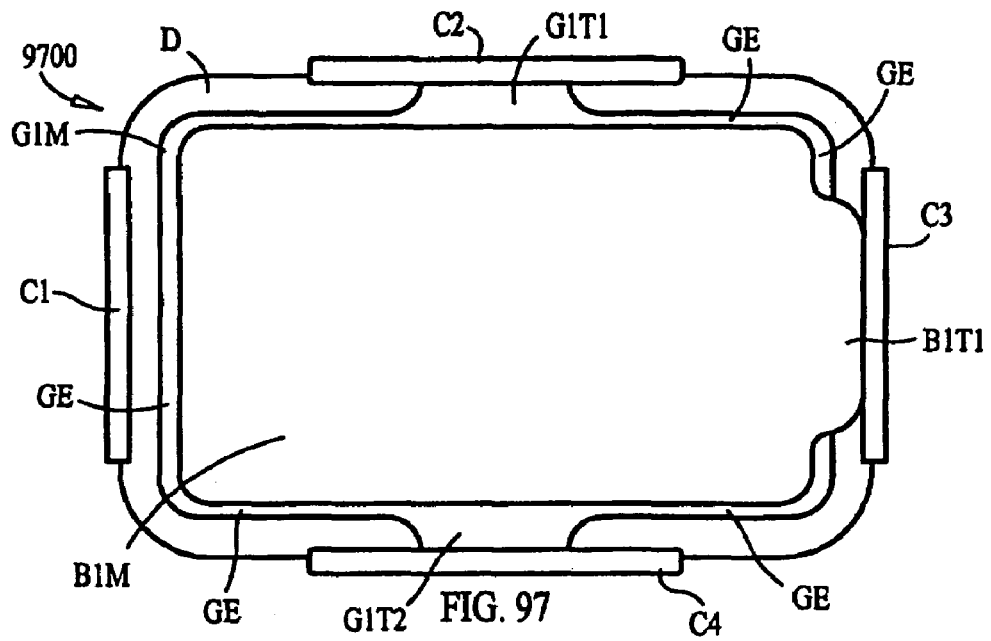
FIG. 97 is a top plan view of internal structure and conductive integration structure of an energy conditioner.

FIG. 97 shows in plan view portions of internal structure and external structure of energy conditioner 9700 having certain dielectric structure stripped away to expose top portions of conditioner 9700. FIG. 97 shows conductive bands C1-C4, and portions of a stack of conductive layers including all of exposed top layer B1 and exposed peripheral portions of underlying conductive layer G1. FIG. 97 shows tab B1T1 extended to band C3, and tabs G1T1, G1T2 extended to bands C2, C4. Note that G1M extends beyond the extent or all portions of B1M, except in the region of tab B1T, as indicated by GE. Hidden from view are any additional layers of the internal structure including in particularly any A conductive layers, which are layers having tabs extended to contact band C1.

Figure 98:
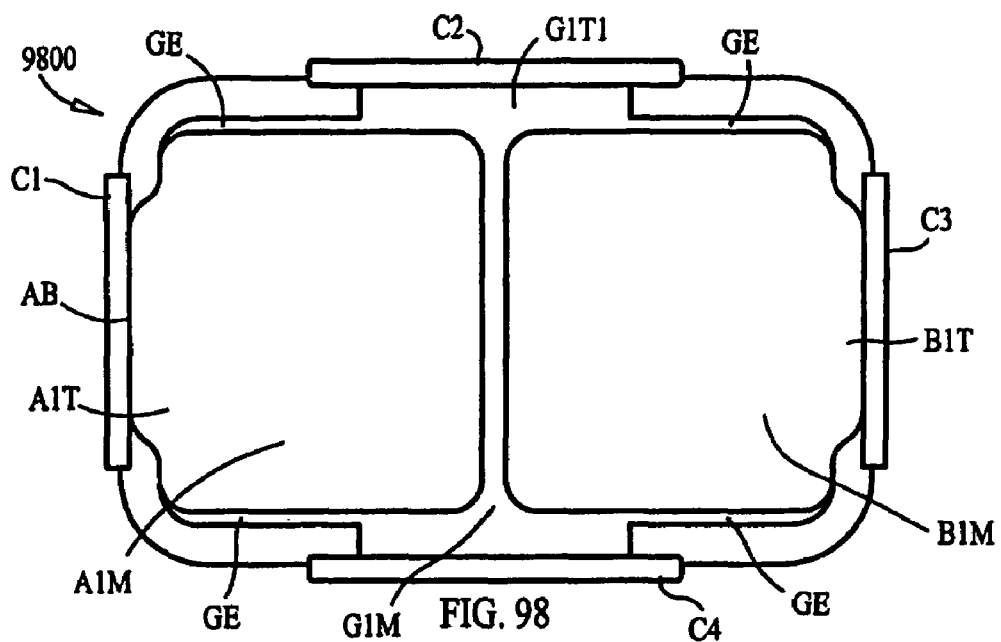
FIG. 98 is a partial cut away top view of internal structure and conductive integration structure of an energy conditioner.
Figure 99:
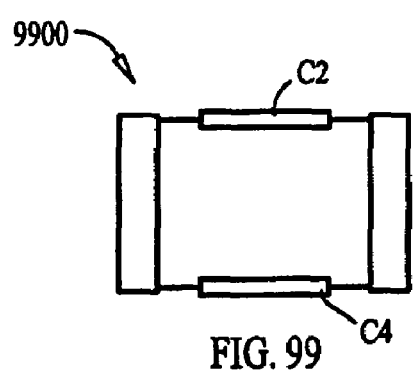
FIG. 99 is a partial cut away top view of internal structure and conductive integration structure of an energy conditioner.

FIG. 98 shows in plan view internal and external portions of internal structure and external structure of energy conditioner 9800 having certain dielectric structure stripped away to expose top portions of conditioner 9800. FIG. 99 shows conductive bands C1-C4, and portions of a stack of conductive layers including all of exposed co-planar top conductive layers A1 and B1 and exposed peripheral portions of underlying conductive layer G1. FIG. 98 shows tab A1T extended to band C1, tab B1T extended and tab C3, and tabs G1T1, G1T2 extended to bands C2, C4. Note that G1M extends beyond the extent or all portions of A1M, B1M, except in the region of tabs A1t, B1T, as indicated by GE. Hidden from view are any additional conductive layers including A, B, and G conductive layers.

Figure 100:
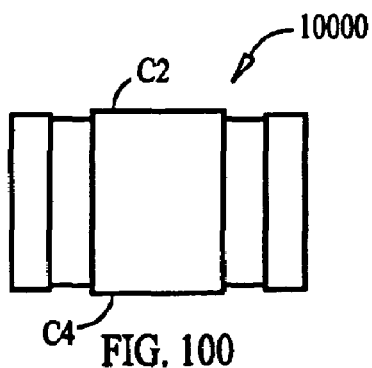
FIG. 100 is a top plan view of an energy conditioner similar to that in FIG. 99 but wherein upper and lower side conductive integration structure form a continuous band around the exterior.

FIGS. 99 and 100 show alternative complete external structure consistent with the conductive band configurations of FIGS. 98 and 99.

In FIG. 98 conductive bands C2 and C4 do not extend into contact with one another.

In FIG. 99 conductive bands C2 and C4 form a single band encircling the energy conditioner.

FIG. 100 schematically shows in cross section energy conditioner 1010 mounted on mounting structure 1020 of the type shown in FIGS. 4A-O, and the mounting structure residing on a surface of a structure (PC board, interconnect, or IC), conductive lines 1030A, 1030B, 1030C (in vias) extending into the structure, and power 1040, ground 1050, and signal 1060 planes extending perpendicular to the vias in the structure.

Figure 101:
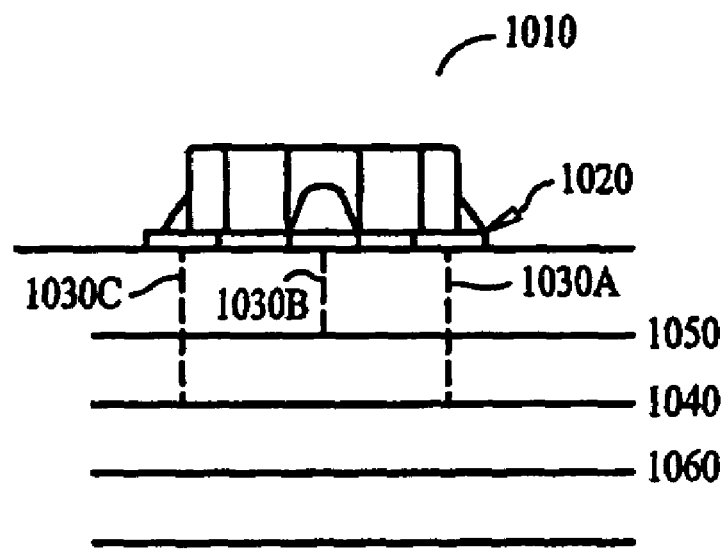
FIG. 101 is a schematic side section view of an energy conditioner, mounted on mounting structure, and conductively contacting conductive planes extending beneath the mounting structure.

FIG. 101 is a schematic showing an expanded view of a section of conductive lines 1030A, 1030B, 1030C and arrows indicating magnetic lines of force induced by current in 1030A, 1030B, 1030C. FIG. 101 indicates partial cancellation of induced magnetic fields, due to proximity of lines 1030A, 1030B, 1030C and directions of current flow in lines 1030A, 1030B, 1030C.

Figure 102:
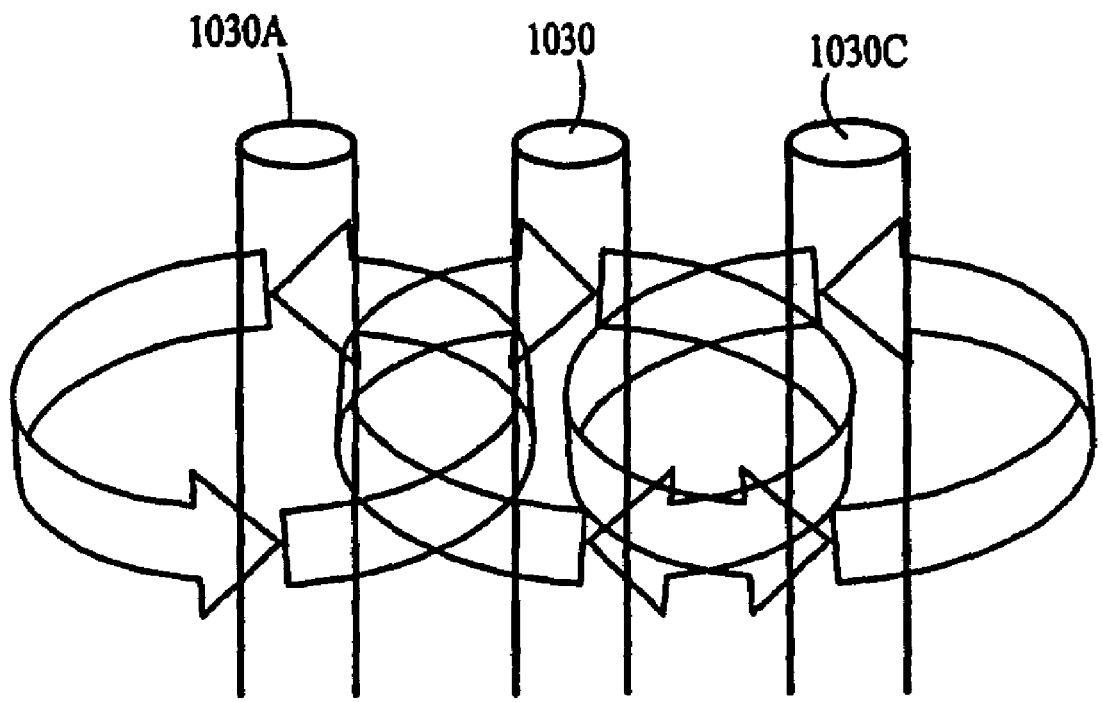
FIG. 102 is a illustration of magnetic fields relating to FIG. 101.

FIG. 102 is schematic view of FIG. 100 showing magnetic lines of force induced by current flow.

The invention claimed is:

1. An internal structure of an energy conditioner:
   wherein said internal structure has a left side surface, a right side surface, an upper side surface, a lower side surface, a top side surface, and a bottom side surface;
   wherein said internal structure comprises a dielectric material and a conductive material;
   wherein surfaces of said dielectric material and surfaces of said conductive material define said left side surface, said right side surface, said upper side surface, said lower side surface, said top side surface, and said bottom side surface;
   wherein said conductive material comprises a first A conductive layer and a first B conductive layer in a first plane, and a first G conductive layer;
   wherein said first A conductive layer, said first B conductive layer, and said first G conductive layer are electrically isolated from one another in said internal structure;
   wherein said first A conductive layer comprises at least one first A conductive layer first tab and a first A conductive layer main body portion;
   wherein said first B conductive layer comprises at least one first B conductive layer first tab and a first B conductive layer main body portion;
   wherein said first G conductive layer comprises at least a first G conductive main body portion;
   wherein said first A conductive layer main body portion does not extend to any one of said left side surface, said right side surface, said upper side surface, and said lower side surface;
   wherein said first B conductive layer main body portion does not extend to any one of said left side surface, said right side surface, said upper side surface, and said lower side surface;
   wherein said first G conductive layer main body portion does not extend to any one of said left side surface, said right side surface, said upper side surface, and said lower side surface; and
   wherein said first G conductive layer extends towards said left side surface, said right side surface, said upper side surface, and said lower side surface further than said first A conductive layer main body portion and further than said first B conductive layer main body portion.

2. The structure of claim 1 wherein said first G conductive layer extends further towards said left side surface, said right side surface, said upper side surface, and said lower side surface than all portions of said first A conductive layer, except for where said at least one first A conductive layer first tab extends toward surfaces of said internal structure.

3. The structure of claim 1 wherein said G conductor main body portion has a G conductor main body portion area, said A conductor main body portion has an A conductor main body portion area, and said G conductor main body portion area is larger than said A conductor main body portion area.

4. The structure of claim 1 wherein said G conductor main body portion has a G conductor main body portion area, said A conductor main body portion has an A conductor main body portion area, said B conductor main body portion has an B conductor main body portion area, and said G conductor main body portion area is larger than the sum of said A conductor main body portion area and said B conductor main body portion area.

5. The structure of claim 1 wherein said first G conductive layer further comprises a first G conductive layer first tab and a first G conductive layer second tab.

6. An energy conditioner comprising the structure of claim 1 and an energy conditioner external structure.

7. An assembly comprising the energy conditioner of claim 6 mounted on mounting surface structure, wherein said mounting surface structure consists of a first conductive region, a second conductive region, and a third conductive region;
wherein said first A conductive layer conductively connects to said first conductive region;
wherein said first B conductive layer conductively connects to said second conductive region; and
wherein said G conductive layer conductively connects to said third conductive region.

8. The conditioner of claim 6 wherein said external conductive structure comprises a first conductive integration structure, a second conductive integration structure, and a third conductive integration structure;
wherein said first conductive integration structure contacts said first A conductive layer first tab and said first conductive region;
wherein said second conductive integration structure contacts said first B conductive layer first tab and said second conductive region;
wherein said third conductive integration structure contacts a first G conductive layer first tab and said third conductive region.

9. The conditioner of claim 8 wherein said first conductive integration structure resides on a at least said left side surface, said second conductive integration structure resides on at least said right side surface, and said third conductive integration structure resides between said first conductive integration structure and said second conductive integration structure.

10. The conditioner of claim 8 further comprising a fourth conductive integration structure that contacts a first G conductive layer second tab and said third conductive region.

11. The conditioner of claim 8 wherein said third conductive integration structure also contacts a first G conductive layer second tab and said third conductive region.

12. The structure of claim 1 wherein said first A conductive layer first tab extends to at least one of said left side surface, said upper side surface, and said bottom side surface.

13. The structure of claim 1 wherein said first A conductive layer first tab extends to all of said left side surface, a portion of said upper side surface at the intersection of said upper side surface and said left side surface, and a portion of said lower side surface at the intersection of said lower side surface and said left side surface.

14. The structure of claim 1 wherein said first A conductive layer first tab extends to only said left side surface.

15. The structure of claim 1 wherein said at least one first A conductive layer first tab consists of said first A conductive layer first tab and a first A conductive layer second tab;
wherein said first A conductive layer first tab extends to only said upper side surface; and
wherein said first A conductive layer second tab extends only to said lower side surface.

16. The structure of claim 1 wherein said at least one first A conductive layer first tab consists of said first A conductive layer first tab and a first A conductive layer second tab;
wherein said first A conductive layer first tab extends to only said upper side surface near said left side surface; and
wherein said first A conductive layer second tab extends only to said lower side surface at a region near said left side surface.

17. The structure of claim 1 wherein said A conductive layer and said B conductive layer are mirror images of one another about a line extending from a center of said upper side surface to a center of said lower side surface.

18. The structure of claim 1:
wherein said first A conductive layer first tab extends to a region at a corner of said lower side surface and said left side surface; and
wherein said first B conductive layer first tab extends to a region at a corner of said upper side surface and said right side surface.

19. The structure of claim 1 wherein said first G conductive layer is in said first plane.

20. The structure of claim 1 wherein said first G conductive layer is in said first plane and between said first A conductive layer and said first B conductive layer.

21. The structure of claim 1 wherein said first G conductive layer is in said first plane and between said first A conductive layer and said first B conductive layer, and said first G conductive layer comprises a first G conductive layer first tab and a first G conductive layer second tab.

22. The structure of claim 1 wherein said first G conductive layer includes only one tab.

23. The structure of claim 1 wherein said first G conductive layer has exactly two tabs.

24. The structure of claim 1 wherein said first G conductive layer comprises at least four tabs.

25. The structure of claim 1 wherein said first G conductive layer has internal surfaces defining at least one aperture in said first G conductive layer.

26. The structure of claim 1 wherein said first G conductive layer includes no tabs.

27. The structure of claim 1 further comprising surfaces defining a via, conductive material in said via, wherein said conductive material connects to only one of A, B, and G conductive layers.

28. The structure of claim 1 wherein said at least one first A conductive layer first tab consists of a first A conductive layer first tab, and said first A conductive layer main body extends in a direction parallel to the surface of said internal structure to which said first a conductive layer first tab contacts further than the extent in that direction of said first a conductive layer first tab.

29. The structure of claim 1 wherein said at least one first A conductive layer first tab consists of a first A conductive layer first tab, and said first A conductive layer main body extends in a direction parallel to the surface of said internal structure to which said first a conductive layer first tab contacts not as far as the extent in that direction of said first a conductive layer first tab.

30. The structure of claim 1 wherein said first A conductive layer main body portion includes a rounded corner.

31. The structure of claim 1 wherein said first A conductive layer main body extends to only an upper left quadrant, said first B conductive layer main body extends to only a lower right quadrant.

32. The structure of claim 1 wherein said at least one first A conductive layer first tab consists of a first A conductive layer first tab that spans a corner of said left side surface and said lower side surface, and said at least one first B conductive layer first tab consists of a first B conductive layer first tab that spans a corner of said right side surface and said upper side surface.

33. The structure of claim 1:
   wherein said at least one first A conductive layer first tab consists of a first A conductive layer first tab and a first A conductive layer second tab, said first A conductive layer first tab extends only to said upper side surface near said left side surface, and said first A conductive layer second tab extends only to said lower side surface near said left side surface; and
   wherein said at least one first B conductive layer first tab consists of a first B conductive layer first tab and a first B conductive layer second tab, said first B conductive layer first tab extends only to said upper side surface near said right side surface, and said first B conductive layer second tab extends only to said lower side surface near said right side surface.

34. The structure of claim 1:
   wherein said at least one first A conductive layer first tab consists of a first A conductive layer first tab and a first A conductive layer second tab, said first A conductive layer first tab extends only to a central region of said left side surface, and said first A conductive layer second tab extends only to a region of said lower side surface near said left side surface; and
   wherein said at least one first B conductive layer first tab consists of a first B conductive layer first tab and a first B conductive layer second tab, said first B conductive layer first tab extends only to a central region of said right side surface, and said first B conductive layer second tab extends only to said upper side surface near said right side surface.

35. The structure of claim 1 wherein said first A conductive layer defines slots.

36. The structure of claim 1 wherein said first A conductive layer defines slots and said first B conductive layer defines slots.

37. The structure of claim 1 wherein said first A conductive a layer main body is larger than said first B conductive layer main body.

38. A circuit comprising said internal structure of claim 1, a source, and a load, wherein said internal structure is connected in said circuit in a circuit 1 configuration.

39. A circuit comprising said internal structure of claim 1, a source, and a load, wherein said internal structure is connected in said circuit in a circuit 2 configuration.

40. A circuit comprising said internal structure of claim 1, a source, and a load, wherein said internal structure is connected in said circuit in a circuit 3 configuration.

41. A circuit comprising said internal structure of claim 1, a first source, a second source, a first load, and a second load, wherein said internal structure is connected in said circuit in a circuit 4 configuration.

42. A circuit comprising said internal structure of claim 1, a first source, a first load, and a second load, wherein said internal structure is connected in said circuit in a circuit 5 configuration.

43. A circuit comprising said internal structure of claim 1, a first source, a first load, and a second load, wherein said internal structure is connected in said circuit in a circuit 6 configuration.

44. An assembly comprising said internal structure of claim 1 and an external structure of said energy conditioner, wherein said external structure comprises:
   a first conductive integration region that extends along at least one of said left side surface, said upper side surface, and said lower side surface and contacts there at, at least one of said at least one first A conductive layer first tab; and
   a second conductive integration region that extends along at least one of said right side surface, said upper side surface, and said lower side surface and contacts thereat at least one of said at least one first B conductive layer first tab.

45. The assembly of claim 44 wherein said first G conductive layer includes a first G conductive layer main body portion, a first G conductive layer first tab, and a first G conductive layer second tab, and wherein said external structure further comprises a third conductive integration region that extends along at least one side surface of said internal structure and contacts thereat said first G conductive layer first tab.

46. The assembly of claim 45 wherein said external structure further comprises a fourth conductive integration region that extends along at least one side surface of said internal structure opposite the one side surface of said internal structure along which said third conductive integration region extends where at said fourth conductive integration region contacts said first G conductive layer second tab.

47. The assembly of claim 46 further comprising a mounting structure to which said external structure is mounted, wherein said mounting structure consists of only a first conductive region, a second conductive region, and a third conductive region.

48. The assembly of claim 47 wherein said first conductive region comprises conductive material in a first via, said second conductive region comprises conductive material in a second via, and said third conductive region comprises conductive material in a third via.

49. The assembly of claim 48 wherein each one of said first conductive region, said second conductive region, and said third conductive region have conductive material in no more than two vias.

50. The assembly of claim 49 wherein said first conductive region, said second conductive region, and said third conductive region have conductive material in no more than a total of six vias.

51. The assembly of claim 49 wherein said first conductive region, said second conductive region, and said third conductive region have conductive material residing in no more than a total of five vias.

52. An assembly comprising:
   an energy conditioner having said internal structure of claim 1;
   a mounting structure; and
   wherein said internal structure is mounted on said mounting structure;
   wherein said mounting structure comprises no more than three separate conductive elements.

53. The assembly of claim 52 wherein each one of said no more than three separate conductive elements has conductive material extended into no more than two vias.

54. An assembly comprising:
an energy conditioner having the internal structure of claim 1, and an external structure comprising conductive regions that conductively connect components in said internal structure of an A master electrode to one another, of a B master electrode to one another, and of a G master electrode to one another;
a mounting structure; and
wherein said energy conditioner is mounted on said mounting structure;
wherein said mounting structure consists of only a first conductive region, a second conductive region, and a third conductive region;
and wherein said A master electrode is connected to said first conductive region, said B master electrode is connected to said second conductive region, and said G master electrode is connected to said third conductive region.

55. The assembly of claim 54 wherein said G master electrode includes a first G conductive integration region, and a second G conductive integration region spatially separated from and not contacting said first G conductive integration region, wherein both said first G conductive integration region and said second G conductive integration region contact said third conductive region.

56. A method of making an internal structure of an energy conditioner comprising:
providing an internal structure comprises a dielectric material and a conductive material;
wherein said internal structure has a left side surface, a right side surface, an upper side surface, a lower side surface, a top side surface, and a bottom side surface;
wherein surfaces of said dielectric material and surfaces of said conductive material define said left side surface, said right side surface, said upper side surface, said lower side surface, said top side surface, and said bottom side surface;
wherein said conductive material comprises a first A conductive layer and a first B conductive layer in a first plane, and a first G conductive layer;
wherein said first A conductive layer, said first B conductive layer, and said first G conductive layer are electrically isolated from one another in said internal structure;
wherein said first A conductive layer comprises at least one first A conductive layer first tab and a first A conductive layer main body portion;
wherein said first B conductive layer comprises at least one first B conductive layer first tab and a first B conductive layer main body portion;
wherein said first G conductive layer comprises at least a first G conductive main body portion;
wherein said first A conductive layer main body portion does not extend to any one of said left side surface, said right side surface, said upper side surface, and said lower side surface;
wherein said first B conductive layer main body portion does not extend to any one of said left side surface, said right side surface, said upper side surface, and said lower side surface;
wherein said first G conductive layer main body portion does not extend to any one of said left side surface, said right side surface, said upper side surface, and said lower side surface; and
wherein said first G conductive layer extends towards said left side surface, said right side surface, said upper side surface, and said lower side surface further than said first A conductive layer main body portion and further than said first B conductive layer main body portion.

57. A method of making an energy conditioner comprising assembly the internal structure of claim 56 with an energy conditioner external structure.

58. A method of using an energy conditioner comprising the internal structure of claim 1 comprising:
connecting said energy conditioner in a circuit.

* * * * *

UNITED STATES PATENT AND TRADEMARK OFFICE
CERTIFICATE OF CORRECTION

| | | |
|---|---|---|
| PATENT NO. | : 7,586,728 B2 | Page 1 of 1 |
| APPLICATION NO. | : 11/372132 | |
| DATED | : September 8, 2009 | |
| INVENTOR(S) | : William M. Anthony | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 602 days.

Signed and Sealed this

Twenty-first Day of September, 2010

David J. Kappos
*Director of the United States Patent and Trademark Office*

UNITED STATES PATENT AND TRADEMARK OFFICE
Certificate

Patent No. 7,586,728 B2                                        Patented: September 8, 2009

On petition requesting issuance of a certificate for correction of inventorship pursuant to 35 U.S.C. 256, it has been found that the above identified Patent, through error and without any deceptive intent, improperly sets forth the inventorship.

Accordingly, it is hereby certified that the correct inventorship of this Patent is: William M. Anthony, Erie, PA (US); Anthony A. Anthony, Erie, PA (US); and David J. Anthony, Erie, PA (US).

Signed and Sealed this Twenty-fourth Day of July 2012.

<div align="right">

REXFORD BARNIE
*Supervisory Patent Examiner*
Art Unit 2836
Technology Center 2800

</div>